(12) United States Patent
Fraenkel et al.

(10) Patent No.: US 6,738,933 B2
(45) Date of Patent: May 18, 2004

(54) ROOT CAUSE ANALYSIS OF SERVER SYSTEM PERFORMANCE DEGRADATIONS

(75) Inventors: Noam A. Fraenkel, Jerusalem (IL); Guy Goldstein, Ramat-Hasharon (IL); Ido Sarig, Palo Alto, CA (US); Refael Haddad, Modi'in (IL)

(73) Assignee: Mercury Interactive Corporation, Sunnyvale, CA (US)

( * ) Notice: Subject to any disclaimer, the term of this patent is extended or adjusted under 35 U.S.C. 154(b) by 42 days.

(21) Appl. No.: 10/039,271

(22) Filed: Oct. 19, 2001

(65) Prior Publication Data

US 2003/0065986 A1 Apr. 3, 2003

Related U.S. Application Data

(60) Provisional application No. 60/289,923, filed on May 9, 2001.

(51) Int. Cl.[7] ............................................. G06F 11/00
(52) U.S. Cl. ............................ 714/47; 714/25; 714/26; 702/186
(58) Field of Search .......................... 714/47, 25, 33, 714/37, 39, 51, 56, 26; 702/186

(56) References Cited

U.S. PATENT DOCUMENTS

| | | |
|---|---|---|
| 4,849,879 A | 7/1989 | Chinnaswamy et al. ...... 706/45 |
| 5,446,874 A | 8/1995 | Waclawsky et al. |
| 5,544,310 A | 8/1996 | Forman et al. |
| 5,644,717 A | 7/1997 | Clark .......................... 709/224 |

(List continued on next page.)

FOREIGN PATENT DOCUMENTS

WO    WO 01/20918 A2    3/2002

OTHER PUBLICATIONS

V. Mainkar, "Availability Analysis of Transaction Processing Systems based on User–Perceived Performance," The 16th Symposium on Reliable Distributed Systems, IEEE Computer Society, 1997, pp. 10–17.

N. Randall, PC Magazine, "Web Site Analysis Tools The Results Are In," dated Mar. 10, 1998, pp. 189–210.

Article by Patrick Killelea, dated Jan. 15, 1999, titled "Web Performance Measuring Tools and Services," printed from Webreview.com site.

LoadRunner Controller User's Guide—Windows Version 6.0, pp. 1–49, 278–344, and 558, (dated 1999).

Co–pending U.S. application No. 10/214,421, filed Aug. 6, 2002, assigned to Mercury Interactive Corporation.

*Primary Examiner*—Robert Beausoliel
*Assistant Examiner*—Michael Maskulinski
(74) *Attorney, Agent, or Firm*—Knobbe, Martens, Olson & Bear LLP

(57) ABSTRACT

A system for monitoring and analyzing the post-deployment performance of a web-based or other transactional server is disclosed. The monitoring system includes agent components that monitor and report various performance parameters associated with the transactional server, such as response times seen by end users, server and network times, and various server resource utilization parameters. A web-based reports server displays the data collected by the agents through a series of charts and graphs that indicate whether correlations exist between the response times and lower level parameters. A root cause analysis system applies statistical algorithms to the collected data to detect performance degradations in specific parameters, and uses predefined parameter dependency rules to correlate high level performance problems to likely sources or causes of such problems.

24 Claims, 45 Drawing Sheets

U.S. PATENT DOCUMENTS

| | | |
|---|---|---|
| 5,655,081 A | 8/1997 | Bonnell et al. |
| 5,742,754 A | 4/1998 | Tse |
| 5,781,703 A | 7/1998 | Desai et al. |
| 5,787,254 A | 7/1998 | Maddalozzo, Jr. et al. |
| 5,812,780 A | 9/1998 | Chen et al. |
| 5,864,662 A | 1/1999 | Brownmiller et al. |
| 5,905,868 A | 5/1999 | Baghai et al. |
| 5,964,891 A | 10/1999 | Caswell et al. |
| 6,006,260 A | 12/1999 | Barrick, Jr. et al. |
| 6,108,700 A | 8/2000 | Maccabee et al. |
| 6,108,782 A | 8/2000 | Fletcher et al. ............. 713/153 |
| 6,138,157 A | 10/2000 | Welter et al. |
| 6,157,618 A | 12/2000 | Boss et al. |
| 6,157,940 A | 12/2000 | Marullo et al. |
| 6,167,534 A | 12/2000 | Straathof et al. |
| 6,205,413 B1 | 3/2001 | Bisdikian et al. |
| 6,243,105 B1 | 6/2001 | Hoyer et al. |
| 6,324,492 B1 | 11/2001 | Rowe |
| 6,336,138 B1 | 1/2002 | Caswell et al. |
| 6,434,513 B1 | 8/2002 | Sherman et al. |
| 6,446,028 B1 | 9/2002 | Wang |
| 6,446,120 B1 | 9/2002 | Dantressangle |
| 6,449,739 B1 | 9/2002 | Landan |
| 6,457,142 B1 * | 9/2002 | Klemm et al. ................. 714/38 |
| 6,470,464 B2 * | 10/2002 | Bertram et al. ................ 714/37 |
| 6,477,483 B1 * | 11/2002 | Scarlat et al. ............... 702/186 |
| 6,505,246 B1 * | 1/2003 | Land et al. .................. 709/224 |
| 6,604,208 B1 * | 8/2003 | Gosselin et al. ................ 714/4 |
| 6,643,613 B2 * | 11/2003 | McGee et al. .............. 702/186 |
| 2002/0083371 A1 | 6/2002 | Ramanathan et al. |
| 2002/0138226 A1 | 9/2002 | Doane |
| 2003/0074161 A1 * | 4/2003 | Smocha et al. ............. 702/186 |

* cited by examiner

FIG. 31

Browser window showing:

- End-User experience
  - Performance Summary
  - Transaction Performance
  - Min./Avg. Max response Time
  - Avg. Response Time over Time
  - Service Availability over Time
  - Transaction Breakdown
  - Webtrace Analysis
- Network Diagnostics
- Component Analysis
- Server-side Monitors
- Alerts
- Administration
- Settings
- Help Webtrace Analysis — 210

Time: Jun. 9, 2001 12:11AM

Root Cause Analysis — 214

Route from nt-server to stocks server.com — 212

| Eop Num | Hop Name | Hop IP | Error Num | Time (millisec) |
|---|---|---|---|---|
| 0 | host1.1.sjccent.com | 207.87.51.1 | 2 | 10 |
| 1 | n/a | 207.87.53.5 | 1 | 10 |
| 2 | sjc3-core4-pos6-0 atlas.digex.et | 165.117.67.138 | 0 | 20 |
| 3 | sjc3-bb1.atlas digex.net | 165.117.56.98 | 0 | 10 |
| 4 | p7-1.paloalto-nbr2.bbnplanet.net | 4.0.6.77 | 0 | 10 |
| 5 | p4-0.sanjosel-nbrl.bbnplanet.ret | 4.0.1.2 | 0 | <10 |
| 6 | p9-0-0.sjccolo-core1.bbnplanet.net | 4.0.6.158 | 0 | 240 |
| 7 | fa12-1-0.sjccolo-border1.bbnplanet.net | 207.240.2.35 | 0 | 10 |
| 8 | n/a | 207.240.200.6 | 0 | 10 |
| 9 | n/a | 128.12.19.59 | 0 | 10 |

ROOT CAUSE ANALYSIS OF SERVER SYSTEM PERFORMANCE DEGRADATIONS

RELATED APPLICATIONS

This application claims the benefit of U.S. Provisional Appl. No. 60/289,923, filed May 9, 2001, the disclosure of which is hereby incorporated by reference. The disclosure of U.S. application Ser. No. 09/484,686, filed Jan. 17, 2000, is bodily incorporated herein to facilitate an understanding of certain embodiments of present invention.

FIELD OF THE INVENTION

The present invention relates to software tools and services for testing, monitoring and analyzing the operation of web-based and other transactional servers.

BACKGROUND OF THE INVENTION

A variety of commercially-available software tools exist for assisting companies in testing the performance and functionality of their web-based transactional servers and associated applications prior to deployment. Examples of such tools include the LoadRunner®, WinRunner® and Astra QuickTest® products of Mercury Interactive Corporation, the assignee of the present application.

Using these products, a user can record or otherwise create a test script which specifies a sequence of user interactions with the transactional server. The user may also optionally specify certain expected responses from the transactional server, which may be added to the test script as verification points. For example, the user may record a session with a web-based travel reservation system during which the user searches for a particular flight, and may then define one or more verification points to check for an expected flight number, departure time or ticket price.

Test scripts generated through this process are "played" or "executed" to simulate the actions of users—typically prior to deployment of the component being tested. During this process, the testing tool monitors the performance of the transactional server, including determining the pass/fail status of any verification points. Multiple test scripts may be replayed concurrently to simulate the load of a large number of users. Using an automation interface of the LoadRunner product, it is possible to dispatch test scripts to remote computers for execution.

The results of the test are typically communicated to the user through a series of reports that are accessible through the user interface of the testing tool. The reports may contain, for example, graphs or charts of the observed response times for various types of transactions. Performance problems discovered through the testing process may be corrected by programmers or system administrators.

A variety of tools and services also exist that allow web site operators to monitor the post-deployment performance of their web sites. For example, hosted monitoring services now exist which use automated agents to access a web site at regular intervals throughout the day. The agents measure the time required to perform various web site functions, and report the results to a server provided by Keynote Systems. The owner or operator of the web site can access this server using a web browser to view the collected performance data on a city-by-city or other basis. Other types of existing monitoring tools include log analysis tools that process access logs generated by web servers, and packet sniffing tools that monitor traffic to and from the web server. Further, using the LoadRunner ActiveTest service of Mercury Interactive Corporation, companies can load test their web sites and other systems over the Internet prior to deployment.

SUMMARY

A significant problem with existing monitoring tools and services is that they often fail to detect problems that are dependent upon the attributes of typical end users, such as the user's location, PC configuration, ISP (Internet Service Provider), or Internet router. For example, with some web site monitoring services, the web site operator can monitor the web site only from the agent computers and locations made available by the service provider; as a result, the service may not detect a performance problem seen by the most frequent users of the system (e.g., members of a customer service department who access the web site through a particular ISP, or who use a particular PC configuration).

Even when such attribute-specific problems are detected, existing tools and services often fail to identify the specific attributes that give rise to the problem. For example, a monitoring service may indicate that web site users in a particular city are experiencing long delays, but may fail to reveal that the problem is experienced only by users that access the site through a particular router. Without such additional information, system administrators may not be able to isolate and correct such problems.

Another significant problem with existing tools and services is that they do not provide an adequate mechanism for monitoring the current status of the transactional server, and for promptly notifying system administrators when a problem occurs. For example, existing tools and services typically do not report a problem until many minutes or hours after the problem has occurred. As a result, many end users may experience the problem before a system administrator becomes aware of the problem.

Another significant problem with prior tools and services is that they generally do not provide a mechanism for identifying the source of performance problem. For instance, a web site monitoring service may determine that users are currently experiencing unusually long response times, but typically will not be capable of determining the source of the problem. Thus, a system administrator may be required to review significant quantities of measurement data, and/or conduct additional testing, to pinpoint the source or cause of the detected problem.

The present invention addresses these and other problems by providing a software system and method for monitoring the post-deployment operation of a web site system or other transactional server. In a preferred embodiment, the system includes an agent component ("agent") that simulates the actions of actual users of the transactional server while monitoring and reporting the server's performance. In accordance with one aspect of the invention, the agent is adapted to be installed on selected computers ("agent computers") to be used for monitoring, including computers of actual end users. For example, the agent could be installed on selected end-user computers within the various offices or organizations from which the transactional server is commonly accessed. Once the agent component has been installed, the agent computers can be remotely programmed (typically by the operator of the transactional server) using a controller component ("controller"). The ability to flexibly select the computers to be used for monitoring purposes, and to use actual end-user computers for monitoring, greatly facilitates the task of detecting problems associated with the attributes of typical end users.

In accordance with another aspect of the invention, the controller provides a user interface and various functions for a user to remotely select the agent computer(s) to include in a monitoring session, assign attributes to such computers (such as the location, organization, ISP and/or configuration of each computer), and assign transactions and execution schedules to such computers. The execution schedules may be periodic or repetitive schedules, (e.g., every hour, Monday through Friday), so that the transactional server is monitored on a continuous or near-continuous basis. The controller preferably represents the monitoring session on the display screen as an expandable tree in which the transactions and execution schedules are represented as children of the corresponding computers. Once a monitoring session has been defined, the controller dispatches the transactions and execution schedules to the respective agent computers over the Internet or other network. The controller also preferably includes functions for the user to record and edit transactions, and to define alert conditions for generating real-time alert notifications. The controller may optionally be implemented as a hosted application on an Internet or intranet site, in which case users may be able to remotely set up monitoring sessions using an ordinary web browser.

During the monitoring session, each agent computer executes its assigned transactions according to its assigned execution schedule, and generates performance data that indicates one or more characteristics of the transactional server's performance. The performance data may include, for example, the server response time and pass/fail status of each transaction execution event. The pass/fail status values may be based on verification points (expected server responses) that are defined within the transactions. The agent computers preferably report the performance data associated with a transaction immediately after transaction execution, so that the performance data is available substantially in real-time for viewing and generation of alert notifications. In the preferred embodiment, the performance data generated by the various agent computers is aggregated in a centralized database which is remotely accessible through a web-based reports server. The reports server provides various user-configurable charts and graphs that allow the operator of the transactional server to view the performance data associated with each transaction.

In accordance with another aspect of the invention, the reports server generates reports which indicate the performance of the transactional server separately for the various operator-specified attributes. Using this feature, the user can, for example, view and compare the performance of the transactional server as seen from different operator-specified locations (e.g., New York, San Francisco, and U.K.), organizations (e.g., accounting, marketing, and customer service departments), ISPs (e.g., Spring, AOL and Earthlink), or other attribute type. The user may also have the option to filter out data associated with particular attributes and/or transactions (e.g., exclude data associated with AOL customers), and to define new attribute types (e.g., modem speed or operating system) for partitioning the performance data. The ability to monitor the performance data according to the operator-specified attributes greatly facilitates the task of isolating and correcting attribute-dependant performance problems.

In accordance with another aspect of the invention, the performance data is monitored substantially in real-time (preferably by the controller) to check for any user-defined alert conditions. When such an alert condition is detected, a notification message may be sent by email, pager, or other communications method to an appropriate person. The alert conditions may optionally be specific to a particular location, organization, ISP, or other attribute. For example, a system administrator responsible for an Atlanta branch office may request to be notified when a particular problem (e.g., average response time exceeds a particular threshold) is detected by computers in that office. In the preferred embodiment, upon receiving an alert notification, the administrator can use a standard web browser to access the reports server and view the details of the event or events that triggered the notification.

In accordance with another aspect of the invention, the agent computers may be programmed to capture sequences of screen displays during transaction execution, and to transmit these screen displays to the reports server for viewing when a transaction fails. This feature allows the user to view the sequence of events, as "seen" by an agent, that led to the error condition.

In accordance with another feature of the invention, an agent computer may be programmed to launch a network monitor component when the path delay between the agent computer and the transactional server exceeds a preprogrammed threshold. Upon being launched, the network monitor component determines the delays currently being experienced along each segment of the network path. The measured segment delays are reported to personnel (preferably through the reports server), and may be used to detect various types of network problems. In accordance with another aspect of the invention, one or more of the agent computers may be remotely programmed to scan or crawl the monitored web site periodically to check for broken links (links to inaccessible objects). When broken links are detected, they may be reported by email, through the reports server, or by other means.

In accordance with another aspect of the invention, an agent computer may be programmed to measure time durations between predefined events that occur during transaction execution. The measured time durations are preferably reported to a centralized database, and may be used to display a break down of time involved in execution of the transaction into multiple components, such as, for example, network time and server time. Other time components that may be calculated and displayed include DNS resolution time, connection time, client time, and server/network overlap.

In accordance with another aspect of the invention, a server agent component is configured to monitor server resource utilization parameters concurrently with the monitoring of transaction response times, or other response times, by a client-side. The server agent component is preferably located local to the monitored transactional server. The performance data generated by the client and server agents is aggregated in a centralized database that is remotely accessible through a web reports server. The reports server provides various user-configurable charts, tables and graphs displaying the response times and server resource utilization parameters, and provides functions for facilitating an evaluation of whether a correlation exists between changes in the response times and changes in values of specific server resource utilization parameters. Using this feature, a user can identify the server-side sources of performance problems seen by end users.

In accordance with another aspect of the invention, a root cause analysis (RCA) system is provided that automatically analyzes performance data collected by agents to locate performance degradations, and to identify lower level parameters (such as server resource parameters) that are correlated with such degradations. In a preferred embodiment, the RCA system analyzes the performance data to detect performance or quality degradations in specific parameter measurements (e.g., a substantial increase in average transaction response times). Preferably, this analysis is initially performed on the measurement data of relatively high level performance parameters—such as transaction response times—that indicate or strongly reflect the performance of the transactional server as seen by end users.

To evaluate the potential sources or causes of a detected performance degradation, a set of predefined dependency rules is used to identify additional, lower level parameters (e.g., network response time, server time, DNS lookup time, etc.) associated with specific potential causes or sources of the performance degradation. The measurements taken over the relevant time period for each such lower level parameter are analyzed to generate a severity grade indicative of whether that parameter likely contributed to or is correlated with the higher level performance degradation. For instance, the RCA process may determine that "server time" was unusually high during a time period in which the performance degradation occurred, indicating that the server itself was the likely source of the degradation in end user performance. This process may be preformed recursively, where applicable, to drill down to even lower level parameters (such as specific server resource parameters) indicative of more specific causes of the performance degradation.

The results of the RCA analysis are preferably presented in an expandable tree in which collections of related measurements are represented by nodes, and in which parent-child relationships between the nodes indicate predefined dependencies between performance parameters. The nodes are color coded, or otherwise displayed, to indicate performance or quality levels of the respective sets of measurements they represent. The tree thus reveals correlations between performance degradations in different parameters (e.g., server time and CPU utilization) allowing users to efficiently identify root causes of performance problems.

BRIEF DESCRIPTION OF THE DRAWINGS

A distributed monitoring tool and associated methods that embody the various inventive features will now be described with reference to the following drawings:

FIG. 31 illustrates an example Webtrace Analysis screen according to one embodiment of the invention.

DETAILED DESCRIPTION OF PREFERRED EMBODIMENTS

Various inventive features will now be described with reference to a distributed monitoring tool and service for monitoring transactional servers. Although these features are described as part of a common monitoring system, those skilled in the art will recognize that many of these features can be practiced or used independently of others. In addition, the inventive features can be implemented differently than described herein, and/or within a different type of system (such as a load testing tool or service). Accordingly, the following description is intended only to illustrate certain embodiments of the invention, and not to limit the scope of the invention. The scope of the invention is defined only by the appended claims.

Throughout the following description, it will be assumed that the transactional server being monitored is a web-based system that is accessible via the Internet. It will be recognized, however, that the inventive methods and features can also be used to monitor other types of transactional servers and devices, including those that use proprietary protocols or are accessible only to internal users of a particular organization. For example, the underlying methodology can also be used to monitor internal intranets, two-tier client/server systems, SAP R/3 systems, and other types of distributed systems.

The description of the preferred embodiments is arranged within the following sections and subsections:

I. OVERVIEW
II. TERMINALOGY
III. ARCHITECTURE AND GENERAL OPERATION
IV. CONTROLLER UI AND SESSION SETUP
V. PERFORMANCE REPORTS
VI. DATA FLOW AND DATABASE CONTENT
VII. ADDITIONAL FEATURES FOR DETECTING AND REPORTING PROBLEMS
VIII. ADDITIONAL FEATURES FOR DETERMINING THE SOURCE OF DETECTED PROBLEMS
   A. TRANSACTION BREAKDOWN
   B. SERVER RESOURCE MONITORING
   C. DETERMINATION OF NETWORK HOP DELAYS
   D. AUTOMATED ROOT CAUSE ANALYSIS OF PERFORMANCE DATA
     1. RCA SYSTEM USER INTERFACE
     2. ARCHITECTURE AND GENERAL OPERATION
     3. ROOT CAUSE ANALYSIS METHODS
       a. MEASURING AND GRADING THE MEASUREMENT VALUES
       b. EXPANDING THE EVALUATION OF SUB-METRICS
     4. AUTOMATED RECONFIGURATION OF TRANSACTIONAL SERVER

I. Overview

Figure 1:
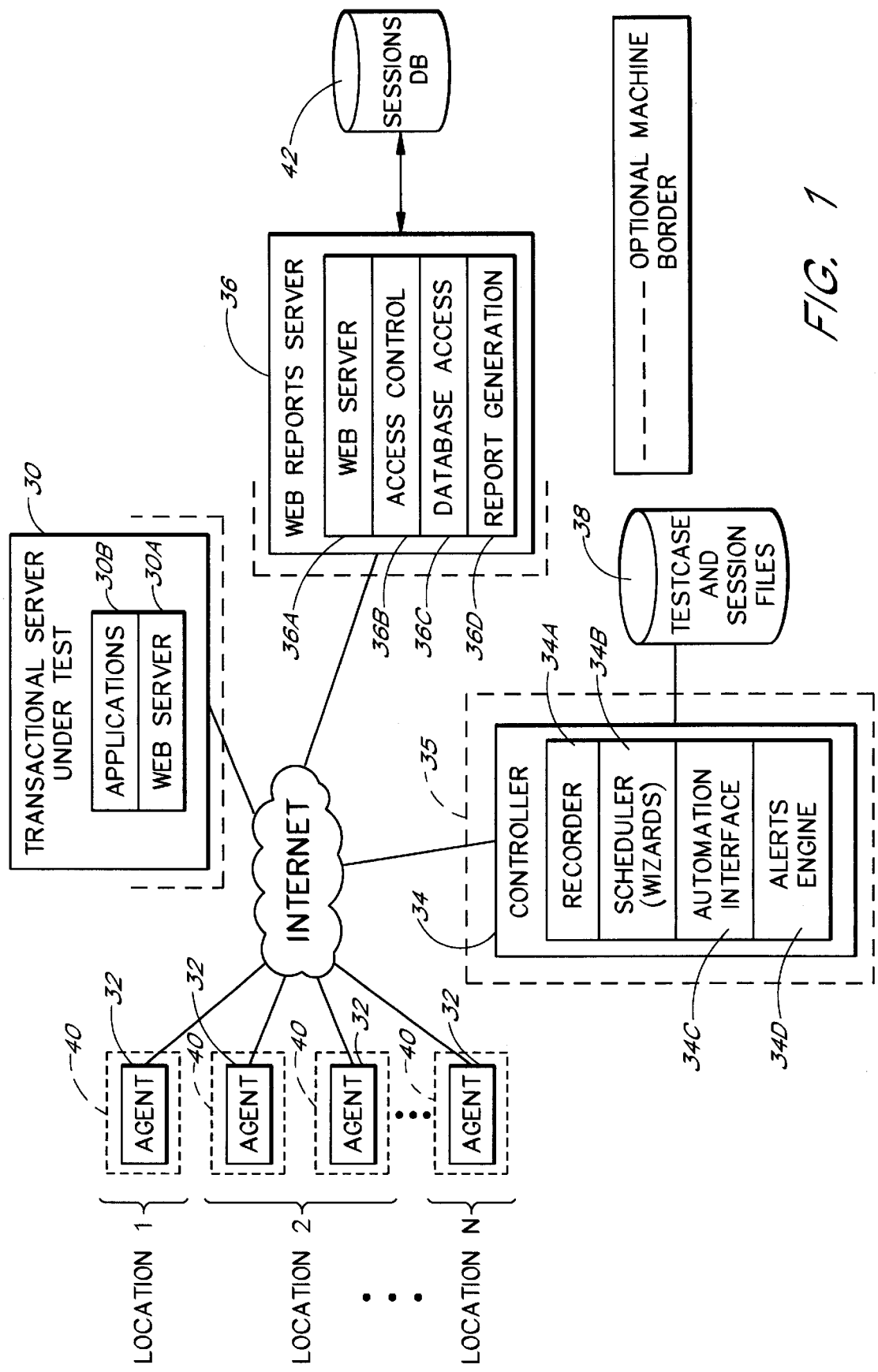
FIG. 1 illustrates the general architecture of the monitoring tool, and illustrates how the monitoring tool may be used to monitor the performance of a web-based transactional server.

FIG. 1 illustrates the general components of the distributed monitoring tool, and illustrates how these components may be deployed within a network to test and monitor a web-based transactional server 30. Dashed lines in FIG. 1 indicate typical machine boundaries, with open boxes indicating one or more machines. As depicted by FIG. 1, the transactional server 30 typically includes a web server component 30A and one or more applications 30B. The applications may, for example, provide functionality for implementing one or more business processes, such as setting up a user account or placing an order. The applications 30B typically provide user access to one or more back-end databases (not shown). The transactional server may include multiple machines, including machines that are geographically remote from one another.

As further depicted by FIG. 1, the monitoring tool consists of three primary software components: an agent 32, a controller 34 and a web-based reports server 36. Each component 32, 34, 36 includes one or more executable files or modules stored within a computer-readable medium.

The agent 32 includes the basic functionality for simulating the actions of users of the transactional server 30 while monitoring and reporting server performance. As illustrated in FIG. 1, the agent 32 is preferably installed on multiple Internet-connected host computers 40 (PCs, workstations, etc.) so that the end user experience can be captured from multiple locations. These host computers 40 may advantageously include computers that are owned or controlled by the operator of the transactional server 30. For example, the operator of the transactional server can install the agent component on selected computers within each of the departments or organizations from which the transactional server is frequently accessed, including computers of actual end users.

For convenience, the computers 40 that host the agent 32 will be referred to as "agent computers," and a computer 35 that hosts the controller 34 will be referred to as a "controller computer." It should be understood, however, that a single computer could host two or more of the tool's components 32, 34, and 36, and that the functionality of the monitoring tool could be divided differently between components. In addition, the web reports server 36 and the transactional server 30 could be accessed through a common web site.

The controller 34 provides a user interface (UI) through which the operator of the transactional server can set up and initiate monitoring sessions, including distributed monitoring sessions in which the transactional server is accessed and monitored from multiple user locations. Through this UI, the user can, among other things, select the agent computers 40 to be included within a monitoring session, and assign transactions and execution schedules to such computers. The controller 34 also provides functions for specifying alert conditions, and for notifying personnel when such conditions exist. Example screens of the controller's UI are shown in FIGS. 2–12 and 16 and are described below.

The web reports server 36 provides functionality for allowing the operator to remotely monitor the operation of the transactional server 30, as measured and reported by the agent computers 40, using a standard web browser. In other embodiments, the reports server 36 could be configured to "push" the performance data, or reports generated therefrom, to a special client application for viewing. As described below, the agent computers 40 preferably report their transaction execution results (performance data) to the reports server 36 in real-time (preferably via the controller 34, which checks for predefined alert conditions), allowing operator to view the real-time status of the transactional server. The reports server 36 may optionally be implemented by a "monitoring service provider" entity that stores and provides secure access to server status data for many different transactional servers and business entities; this approach relieves the operator of the transactional server under test from having to administer the reports server 36. Alternatively, each or some of the operators of the transactional servers under test could implement their own respective reports servers 36.

Figure 15:
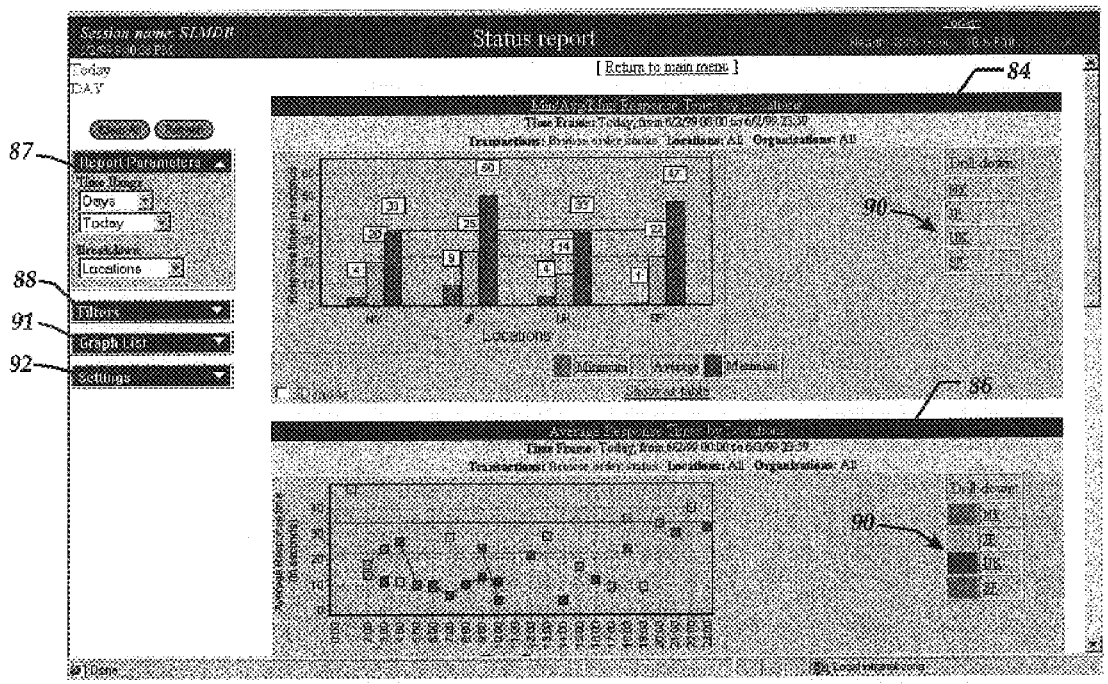

As described below, one important feature of the monitoring tool involves the ability of the user to monitor server performance according to operator-selected attributes of the agent computers 40. For example, using the reports server, 36, the user could view a graph of the average response time as measured by all agent computers in San Francisco, or by all computers that use a particular ISP. In one embodiment, the attributes of each agent computer include the computer's location, organization, and ISP, and can be assigned or modified via the user interface of the controller 34 (see FIG. 6). Other types of attributes, including user-defined attribute types, can additionally or alternatively be used. An example of a report in which performance is displayed separately for each location and transaction is shown in FIG. 15 and described below.

Another important feature involves the ability of the user to assign execution schedules to particular agent machines 40, including periodic schedules (e.g., once per hour on weekdays). Using this feature, the user can, for example, set up a monitoring session in which the transactional server 30 is proactively exercised and monitored on a continuous or near-continuous basis, and in which system administrators are notified immediately (such as by pager) as soon as an alert condition is detected.

II. Terminology

To facilitate an understanding of the invention, the following terminology will be used throughout the remaining description:

The term "distributed monitoring session" or "distributed session" refers to a monitoring session in which multiple agent computers 40 are used to monitor a transactional server 30.

The term "agent group" refers to the group of agent computers 40 included within a distributed session.

The term "agent" refers either to the agent component 32 generally, or to a particular copy or instance of the agent component running on an agent computer, depending upon the context in which the term is used.

The term "attribute" refers to a particular characteristic or property of a host or agent computer, such as the location, organization, ISP, or configuration of the computer.

The term "transactional server" refers to a multi-user system which responds to requests from users to perform one or more tasks or "transactions," such as viewing account information, placing an order, performing a search, or viewing and sending electronic mail. The term "operator" refers generally to a business entity that is responsible for the operation of the transactional server (typically the owner).

The term "testcase" refers generally to a computer representation of the transaction(s) to be performed by a particular computer to monitor a transactional server. In the preferred embodiment, the testcases include conventional test scripts (either in textual or executable form) that are "played" by the agent computers 40, although the testcases could alternatively be in other forms. Testcases may optionally include verification points that are used to test server functionality.

The terms "parameter" and "metric" refer generally to a type or a definition of measurement.

III. Architecture and General Operation

In a preferred embodiment, the agent 32 is implemented using the commercially-available LoadRunner Virtual User (VUser) component of Mercury Interactive Corporation, and is capable of executing testcases generated using Mercury Interactive's LoadRunner, WinRunner and Astra QuickTest products. Examples of methods that may be used to generate and play testcases are described in co-pending U.S. application Ser. No. 08/949,680 (filed Oct. 14, 1997) and Ser. No. 09/337,446 (filed Jun. 21, 1999), the disclosures of which are hereby incorporated by reference. Other known programming methods for simulating user actions and monitoring server responses may be used to implement the agent 32; in addition, application-specific hardware could be used to perform some or all of the agent's functions.

The agents 32 may run on any type of computer 40 capable of accessing the transactional server 30. For example, the agents 32 may run on dedicated agent computers set up by a monitoring service provider, on computers owned by the owner or operator of the transactional server, on computers of end users of the transactional server, or on a combination thereof. In one embodiment, the agent 32 is installed on the agent computers 40 prior to initiation of monitoring sessions. Once installed, the agent can receive testcases and execution schedules from the controller 34 over the Internet or other TCP/IP based network via API calls. Alternatively, the agents 32 may be installed automatically by the controller 34 when a monitoring session is initiated. For example, the controller 34 could dispatch an agent 32 and a testcase (optionally as a single executable component) to each machine in the agent group, and the agents 32 could automatically delete themselves following testcase execution. Each agent 32 can preferably simulate the actions of multiple users.

Preferably, the agent group is selected so as to encompass a representative cross section of client attributes. For example, one or more agent computers 40 may be selected within each geographic area and/or department from which significant user activity is expected to originate.

In addition, a monitoring service provider entity, such as the entity that operates the reports server 36, may set up Internet hosts with various attributes (e.g., in various geographic locations, with a variety of different ISPs, etc.) and make such hosts available to its customers as agent computers 40. Such host computers are preferably provided by the service provider with the agent 32 pre-installed, and are configured to monitor multiple transactional servers (and thus service multiple operators) concurrently. This method is especially useful where the operator of the transactional server 30 would not otherwise have access to client computers with attributes of typical end users. For example, an operator of an electronic commerce Web site may not have access to host computers within the various countries or regions from which purchases are made. The method also relieves the operator of the burden of setting up and administering the agent computers 40.

Where the agents 32 run on computers provided by a monitoring service provider, each such computer may, but need not, be physically located in the end-user location from which it monitors response times. For example, an agent computer 40 can reside within a data center in one location, and have a dedicated connection to an Internet point-of-presence (PoP) in a remotely located end-user location; this approach is described in U.S. application Ser. No. 09/531,821 (filed Mar. 21, 2000), the disclosure of which is hereby incorporated by reference. Further, a community-based resource sharing system may be used to allow users to monitor their web sites from the computers of other community members, as described in U.S. application Ser. No. 09/659,476 (filed Sep. 11, 2000), the disclosure of which is hereby incorporated by reference.

Further, rather than using agents that execute transactions, passive agents may be used to monitor interactions between actual end-users and the transactional server 30. For example, a passive agent may be installed in selected end-user locations on a network, as described in U.S. application Ser. No. 09/664,264 (filed Sep. 18, 2000) and counterpart PCT publication WO 01/20918 A2, the disclosures of which are hereby incorporated by reference. Further, a passive agent may be incorporated into pages of the web site to be monitored, such that the agent is downloaded and executed whenever the page is viewed.

As illustrated in FIG. 1, the controller 34 preferably includes or interoperates with a recorder 34A that provides functions for recording and editing transactions to be included within testcases. In a preferred embodiment, any one or more of the above-mentioned products of Mercury Interactive Corporation may be used as the recorder 34. Rather than recording new testcases, the user may optionally re-use testcases or testcase scripts that were created for pre-deployment testing of the transactional server 36. Other existing tools and testcase generation methods could be used to generate the testcases.

The controller 34 also includes a scheduler component 34B that is used to set up monitoring sessions. The scheduler 34B is preferably implemented using one or more "wizards" that step the user through the process of selecting agent computers, specifying the transactions to be performed by such computers, assigning execution schedules to the agent computers, and specifying criteria for generating alert events and notifications. Example screen displays provided by the scheduler 34B are included in FIGS. 3–12 and are discussed below.

The controller 34 also includes an automation interface 34C that provides methods for controlling the operation of the agents 32, including dispatching testcases and execution schedules to the agents. In a preferred embodiment, the automation interface is implemented using the LoadRunner 6.0 automation interface available from Mercury Interactive Corporation. The controller 34 further includes an alerts engine 34D that monitors some or all of the performance data generated by the agents 32 in real-time to check for user-defined alert conditions. Using the scheduler 34B, the alerts engine 34D can be configured to notify an operator of alert conditions by an appropriate communications method such as pager, cellular telephone, or email. For example, the alerts engine can be configured to page a system administrator whenever the average response time of the transactional server exceeds a certain threshold, or when the transactional server becomes inaccessible from any location or organization. The alerts engine 34D can also generate notifications that are based on the content (e.g., expected text strings or values) returned by the transactional server.

As depicted in FIG. 1, the controller 34 stores various test control data in local storage 38. The test control data typically includes testcase files (script files and related data files) for pre-recorded transactions, and session files that specify the various monitoring sessions that have been created.

As indicated above, the reports server 36 provides online, web-based access to the testcase execution (performance) data reported in real-time by agents 32. As depicted in FIG. 1, the performance data for the ongoing distributed sessions is stored within a central, "sessions" database 42, which is an ODBC compliant database in the preferred embodiment. One possible schema of this database 40 is described below. As depicted by FIG. 1, the components of the reports server 36 preferably include a web server 36A such as Microsoft Internet Information Server (IIS), an access control layer 36B which restricts access to the sessions database 42, a database access layer 36C, and a report generation component 36D. The database access layer 36C is implemented using a set of Active Server Pages (.ASP files) that use MDAC (Microsoft Data Access Components) to communicate with the sessions database 42. The ASP pages include an administration page (not shown) that can be accessed by users with administrator privileges to perform such tasks as adding new end users to the database 42.

The report generation component 36D is implemented using Microsoft ActiveX Data Objects (ADO), which provides functions for generating dynamic web pages. The dynamic web pages includes various pre-defined graphs and charts (see FIGS. 13–16) that are used to build customized, web-based reports. The reports server 36 could also be configured to disseminate the reports by email, fax, a push protocol, or other communications method.

IV. Controller UI and Session Setup

Figure 2:
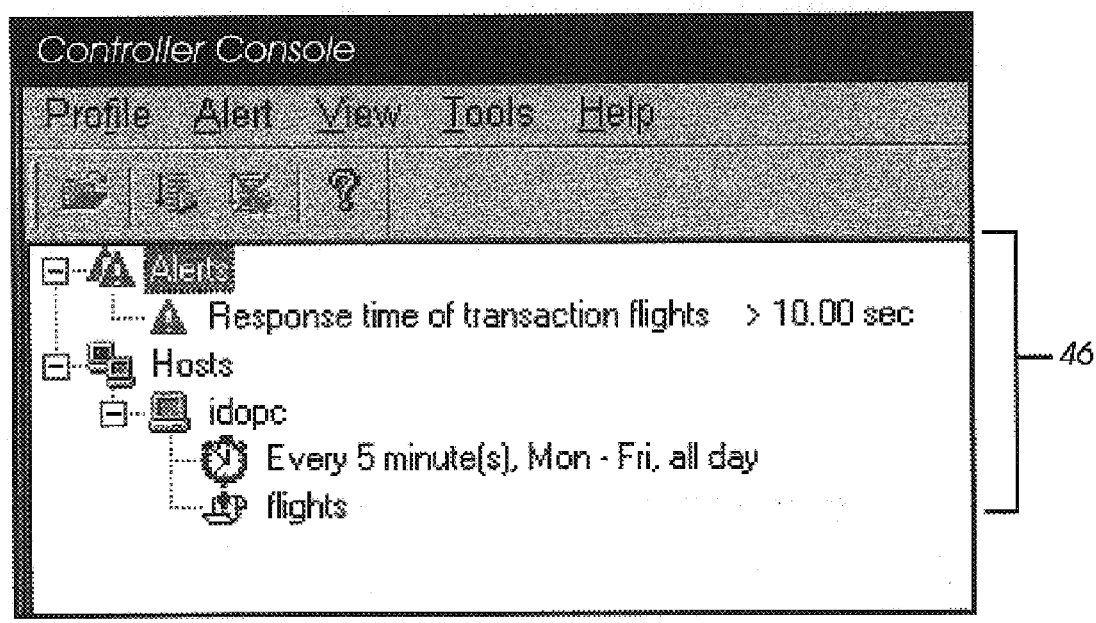
FIG. 2 illustrates a main user interface screen of the controller depicted in FIG. 1.
Figure 16:
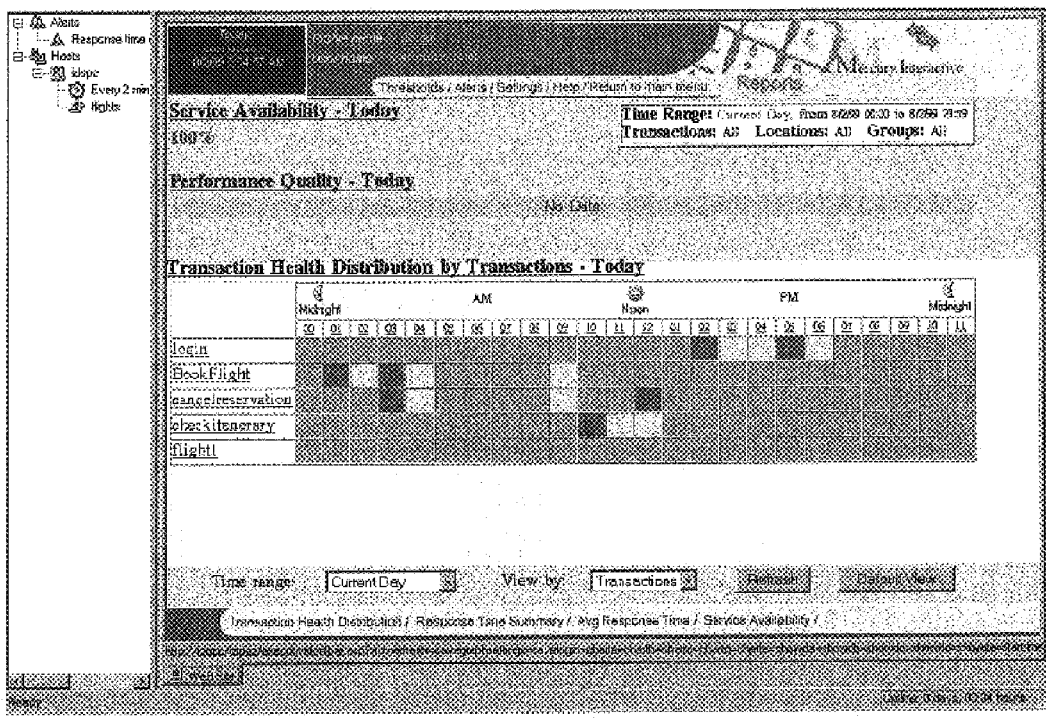

FIG. 2 illustrates the main screen or console for a preferred embodiment of the controller 34, with an example monitoring session (also referred to as a "profile") open and displayed in the tree window. The details of the monitoring session are graphically presented to the user as an expandable session tree 46 which shows the agent (host) computers, the testcase execution schedules assigned to each agent computer, and the transactions assigned to each agent computer. The session tree also shows any alert conditions that have been defined. In the simple example shown in FIG. 2, the monitoring session uses a single agent computer, "idopc," which has been assigned a single transaction "flights" and an execution schedule of "Every 5 minutes, Monday–Friday, all day." The monitoring session includes a single alert under which an alert event will be triggered if the response time of the transaction "flights" exceeds 10 seconds. The expandable tree can advantageously be used to edit a monitoring session through drag-and-drop and other standard functions provided by the Windows operating system. As illustrated in FIG. 16, the controller's UI also provides a browser window through which a user can view report pages from the reports server 36.

The controller's menu, the top level of which is shown in FIG. 2, provides functions for performing various session-related tasks, including launching the Setup and Alerts Wizards (described below), opening and editing an existing monitoring session, starting and stopping monitoring sessions, specifying the address of the reports server 36 to be used with a monitoring session, clearing the contents of the database 42, and specifying settings for sending alert notifications.

Figure 3:
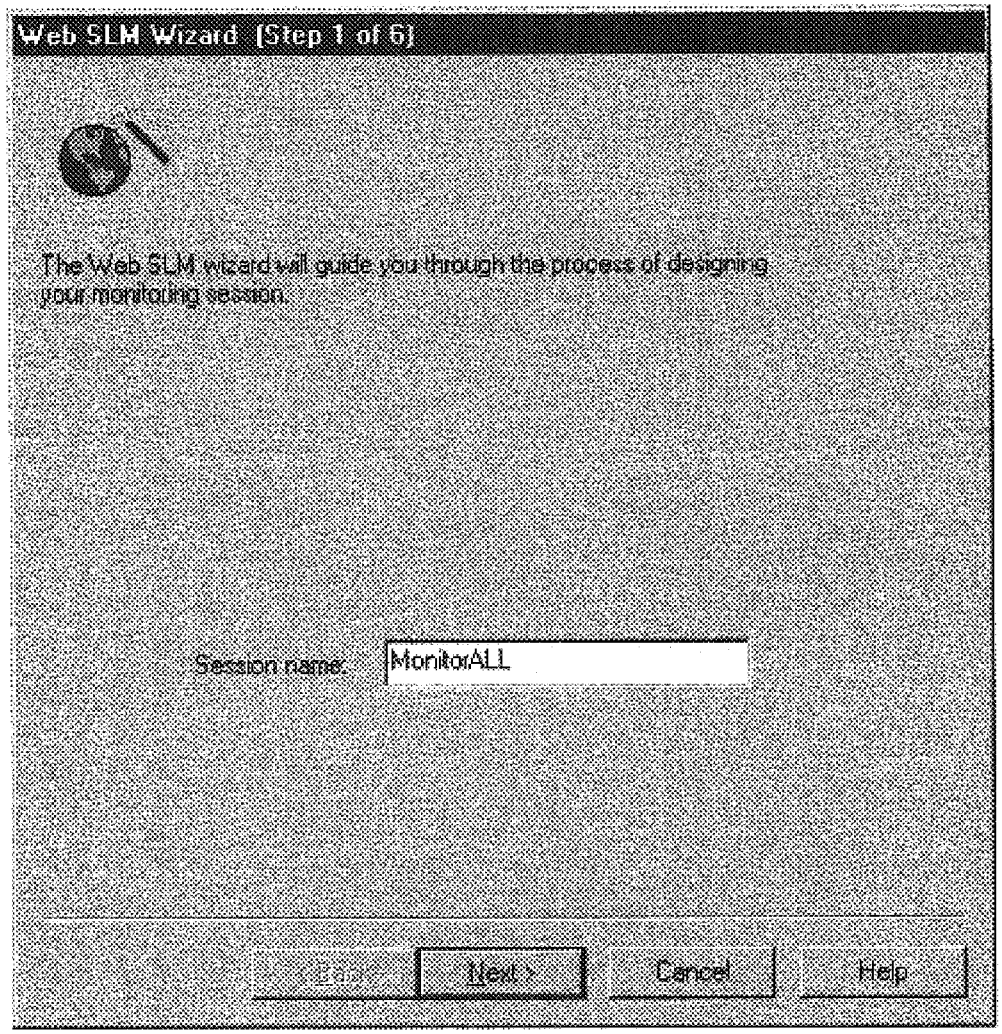
FIGS. 3–9 illustrate the controller's Setup Wizard screens that are used to set up monitoring sessions.
Figure 4:
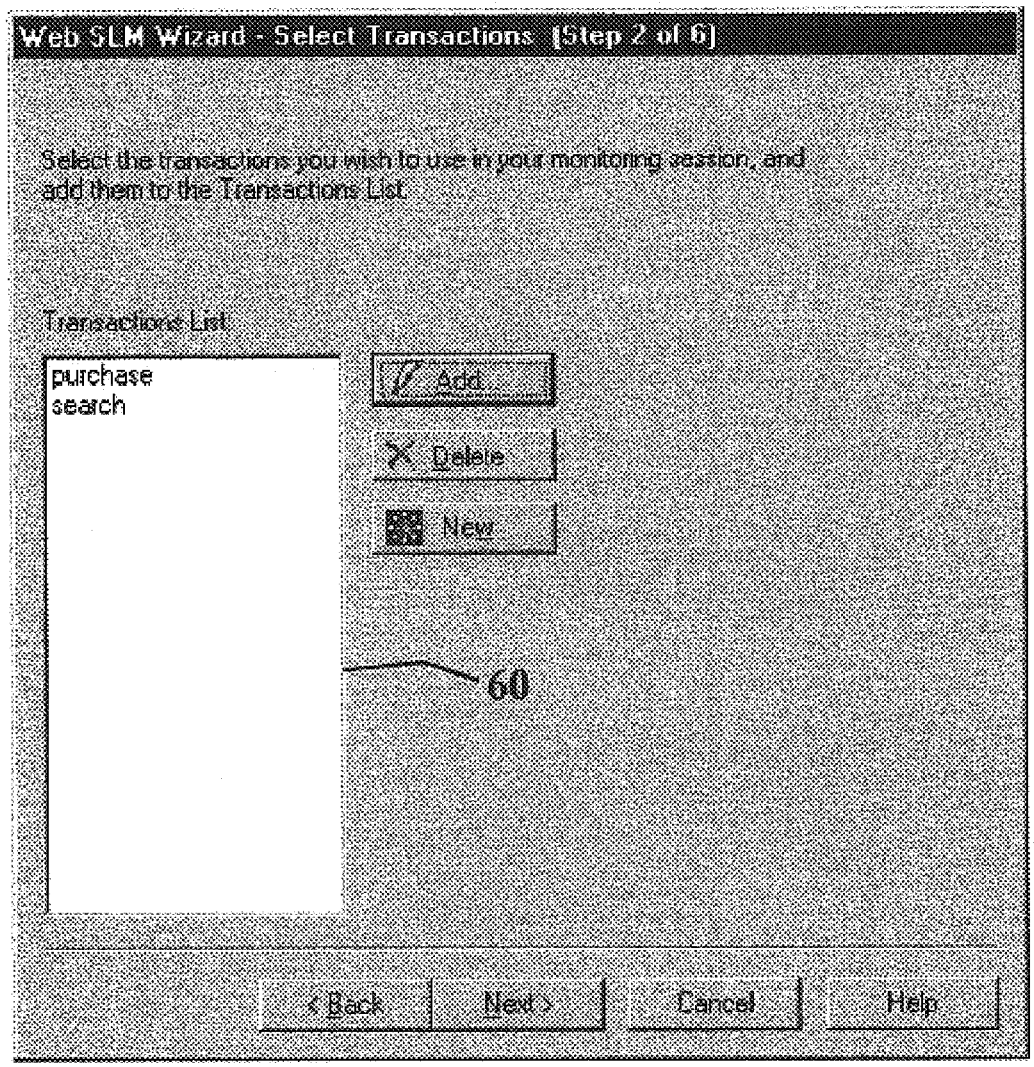

To create a new monitoring session, the user selects PROFILE/NEW, which causes the controller 34 to launch a Setup Wizard (FIGS. 3–9). As illustrated by FIG. 3, the user is initially prompted to specify a session name. The session name provides a mechanism for later retrieving or viewing the reports for a particular monitoring session. As illustrated in FIG. 4, the user is then presented a "Select Transactions" screen for specifying the previously-generated transactions to be included within the monitoring session. The user can also use the NEW button to launch the recorder 34A and record a new transaction. The transaction may include a single URL request or multiple URL requests, including URL requests with data submissions (e.g., HTTP POST requests). The transactions may optionally include verification points that specify expected server responses, such as particular values or text strings within web pages. Alternatively, the transactions may stress the transactional server without verifying the content of the server responses. As described below, the user can later assign specific transactions, or sets of transactions, to specific agent computers 40, and can monitor the performance of the transactional server on a transaction-by-transaction basis.

In the preferred embodiment, the user can freely define what constitutes a "transaction" for monitoring purposes. For example, the user can start recording a user session, record any number of user interactions with the server (form submissions, page requests, etc.), stop recording, and then store the result as a transaction under a user-specified name (e.g., "browse catalog"). In addition, during subsequent editing of the transaction, the user can optionally divide the transaction into multiple smaller transactions or make other modifications. The transactions can also include accesses to multiple web sites. Preferably, the transactions are defined by the user with sufficient granularity to facilitate identification of performance bottlenecks. For example, the user may wish to create a separate transaction for each of the primary applications deployed on the transactional server 30 so that each such application can be monitored independently.

The transactions included within the session may optionally include special non-destructive or "synthetic" transactions that do not change the state of the transactional server 30. If destructive transactions are used, the transactional server 30 may optionally be configured to handle such transaction in a special, don-detructive manner. This may be accomplished, for example, by setting up dummy accounts for monitoring purposes. In addition, where appropriate, the transactional server 30 may be preprogrammed to roll back its databases, or to otherwise ignore the transaction, when a particular dummy account, credit card number, username, or other unique element is used.

Figure 5:
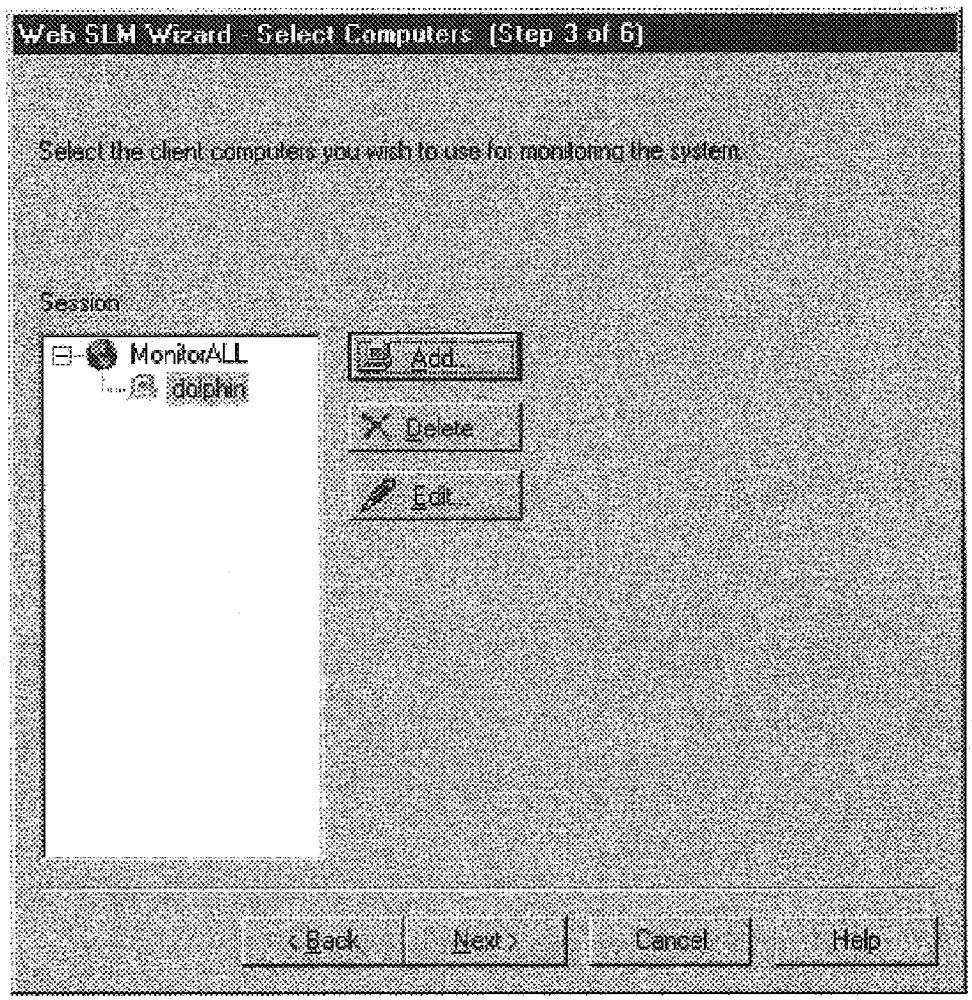

As illustrated by the "Select Computers" screen in FIG. 5, the next step in the setup process involves selecting the computer or computers to be included in the agent group. By selecting the ADD button from this screen, the user can view and select from a standard Windows NT® tree view of the host computers that are available for use. In one embodiment, the tree view displays only those computers on which the agent 32 is installed. In another embodiment, the tree view also lists computers that do not have the agent 32 stored thereon, and provides an option for the user to remotely install the agent on such computers. As indicated above, the computers that are available for use may optionally include computers that are made available by a monitoring service provider; in such implementations, the Setup Wizard 34 may be configured to automatically retrieve a list of such service provider computers and their respective attributes from a special Internet host. Techniques for generating and accessing lists of available servers are well known in the art, and are therefore not described herein. The selected computers are added to the session tree 46 as respective nodes or icons.

Figure 6:
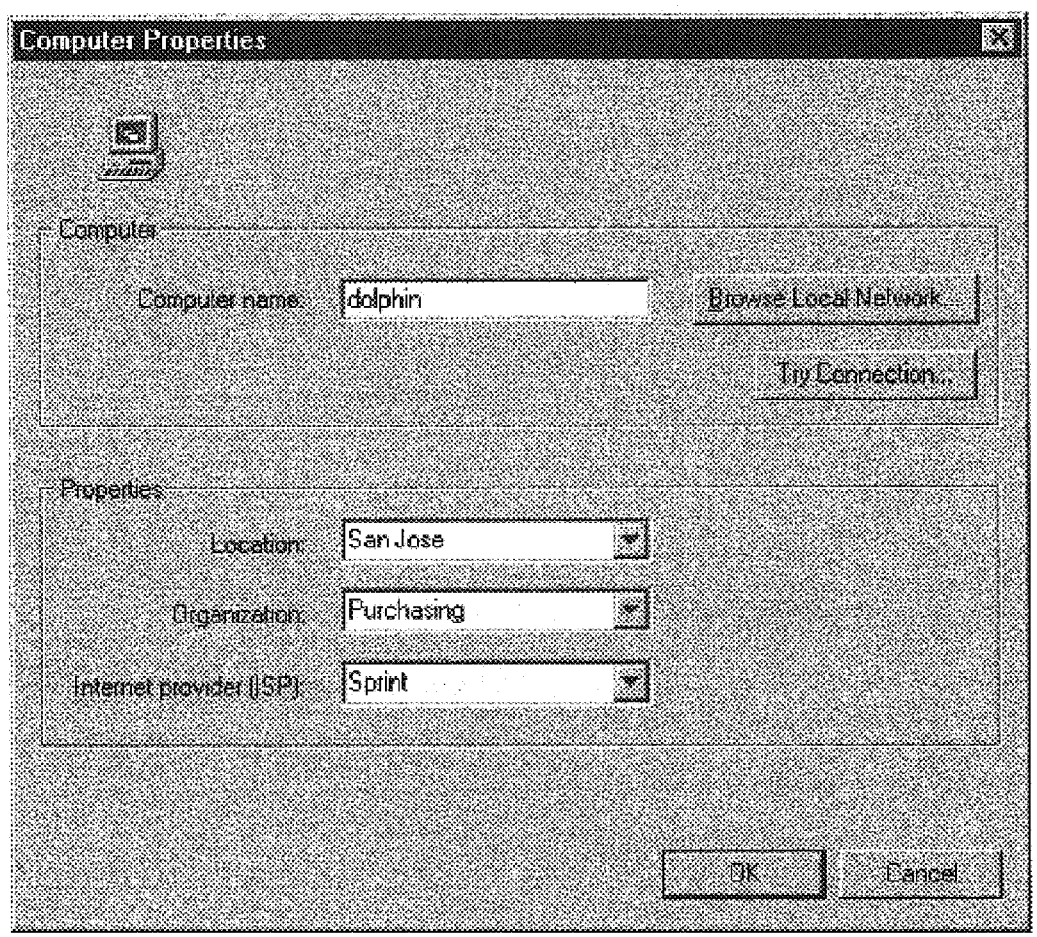

When the user selects the EDIT button (FIG. 5) with a computer selected in the session tree 46, the user is presented with a "Computer Properties" screen as shown in FIG. 6. From this screen, the user can assign various attributes (properties) to the computer or confirm previously-assigned attributes. In the illustrated example, the attribute types are the location (e.g., city), organization (e.g., accounting department), and ISP of the agent computer 40. Other pre-defined attributes types that may be provided include, for example, a group name, the computer's operating system, the router to which the computer is connected, the computer's modem or other connection speed, the computer's default web browser (particularly if the agent uses or emulates the browser), and the hardware configuration of the computer. In addition, the controller 34 and the reports server 36 may provide the user an option to create one or more user-defined attribute types, and to use such attribute types in the same manner as the pre-defined attribute types. It should be understood, therefore, that the specific attributes and attributes types shown in the figures are merely illustrative.

The attributes that are assigned to the agent computers can be used to separately view the transactional server's performance as monitored by a particular attribute group (group of computers that share a particular attribute or set of attributes). For example, the user can view a graph of the response times measured by all agent computers with the location attribute "San Jose" or the ISP attribute "Sprint." Example reports are shown in FIGS. 13–16 and are described below. The user can also generate attribute-filtered reports to exclude performance data associated with specific attributes from consideration (as described below). The ability to view and monitor performance separately for each attribute group and to generate attribute-filtered reports greatly facilitates the task of identifying attribute-specific performance problems.

Figure 7:
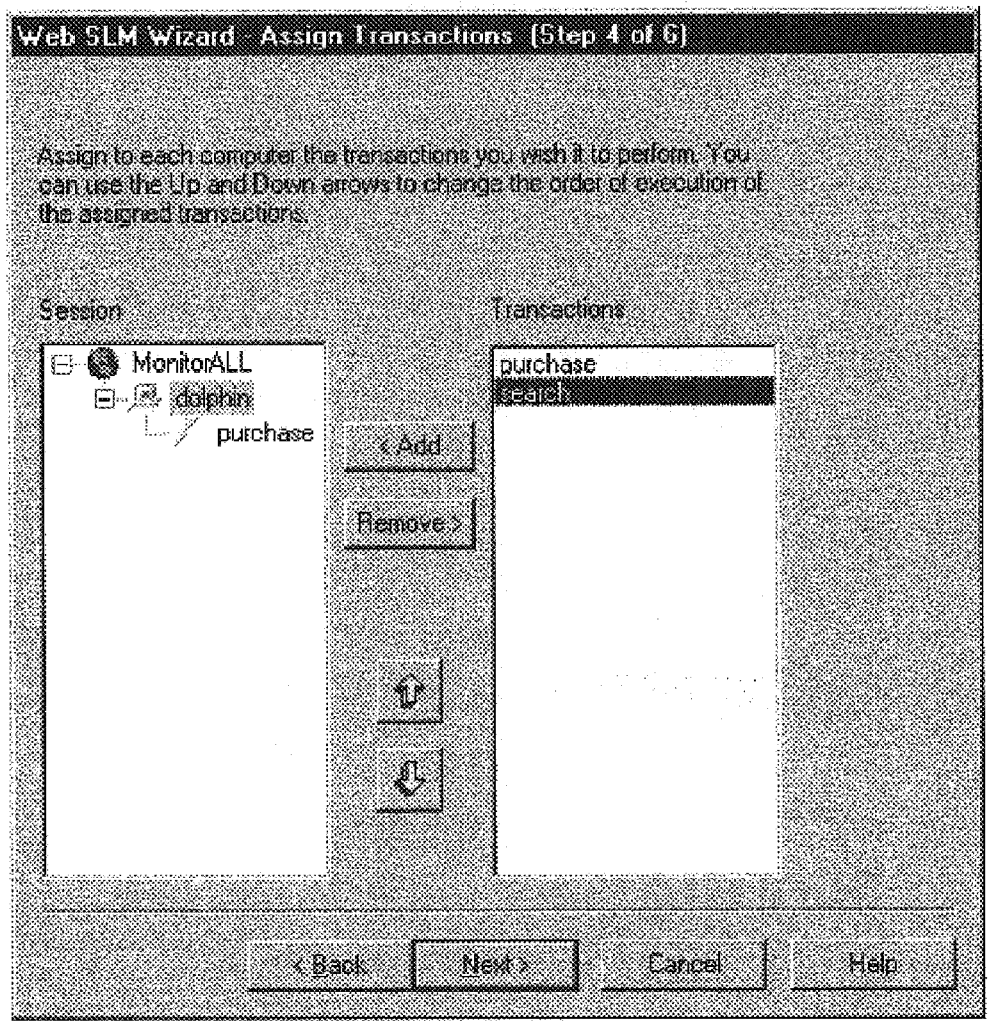
Figure 8:
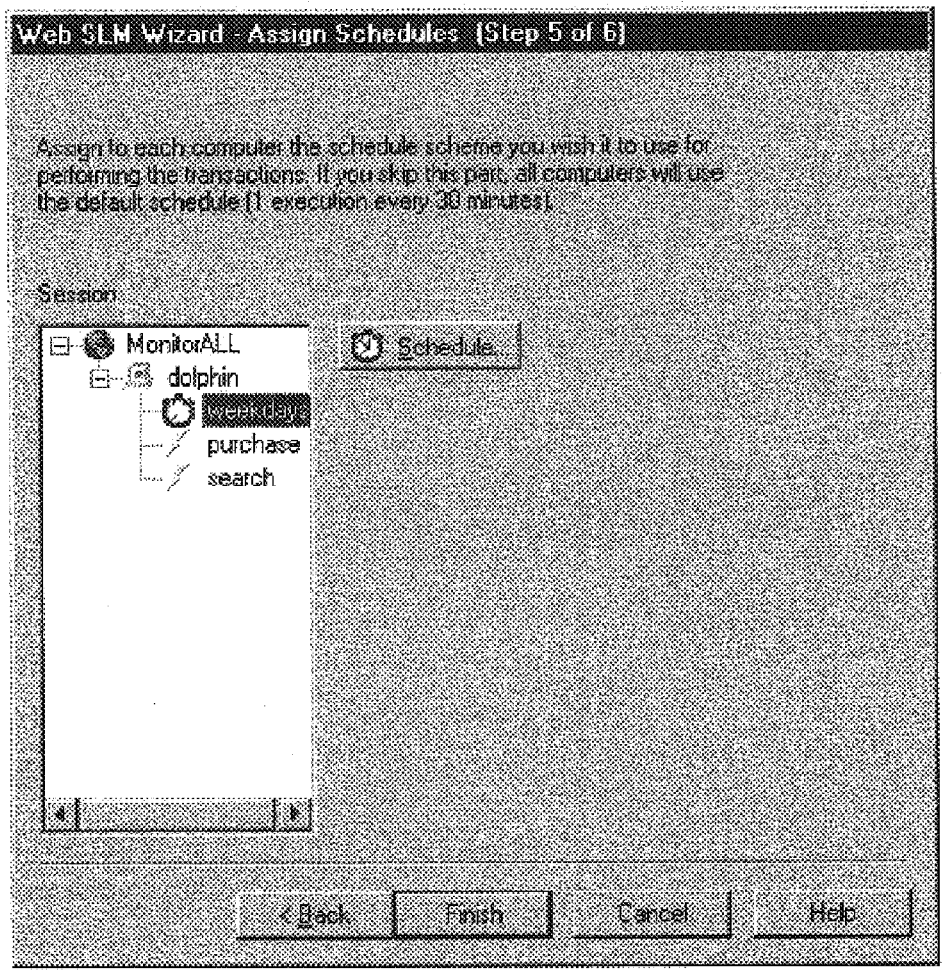

When the user selects the NEXT button from the Select Computers screen, an "Assign Transactions" screen (FIG. 7) appears. From this screen, the user can assign transactions (from the previously-created transactions list) to specific computers in the agent group. The user can also specify, for each computer, the order in which that computer is to execute the assigned transactions. As transactions are assigned to agent computers 40, the transactions are added to the session tree 46 as children of their respective computers (as illustrated in FIGS. 7 and 8 for the computer "dolphin").

Figure 9:
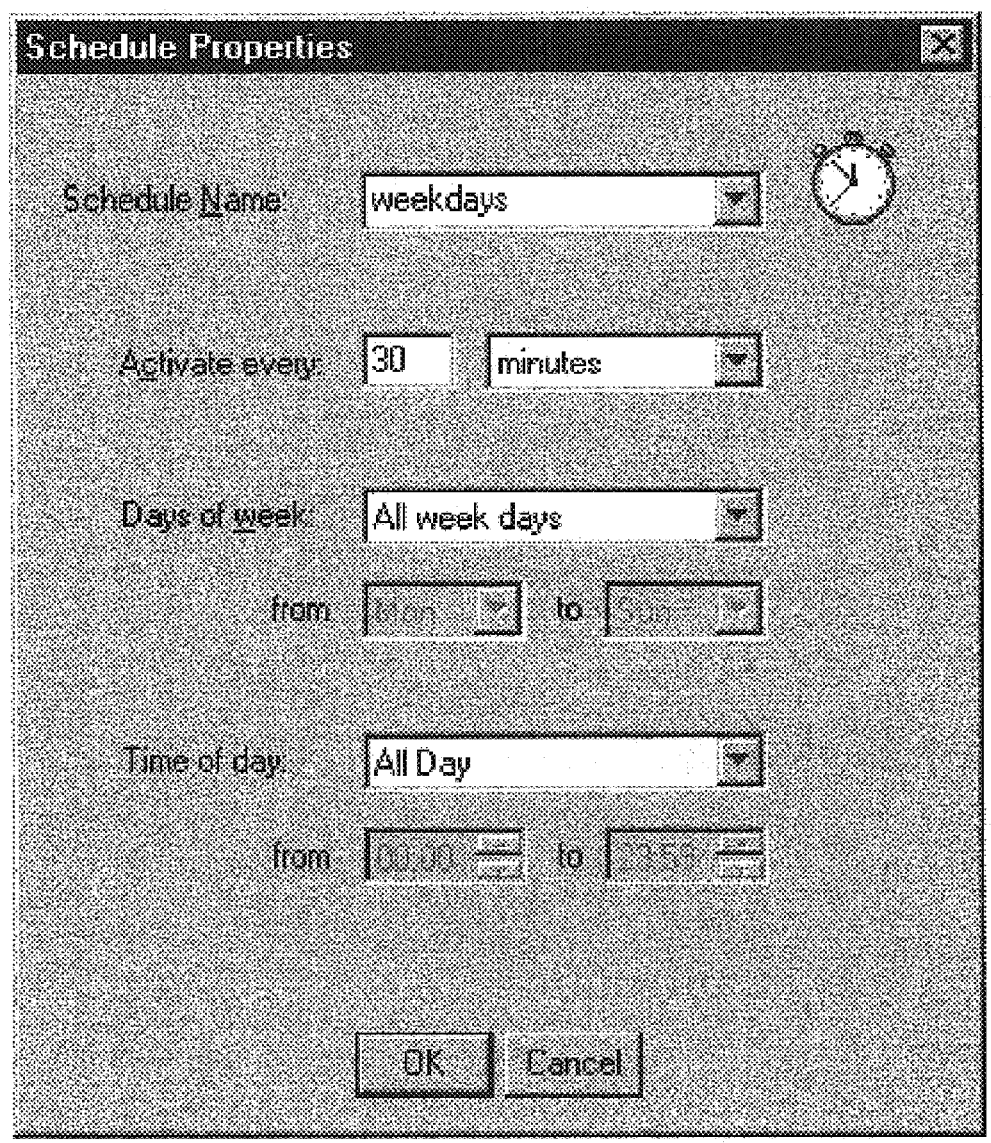

When the user selects the NEXT button from the Assign Transactions screen, an "Assign Schedules" screen appears (FIG. 8) that allows the user to assign a testcase execution schedule to each computer. When the user selects the SCHEDULE button with a computer selected in the session tree 46, a "Schedule Properties" box appears (FIG. 9). From the Schedule Properties box, the user can select a predefined execution schedule (e.g., "weekdays") to assign to the computer and/or define a new schedule. As illustrated in FIG. 9, periodic schedules may be used. The periodic schedules may optionally include pseudo-random schedules. As shown in FIG. 8, the schedules are added to the session tree 46 as children of their respective agent computers. In other embodiments, the schedules may be assigned on a transaction-by-transaction basis.

The execution schedules may be selected so as to provide continuous or near-continuous monitoring of the transactional server 30. By staggering the execution schedules so that different agent computers 40 monitor the transactional server 30 at different times, the transactional server 30 can optionally be monitored continuously (24 hours per day) or nearly continuously without using any single agent computer 40 for an extended period of time. For example, if the agent computers 40 are distributed around the globe, the schedules can be assigned so that no agent computer 40 is used for testing during employee work hours within its respective region.

The Setup Wizard may optionally provide one or more functions (not illustrated) for assisting users in setting up continuous or near-continuous monitoring sessions. For example, as the schedules are being assigned to agent computers, the wizard could automatically detect and display the "gaps" (periods of time during which the transactional server is not being monitored) in the cumulative execution schedule. The Setup Wizard could also provide an option to automatically generate an execution schedule which fills-in these gaps. In addition, a function could be provided for ensuring that at least two agent computers 40 are scheduled to execute testcases at all times, so that the failure of a single agent computer will not cause the transactional server to go unmonitored.

When the user selects the FINISH button (FIG. 8) from the Assign Schedules box, the Setup Wizard closes and the user is presented with a view of the complete session tree 46. At this point, controller 34 dispatches the testcases and execution schedules to the respective agent computers 40, and sends various session configuration data (session name, transaction identifiers, attributes of agent computers, etc.) to the reports server 36 for storage in the sessions database 42. The controller 40 also stores a representation of the monitoring session in local storage 38. The general flow of information to and from the controller computer 35 is described below with reference to the data flow drawings of FIGS. 17 and 18. Once the setup process is completed, the monitoring session continues indefinitely until halted or terminated by the user.

Figure 10:
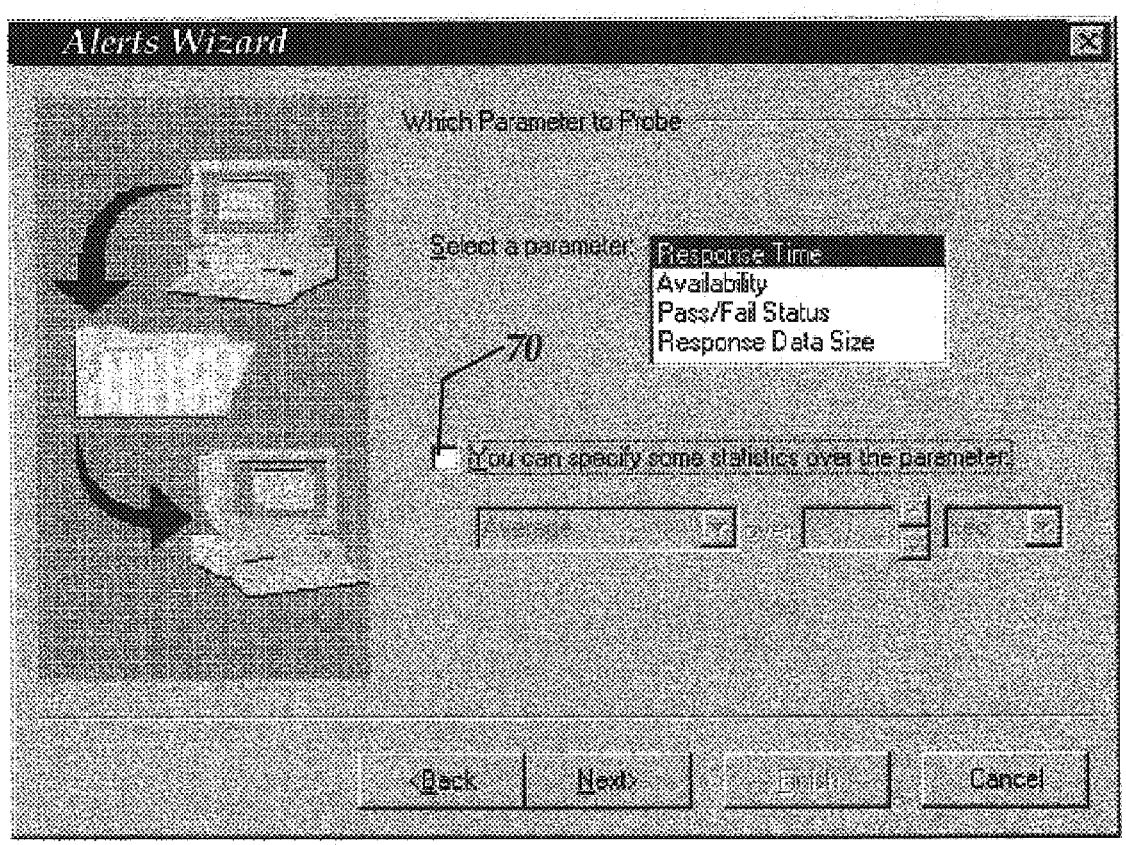
FIGS. 10–12 illustrate screens of the controller's Alerts Wizard.
Figure 11:
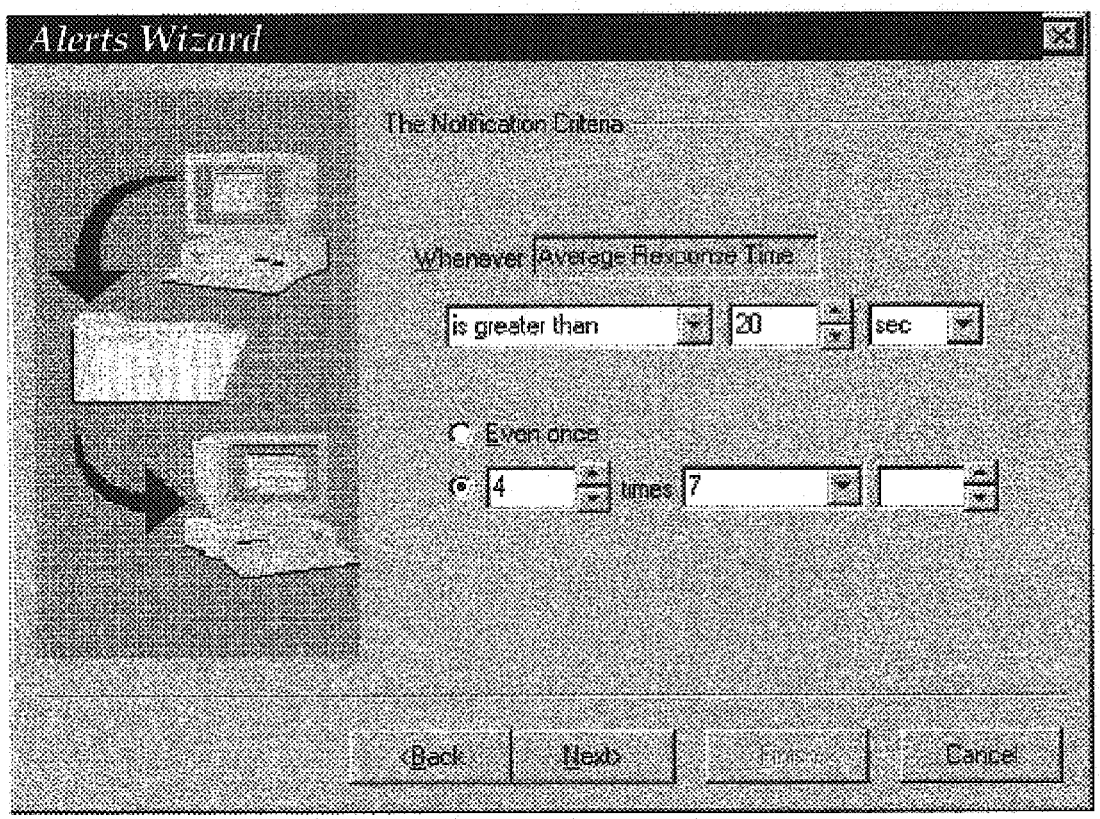
Figure 12:
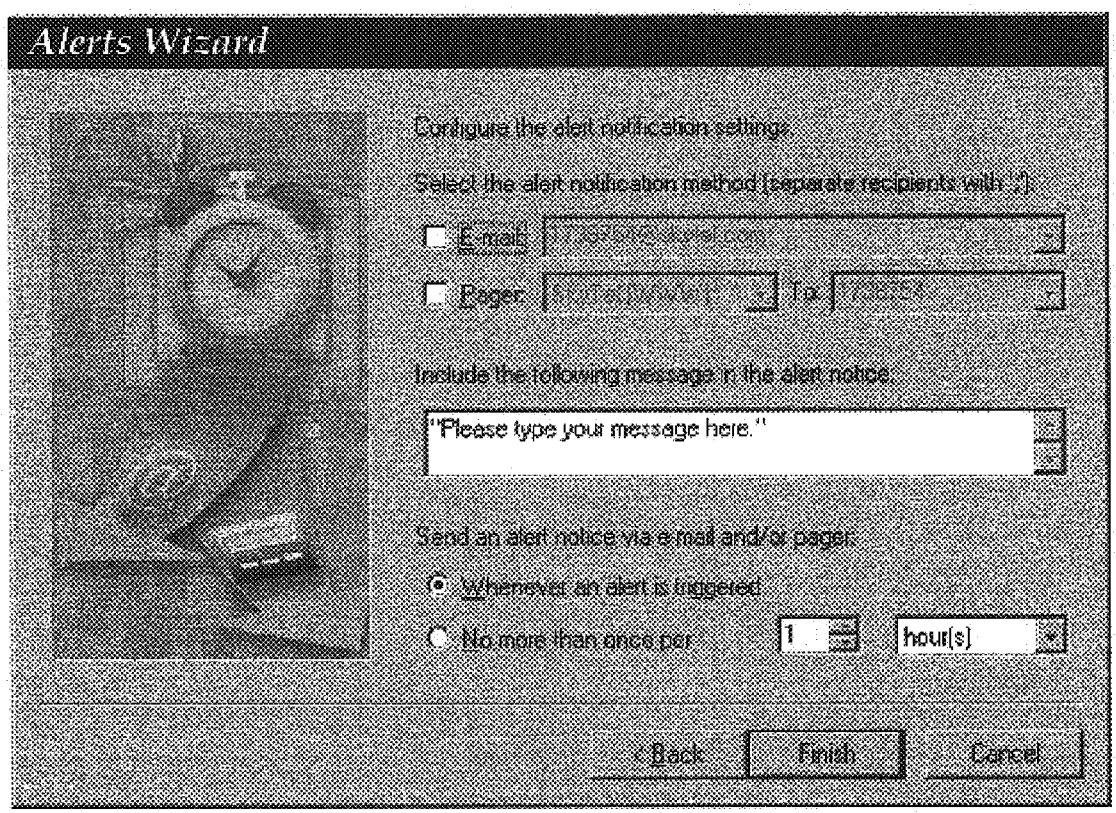

With the session open within the controller's console (FIG. 2), the user can select ALERT/ADD from the main menu to launch an Alerts Wizard (FIGS. 10–12). As illustrated by FIG. 10, the Alerts Wizard allows the user to specify one or more performance parameters to monitor in real-time for purposes of generation alerts, including response time, availability, pass/fail status, and response data size. By selecting the check box 70, the user can specify certain parameter statistics to monitor, such as the average of the parameter over a specified time frame.

As illustrated by FIGS. 11 and 12, the Alerts Wizard also provides screens for specifying notification criteria for the parameters to be monitored. In the example shown in FIG.

11, the user can request to be notified whenever the average response time exceeds a specified threshold, or exceeds the threshold with a specified frequency (e.g., 10 times per minute). As shown in FIG. 12, the user can also request to be notified by pager or email of an alert condition.

The Alerts Wizard may also provide an option (not illustrated) to be notified when certain types of transactions fail, and/or when failures are detected within particular attribute groups. Using this option, a user can request to be notified whenever a problem is detected which falls within the user's respective area of responsibility. For example, a system administrator responsible for a particular business process may be notified when a transaction that corresponds to that business process fails; to avoid being notified of general failures, this notification may be made contingent upon other types of transactions completing successfully. Other example uses of this feature include: notifying an ISP administrator when a threshold number of agent computers using that ISP are unable to access to the transactional server (optionally contingent upon the transactional server being accessible from other ISPs); and notifying a system administrator responsible for a particular office when a threshold number of agent computers 40 within that office are unable to access to the transactional server (optionally contingent upon the transactional server being accessible from other offices).

In other embodiments, the various functions of the controller 34 could be implemented in-whole or in-part by the reports server 36. For example, the above-described functions of the Alerts Wizard, and the associated functionality of the alerts engine 34D, could additionally or alternatively be implemented by the reports server 36 such that users can remotely set up and modify alert conditions. The task of checking for alarm conditions could also be performed by the agents 32.

In one embodiment, the controller 34 is hosted by an ASP (application service provider) as a service that is accessed over the Internet using a conventional web browser. Through the ASP's servers, each customer is given secure access to its respective repository of testcase and session files. The service's user interface for setting up monitoring sessions may be generally the same as shown in FIGS. 2–12, with the dialog boxes replaced by corresponding web pages. Test scripts (transactions) may be recorded using a server-side recorder, and/or may be recorded by the customer using a downloadable recorder and then uploaded to the server. The ASP, which may also operate the reports server 36 and/or the agents computers 40, may charge customers for monitoring sessions based on one or more of the following criteria, as well as others: number of transaction types monitored, number of transaction execution events, quantity of hardware resources used, and time schedule and duration of monitoring sessions. One important benefit of operating the controller 34 in this manner is that monitoring sessions can be initiated and modified from any computer that has Internet access, without the need for any special software. Another benefit is that the customer is relieved of the burden have having to install and maintain the controller software.

In embodiments in which the controller 34 is hosted as a service, the task of assigning execution schedules to the agent computers 40 may be performed by the ASP, rather than by the end user. This strategy is particularly useful where the agent computers 40 are shared by many different customers, as it allows the ASP to distribute the load across the agent computers so as to generally maximize the total number of distributed monitoring sessions that can exist concurrently. A hybrid approach is also possible in which the customer controls the execution schedules of the customer's own agent computers 40 while the ASP controls the execution schedules of the shared agent computer's that are under the ASP's control.

In yet other embodiments, the controller 34 may be hosted by a server on a private intranet, such as the intranet of the operator of the transactional server. In such configurations, the controller preferably operates the same as if hosted by an ASP, but is private to the operator.

V. Performance Reports

Figure 13:
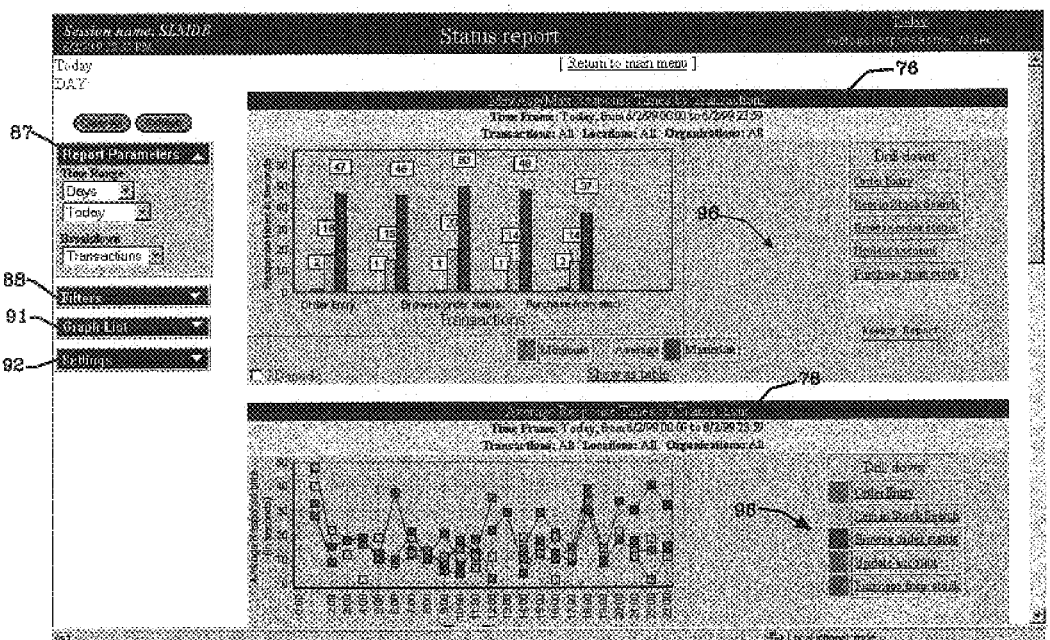
FIGS. 13–16 illustrate example status report web pages provided by the web reports server in FIG. 1, with FIG. 14 illustrating a representative "drill down" page returned when the user selects the drill down link in FIG. 13 for the "browse order status" transaction.
Figure 14:
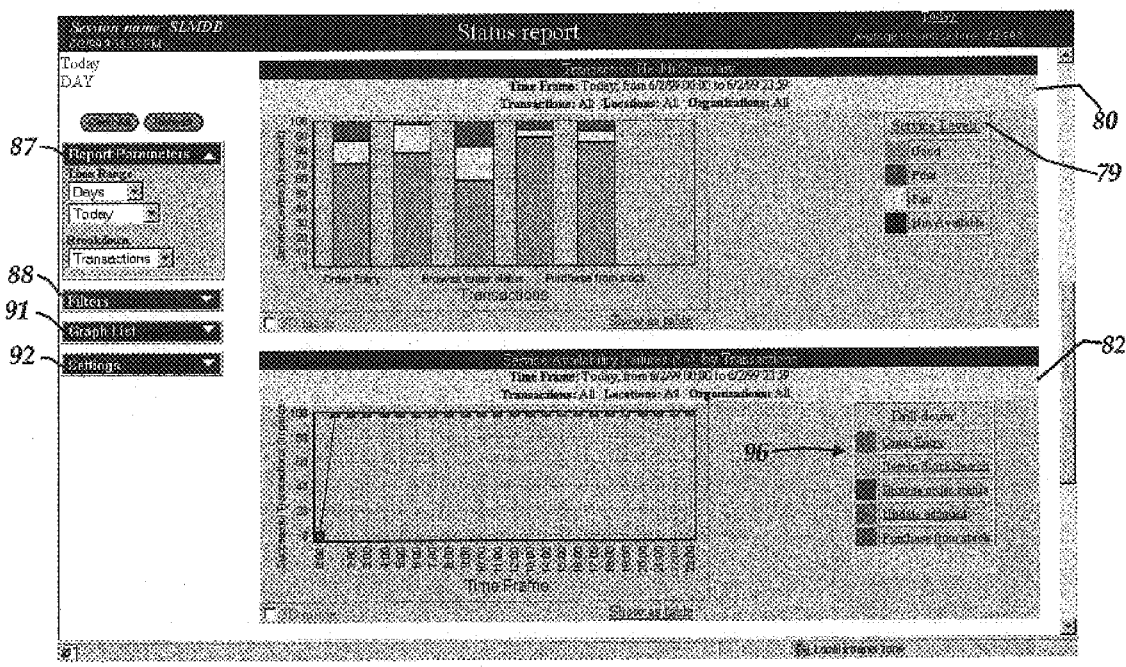

FIGS. 13–15 illustrate examples of the types of graphs or charts that may be provided by the reports server 36 to facilitate remote monitoring of the transactional server 30. The examples shown in FIGS. 13–15 illustrate a monitoring session involving five transactions: Order Entry, Item in Stock Search, Browse Order Status, Update Account, and Purchase from Stock. The transactions are being executed from agent computers 40 located in four geographic regions: New York, Japan, United Kingdom and San Francisco. More than one agent computer may be used in each such location. The names and granularities of the geographic locations can be defined by the operator during the setup process.

The graphs indicate various aspects of the transactional server's performance as monitored over a particular time frame (the current day in this example). The first graph 76 (FIG. 13) shows the minimum, average, and maximum transaction times for each of the five transactions. The second graph 78 (FIG. 13) shows the average response time for each transaction and each one-hour interval, using a color coding scheme to distinguish between the transactions. The third graph 80 (FIG. 14) shows the distribution of service levels for each of the five transactions, using a unique color for each level. The fourth graph 82 shows, for each one-hour interval and each transaction, the percentage of transactions that failed.

As illustrated in FIG. 13, the report pages preferably include various links and controls for allowing the user to generate customized and attribute-filtered views of the performance data. For example, if the user selects the "drill down" link for the "browse order status" transaction, a page appears which includes the graphs 84, 86 shown in FIG. 15. Both graphs 84, 86 shows aspects of the server response time for the Browse Order Status transaction broken down by location, as may be desirable to identify location dependent problems. The horizontal line in these graphs 84, 86 represents a user-defined alert threshold. From this page, the user can drill down an additional level (by selecting the location-specific drill down links 90) to view location-specific graphs for the Browse Order Status transaction.

With further reference to FIGS. 13–15, the "Report Parameters" window 87 allows the user to modify the time frame and/or the breakdown method used to generate the various graphs and charts. By modifying the breakdown method, the user can view the performance data separately for each transaction and for each attribute of the agent computers. In one embodiment, the performance data can be viewed by transaction (shown in FIGS. 13 and 14), by location (shown in FIG. 15), by organization (not illustrated), and by ISP (not illustrated). In other embodiments, the performance data can be broken down according to other attribute types, including attribute types defined by the operator.

The "Filters" option 88 (FIGS. 13–15) allows the user to filter the displayed information by transaction and by each of the attributes. Using this feature, the user can, for example, filter out from the reports the performance data corresponding to a particular transaction, location, organization, ISP, or combination thereof. In one embodiment (not shown), the user specifies the filter to be applied by completing a web form that includes a respective check box for each transaction and each attribute used in the monitoring session. The application of a filter, if any, is indicated by the notations at the tops of the graphs (e.g., "Transactions: All; Locations: UK, NY; Organizations: accounting, marketing").

The Graph List option 91 allows the user to specify the set of default graphs that are to appear on the main status reports page. The "Settings" option 92 allows the user to adjust and save other types of settings, such as an "auto refresh" rate (e.g., every five minutes) and a starting date/time to be used within the reports.

FIG. 16 illustrates an example "Transaction Health Distribution" chart that may be generated by the reports server 36. In this example, the chart is being viewed through the browser window of the controller's interface. The chart is in the form of a 2-dimensional matrix. The horizontal dimension represents the timeframe, which can be modified by the user over a range of hours to years. In this example, the columns represent hours of the current day (as displayed along the top of the chart), and the rows represent the transactions being monitored (as listed at the left). The cells of the matrix are color-coded to reflect the response time of the particular transaction during in the particular time frame. Each hour and each transaction is a hyperlink that, when selected, causes the view to change. For example, if the user clicks on a particular hour, the timeframe changes to just that hour with the matrix's horizontal dimension broken down into smaller (e.g., 5 or 10 minute) intervals. Similarly, when the user clicks on a transaction link, the vertical dimension changes so that the chart shows only the selected transaction, broken down according to geographical location (or possibly another computer attribute).

As will be apparent from the foregoing examples, the ability to separately view and filter the performance data based on the attributes of the agent computers, including operator-specified attributes, greatly simplifies the task of identifying attribute-specific problems. Although specific attribute types are shown in the example reports, it should be understood that the illustrated features can be applied to other types of attributes, including user assigned attribute types.

The reports server 36 also preferably provides access to an Alerts chart (not shown) which contains information about the various alert events that have occurred. For each alert event, this chart may include, for example, an alert name, a color-coded indication of the alert severity, the time of the alert event, the action taken (e.g., "email sent to admin@merc-int.com" or "logged only"), and the text of any alert message sent.

VI. Data Flow and Database Content

The general flow of information between components during the setup and execution of a typical monitoring session will now be described with reference to FIGS. 17–19.

Figure 17:
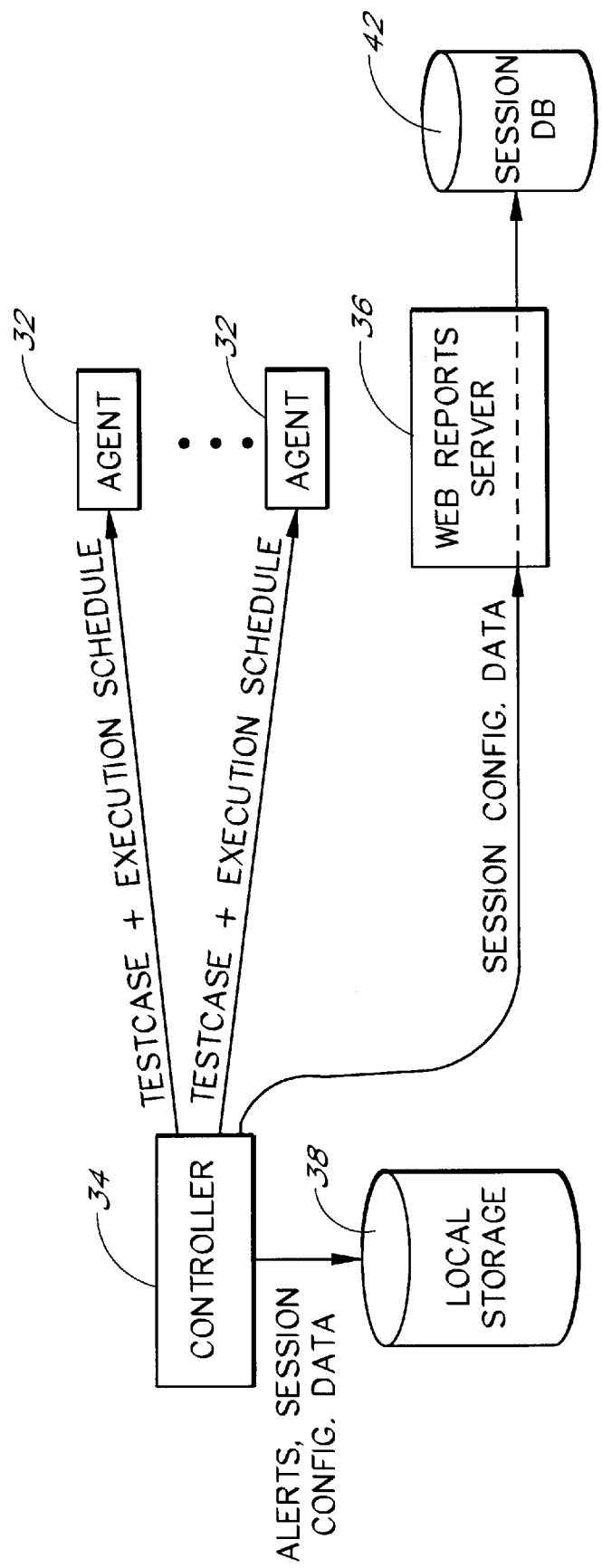
FIGS. 17–19 are flow diagrams that illustrate the flow of information between components during the setup and execution of a monitoring session.

FIG. 17 illustrates the "setup" or "programming" phase of a monitoring session. As depicted by the left-to-right arrows in FIG. 17, once the user completes the setup process, the controller 34 dispatches the testcases (transactions) and schedules to the respective agents 32. Where the agents 32 reside on remote agent computers 40, the testcases and schedules are communicated over the Internet using HTTP or another a TCP/IP based protocol via API calls. As further depicted by FIG. 17, the controller also sends session configuration data to the reports server 36 (preferably using HTTP) for storage in the sessions database 42. The configuration data includes the session name, identifiers and properties (attributes) of the agent computers 40, and identifiers and names of the transactions. Where the reports server 36 services multiple business entities, the configuration data may also include a username or other identifier of the business entity to which the session corresponds.

Table 1 summarizes, for one example embodiment, the tables that are created in the sessions database 42 for each monitoring session and used to generate the reports. Any of a variety of alternative database schemas could be used. The various metrics that are displayed in the reports (e.g., average response time over a particular window) are calculated using the data stored in the event meter table.

TABLE 1

EXAMPLE DATABASE SCHEMA

| TABLE NAME | DESCRIPTION |
| --- | --- |
| Groups | Contains the names of all agent computers and their associated properties. |
| Transactions | Contains a listing of the transactions, by name, with each assigned a numerical transaction ID. For each transaction, the table contains the thresholds used for evaluating response times (e.g., less than 20 sec. = OK, from 20 to 30 sec. = poor, etc.). |
| Status | Contains a listing of the available transaction statuses (e.g., Pass = 0, Fail = 1, etc.). |
| Ranks | Contains a listing of the threshold criteria names (e.g., 1-OK, 2 = Warning, etc.). |
| Properties | For each property defined by the user, a table is created that assigns a numerical ID to the set of members of that property (e.g., for the "organizations" table might include the entries R&D = 1, Marketing = 2, etc.). |
| Event Meter | Contains the results of each transaction execution event. Each transaction execution event is represented by a record which contains the following data: record ID (increases sequentially with each new execution event), transaction ID, result (status value), date/time, response time in seconds, and properties of agent computer (location, organization, etc.) |
| Alarms Definitions | Contains definitions of events that trigger alarms |
| Alarms | Stores a log of triggered alarm conditions |

As depicted by the downward arrow in FIG. 17, any alerts set up by the user are stored in local storage 38 along with session configuration data. The alerts may additionally or alternatively be communicated to the reports server 36, in which case the reports server may handle the task of checking for and notifying users of alert conditions.

Figure 18:
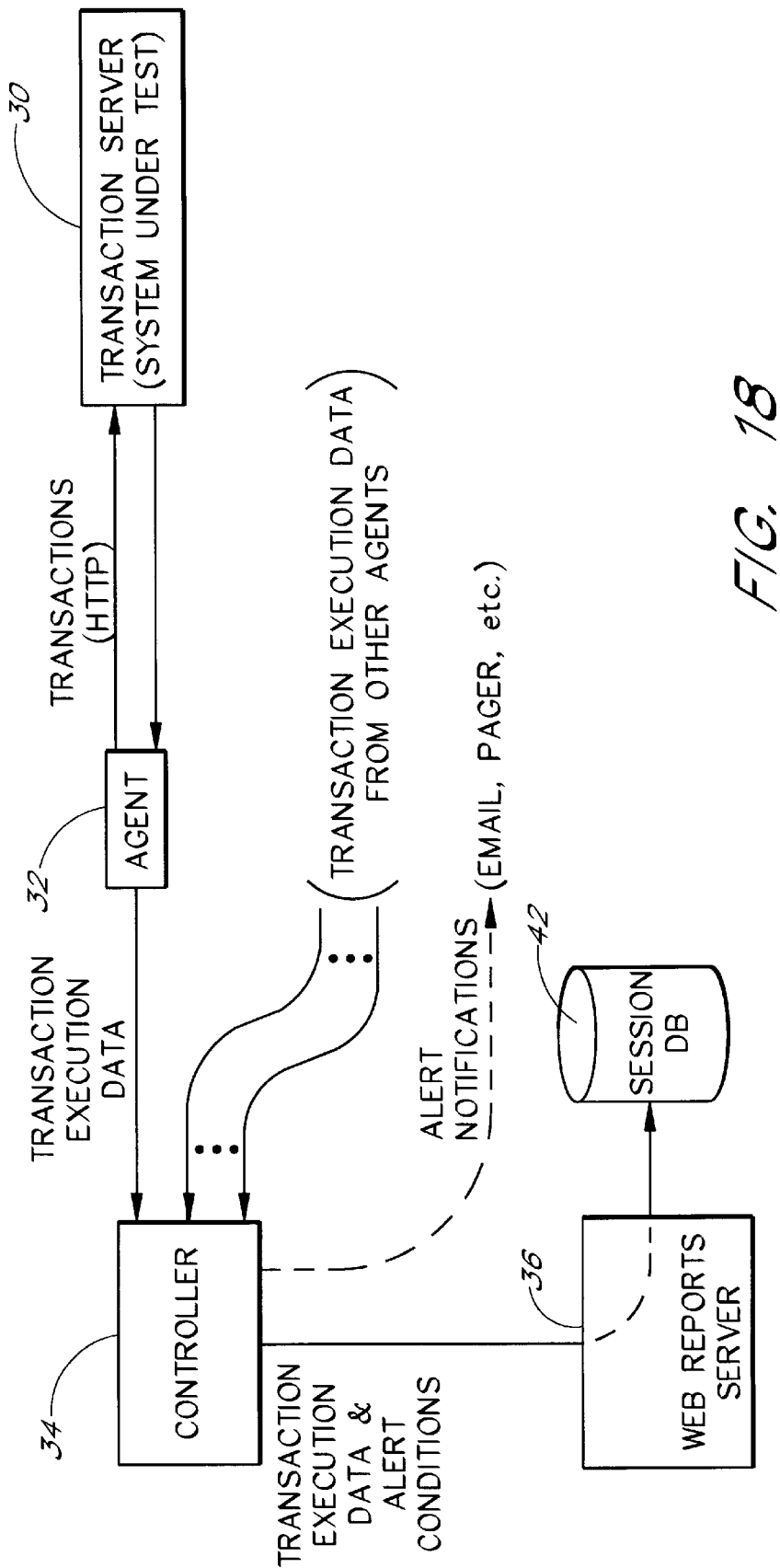

FIG. 18 illustrates the flow of data for a representative, remote agent 32 as the agent executes a testcase. During the execution process, the agent 32 interacts with (e.g., sends HTTP Post and Get messages to) the transactional server 30 while monitoring one or more predefined performance parameters such as response time. The agent 32 also checks any verification points (e.g., expected values or text strings) defined within the testcase. Upon completing each transaction, the agent 32 sends the resulting transaction execution data to the controller 34 using HTTP or another TCP/IP based protocol. The transaction execution data preferably includes a transaction ID, the performance data (such as response time and pass/fail status) for the transaction, a transaction time/date stamp, and the host ID of the agent computer 40. The agents could alternatively be designed to report their execution on a more or less frequent basis (e.g., once per server response, or once per testcase execution). The controller 34 compares the performance data to any predefined alert conditions. If an alert condition is satisfied for which a notification message has been defined, the controller sends an alert notification message (represented by a dashed line in FIG. 18) to the appropriate entity. Upon receiving an alert notification message, the recipient can log into the reports server 36 to obtain details of the alert event, such as the location or organization of the agent computer that reported associated performance data. The alert events could also be stored locally to the controller computer and displayed within the session tree 46.

As further depicted by FIG. 18, the controller 34 forwards the transaction execution data and any satisfied alert conditions to the web reports server 36 (preferably using the HTTP protocol) for insertion into the sessions database 42. As with the agent-to-controller communications, the controller preferably forwards the transaction execution data to the reports server 36 substantially in real-time, on a transaction-by-transaction basis. This is accomplished in the preferred embodiment through an API of the automation interface 34C (FIG. 1). The alert events are detected and reported to the reports server 36 in real-time by the alerts engine 34D. If multiple agents 32 are scheduled to execute testcases concurrently, the controller 34 processes the data streams from the multiple agents concurrently. The main controller loop is thus in the form of:

wait for message from a Vuser (agent)
    route message to web reports server via API call
        ApmApi_reportTransaction(transaction, host, status, value)
    route message to alarms engine
    go back to wait Various alternatives to the data flow process shown in FIG. 18 are possible. For example, the agents 32 could send the transaction execution data directly to the reports server 36, in which case the reports server 30 could optionally forward some or all of the execution data (e.g., alert conditions only) to the controller 34. In addition, all agent computers 40 within a given location or organization could be configured to aggregate their performance data for transmission to or retrieval by the controller 34 or the reports server 36. In addition, the task of checking for and notifying users of alert conditions could be performed by the agents 32 and/or by the reports server 30, rather than by the controller 34. Further, the agents 32 could be configured to "filter" the transaction execution data, so that only those transactions that meet certain predefined criteria are reported. These and other alternatives could optionally be provided as user-configurable options.

Figure 19:
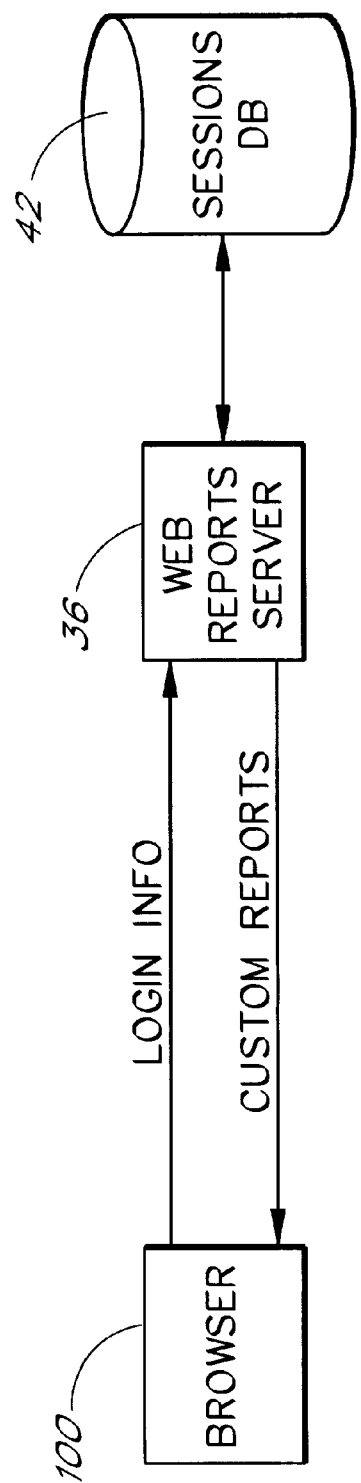

FIG. 19 illustrates the process of remotely accessing the sessions database 42 using a standard web browser 100. As illustrated, the user initially logs into his or her account using a username/password combination or other authentication method. Thereafter, the user views customized, real-time status reports (as described above) for the transaction server or servers corresponding to that account. As the reports pages are requested, the database 42 is accessed and the various performance metrics calculated using programming methods that are well known by those skilled in the art.

VII. Additional Features for Detecting and Reporting Problems

Three optional features for detecting and reporting error conditions and performance problems will now be described. All three of these features are preferably implemented in part through executable code of the agent component 32.

The first such feature involves having the agent computers 40 capture the screens returned by the transactional server 30 during transaction execution, and then forward these screen captures to the reports server 36 if the transaction is unsuccessful. When the end user drills down on a failed transaction within a report, the reports server 36 displays, or presents an option to display, the captured sequence of screen displays for the failed transaction. For example, if the failed transaction involved an unexpected or missing message on a web page, the user could view the entire web page as well as the web pages (including any form data submitted by the agent) that preceded the unexpected response. An important benefit of this feature is the ability for the user to view the sequence of events that led to the failed transaction.

Figure 20:
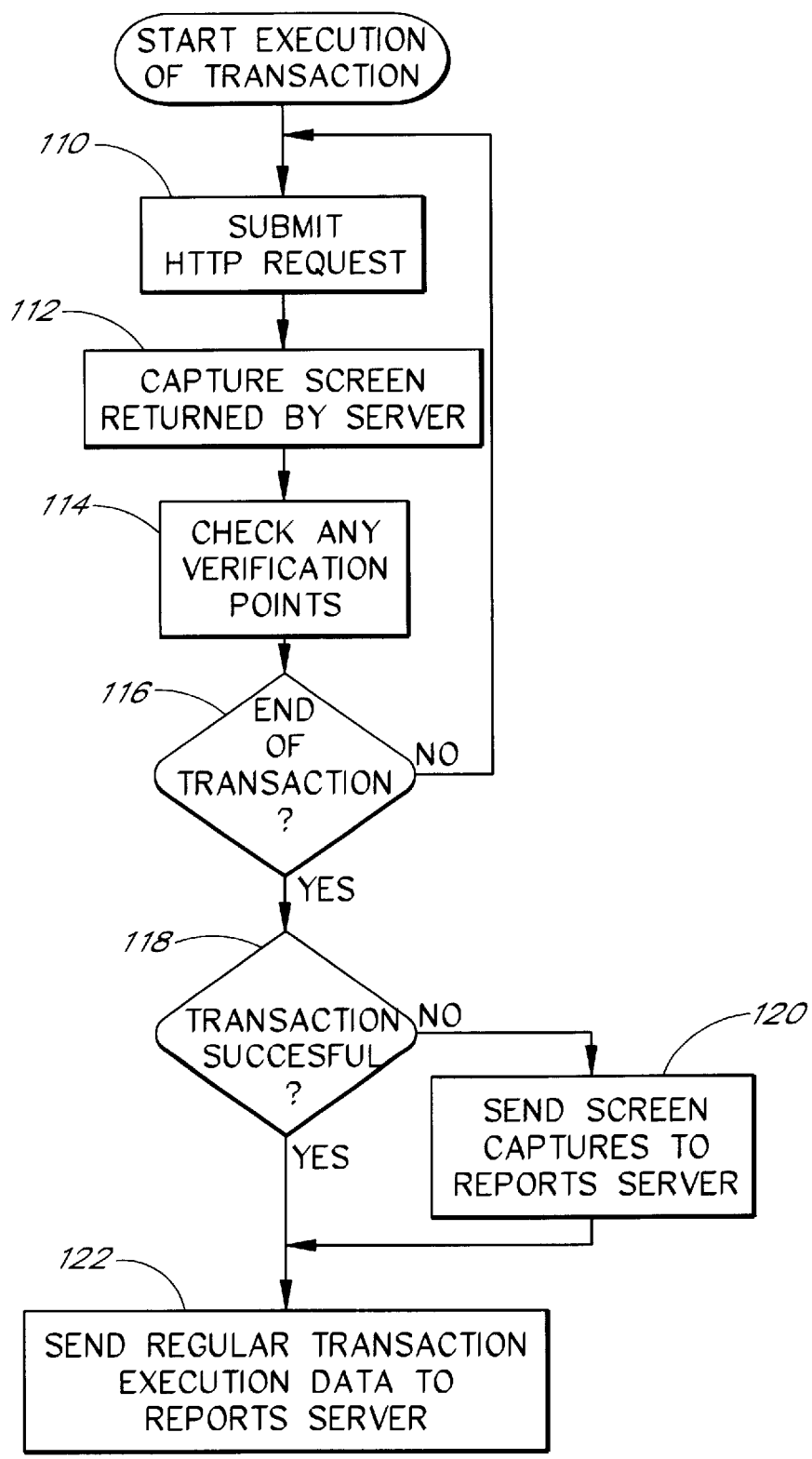
FIG. 20 illustrates a process for capturing screen displays on failed transactions.

FIG. 20 illustrates the screen capture process as implemented within the agent component 32. As depicted by blocks 110–116, each time the agent 32 submits a request to the transactional server 30, the agent captures the screen returned by the transactional server and compares this response against any associated verification points defined within the transaction. The screen displays are preferably stored as bitmap images, but may alternatively be stored in another format such as HTML documents and associated objects.

Once the transaction is finished, the agent 32 determines whether the transaction completed successfully. A transaction is preferably treated as unsuccessful if any verification point failed. A transaction may also be treated as unsuccessful if, for example, a timeout event occurred. In the event of a transaction failure, the agent 32 sends the sequence of captured screen displays to the reports server 36 (block 120), which in turn stores the screen displays in the sessions database 42 for later viewing. The screen displays could additionally or alternatively be sent by email to a human operator for viewing. If the transaction completes successfully, the screen displays are discarded without being forwarded to the reports server 36.

A second feature that may be incorporated into the agent 32 is an ability to measure and report segment delays incurred along a network path between an agent computer 40 and the transactional server 30. The segment delays are preferably measured using the Network Monitor component of the commercially-available LoadRunner 6.0 product of Mercury Interactive Corporation. Preferably, some or all of the agents 32 are configured via the controller 34 to launch the Network Monitor (on their respective agent computers 40) when the path delay exceeds a preprogrammed threshold. These thresholds may optionally be specified by the user when setting up a monitoring session. Upon being launched, the Network Monitor measures the delay along each segment of the path between the relevant agent computer 40 and the transactional server 30 using well-known methods. The agent 32 then reports these measurements to the reports server 36, which allows the user to drill down and view the measurements. The measured delays are preferably presented using the standard segment delay and path delay graphs provided within LoadRunner 6.0. The segment delay data may be used, for example, to detect router problems or bottlenecks in network architectures. An example implementation of this feature is described below under the heading "Determination of Network Hop Delays."

A third feature involves the ability of the agents 32 to detect and report "broken links" (links to inaccessible files or other objects) within web sites. Using this feature, the user can remotely program one or more of the agent computers 40 to crawl the web site periodically (e.g., once per day) to check for broken links, and to report any broken links that are found. When broken links are located, a list of the broken links may automatically be posted to the reports server 36 for viewing and/or be sent to the user by email. Each broken link may be reported to the user in the form of a URL pair that indicates the respective locations of the missing object and the page containing the broken link. Techniques for crawling web sites and checking for broken links are well known in the art, and are described, for example, in U.S. Pat. No. 5,958,008 of Mercury Interactive Corporation. As with other types of problems detected by the agents 32, when a particular object is accessible from some agent computers 40 but not others, the reports server 40 preferably allows the user to separately view the attributes of the agent computers that experienced the problem.

VIII. Additional Features for Determining the Source of Detected Problems

Upon determining that a performance problem exists with the deployed transactional server 30, additional functionality is preferably employed to determine the source or sources of the performance problem.

Briefly, using a transaction breakdown feature (shown in FIGS. 23 and 24), the user determines whether the source of the detected performance problem resides primarily with the transactional server 30 or with the network. If it is determined that the performance problem is due to abnormal or long server response times, the user employs a server resource monitoring feature (shown in FIGS. 26–30) to identify server resource parameters (e.g., processor utilization, disk space, etc.) responsible for the lengthy response times. The server resource monitoring feature provides status indications for slow- or poor-performing resource parameters of the transactional server 30. If it is determined that the performance problem is caused by abnormal or long network response times, the user employs a Webtrace Analysis feature (shown in FIG. 31) to identify network segments (between the agent computer 40 and the transactional server 30) responsible for the lengthy network response times. Using real HTTP traffic, the Webtrace Analysis feature provides network response times on a hop-by-hop basis along the network path between the agent computer 40 and the transactional server 30. Additionally, the user may invoke an automated root cause analysis system (RCA system) 168 (see FIGS. 26–37) to identify and predict the root causes of performance problems.

A. Transaction Breakdown

Figure 21:
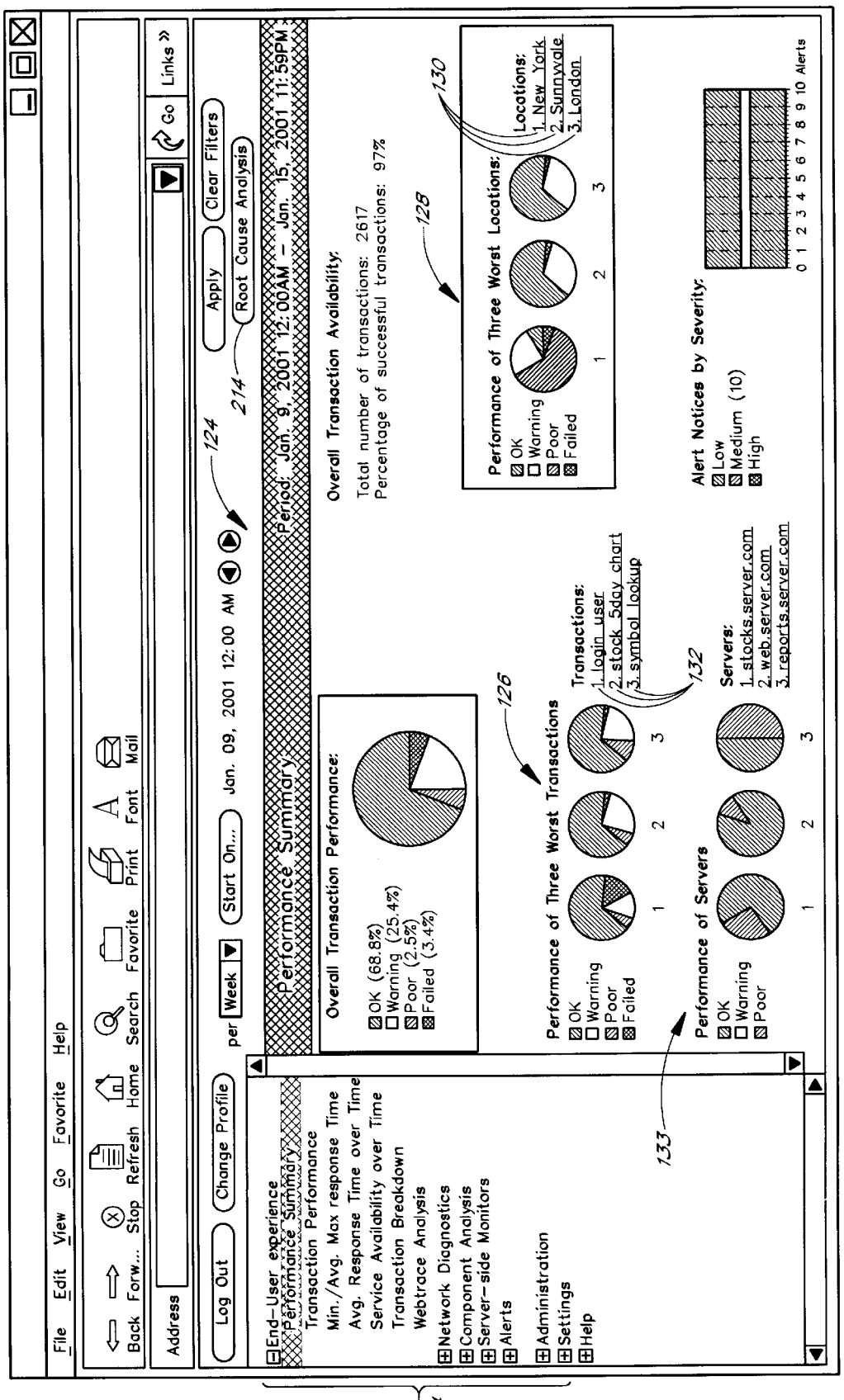
FIG. 21 illustrates an example performance summary screen.

The transaction breakdown feature will now be described with reference to FIGS. 21–25. FIG. 21 depicts a performance summary report 124, which is accessible through the web reports server 36 and provides information on transaction performance for a time duration that may be specified by the user (e.g., such as per week, last 30 days, etc.). Additionally, the performance summary report 124 may provide information on the number and severity of alert notices during the specified time duration. The performance summary report 124 gives the user a summary of the overall transaction performance (based on default or user-specified thresholds), including, in one embodiment, identifying the worst performing transactions 126 and the worst performing locations 128. From the performance summary report 124, the user selects links to drill down to additional levels of information on the worst performing transactions and/or locations.

Figure 22:
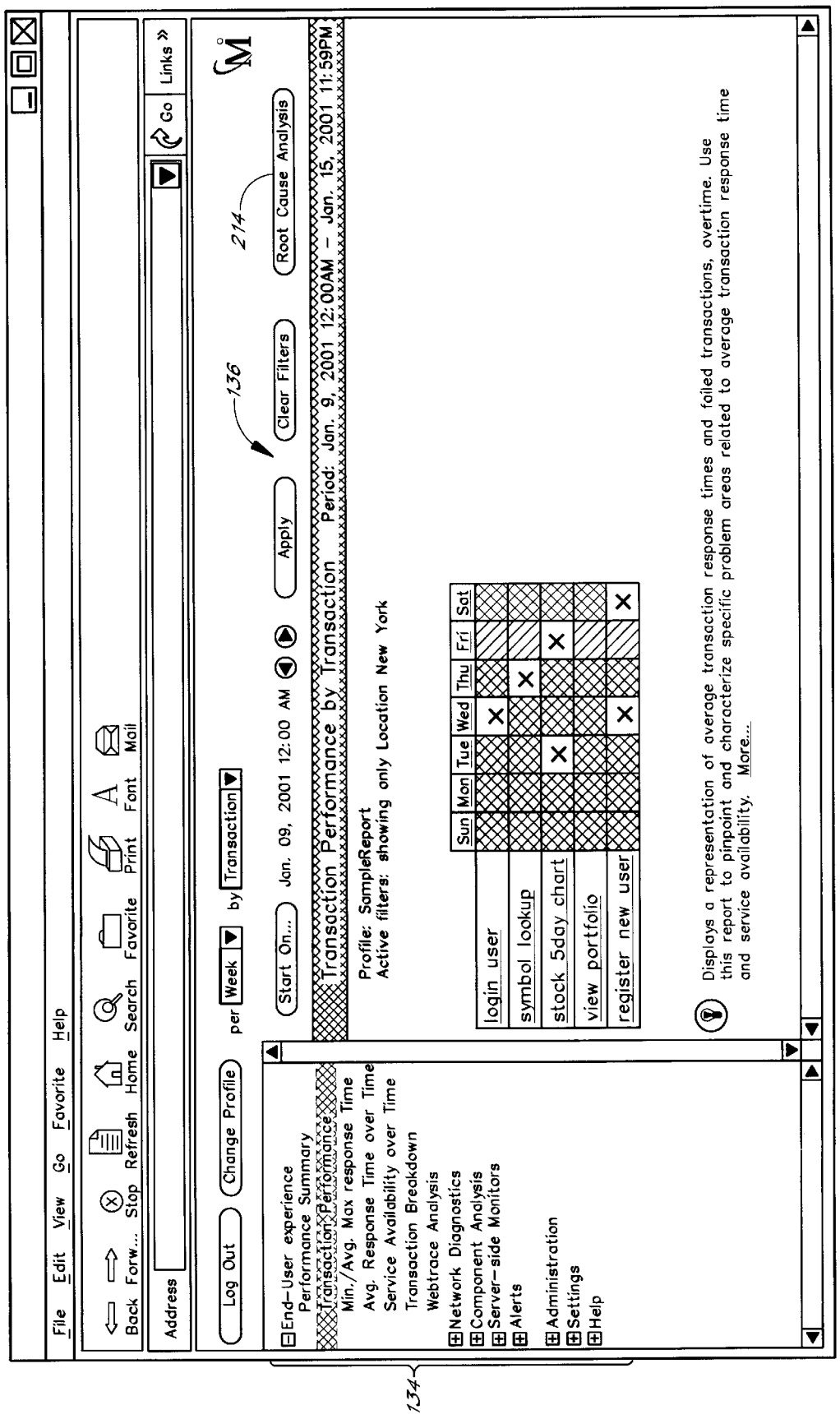
FIG. 22 illustrates an example transaction performance screen.
Figure 23:
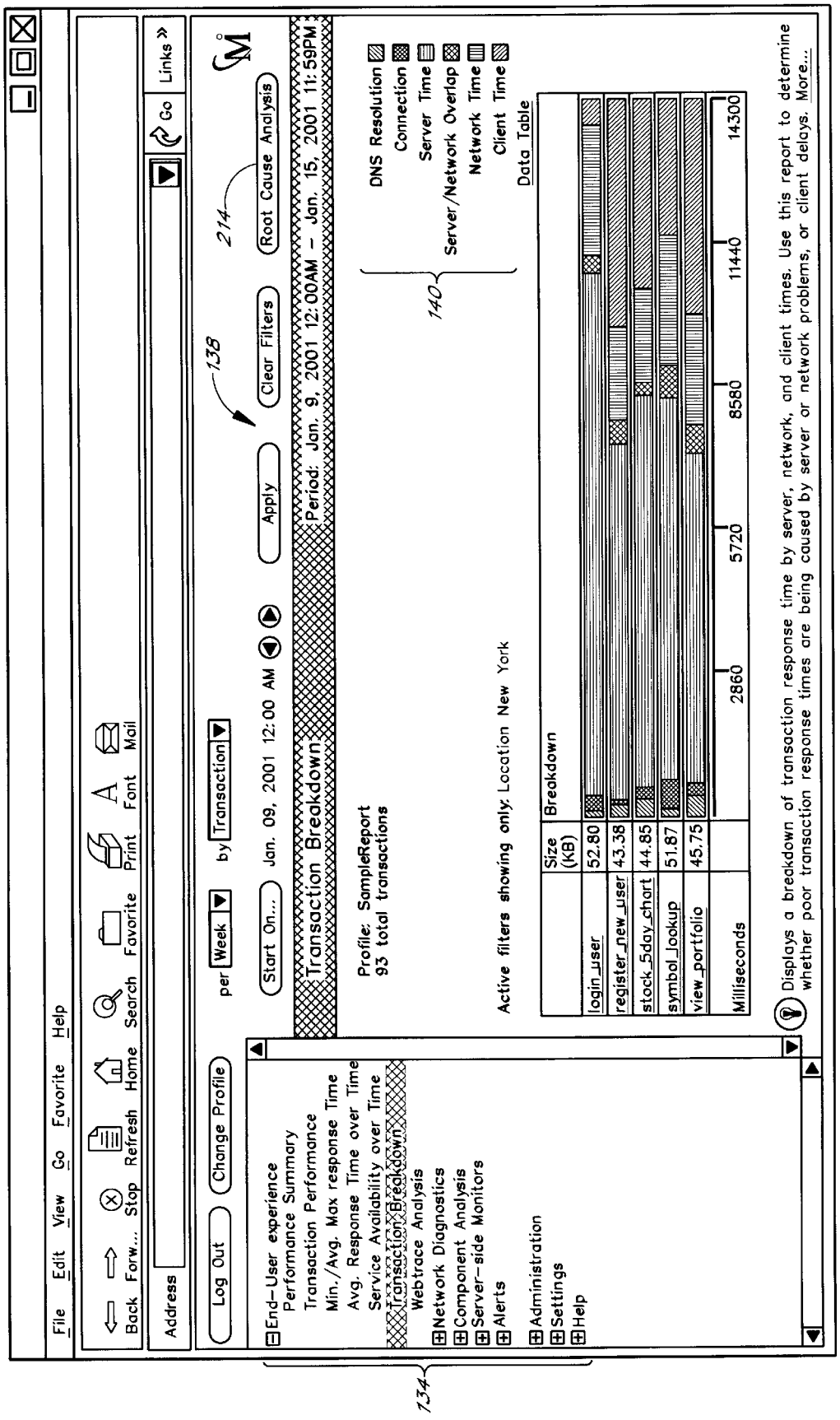
FIGS. 23 and 24 illustrate example transaction breakdown screens or pages according to one embodiment of the invention.

For example, if the worst performing location is New York, the user may select a location-specific drill down link 130 for New York to view more detailed information on the transaction performance as seen from New York (see FIGS. 22 and 23). Additionally, if the performance summary report 124 indicates that the worst performing transaction is a "login user" transaction, the user may select a transaction-specific drill down link 132 for the "login user" transaction to view more detailed information on the transaction performance for the "login user" transaction across multiple locations (see FIG. 24). Alternatively, the user transitions between reports using the side menu bar 134.

Thus, after determining, for example, from the performance summary report 124 that New York is the worst performing location and clicking the location-specific drill down link 130 for New York, the user is linked to a transaction performance report 136, an example of which is shown in FIG. 22. The transaction performance report 136 is organized so as to show a calendar view indicating days (or weeks, etc.) in which specific transactions failed. In one embodiment, the calendar is provided in a table format with a status indication (e.g., such as an "X") representing the days that each specified transaction exceeds a specified failure rate. The cells of the table are, in one embodiment, color-coded to represent various levels of failure rates. Alternatively, using the filters option described above, the transaction performance report 136 displays information only on the worst-performing transactions or on transactions as seen from a specified location or ISP, which may be beneficial in helping users determine specific time durations for which to view a transaction breakdown report 138 (see FIG. 23).

FIG. 23 depicts a transaction breakdown report 138 showing a breakdown of transaction response times between a server response time and a network response time as seen from New York, allowing the user to readily view the proportionate times spent by the server and network during execution of the transaction. The transaction breakdown report 138 is generated by the reports server 36 using time measurement values provided by the agent or agents 32. Additionally, the transaction breakdown report 138 may also show, for example, the time spent resolving a domain name system request (i.e., DNS resolution), establishing an initial connection with the transactional server 30 and/or time spent by the agent 32 processing client-side actions during the transaction (client time). Other examples of parameters that may be calculated by the transaction breakdown feature include an overlap for server and network time, number of errors (i.e., retries) and the number of bytes transferred between the agent 32 and the transactional server 30.

As depicted in FIG. 23, a breakdown of time for a transaction is shown using a bar chart indicating the time spent in DNS Resolution, Connection Time, Server Time, Server/Network Overlap Time, Network Time and Client Time. The time values shown represent the averages for each action over the selected time duration and over all agents within the selected location. The time values for each action are indicated by color-coding the bar chart respective to each time measurement. A legend 140 indicates the colors corresponding to each action. Additionally, the transaction breakdown report 138 may display a breakdown of times for multiple transactions to assist the user in determining whether the abnormal transaction response is specific to one or more particular transactions or is common to all transactions as seen from a specific location. For example, FIG. 23 indicates that the "login user" transaction has the longest server response time of all of the transactions shown in the report. The user may then want to determine whether the "login user" server response time as seen in New York is comparable to "login user" server response times in other locations.

Figure 24:
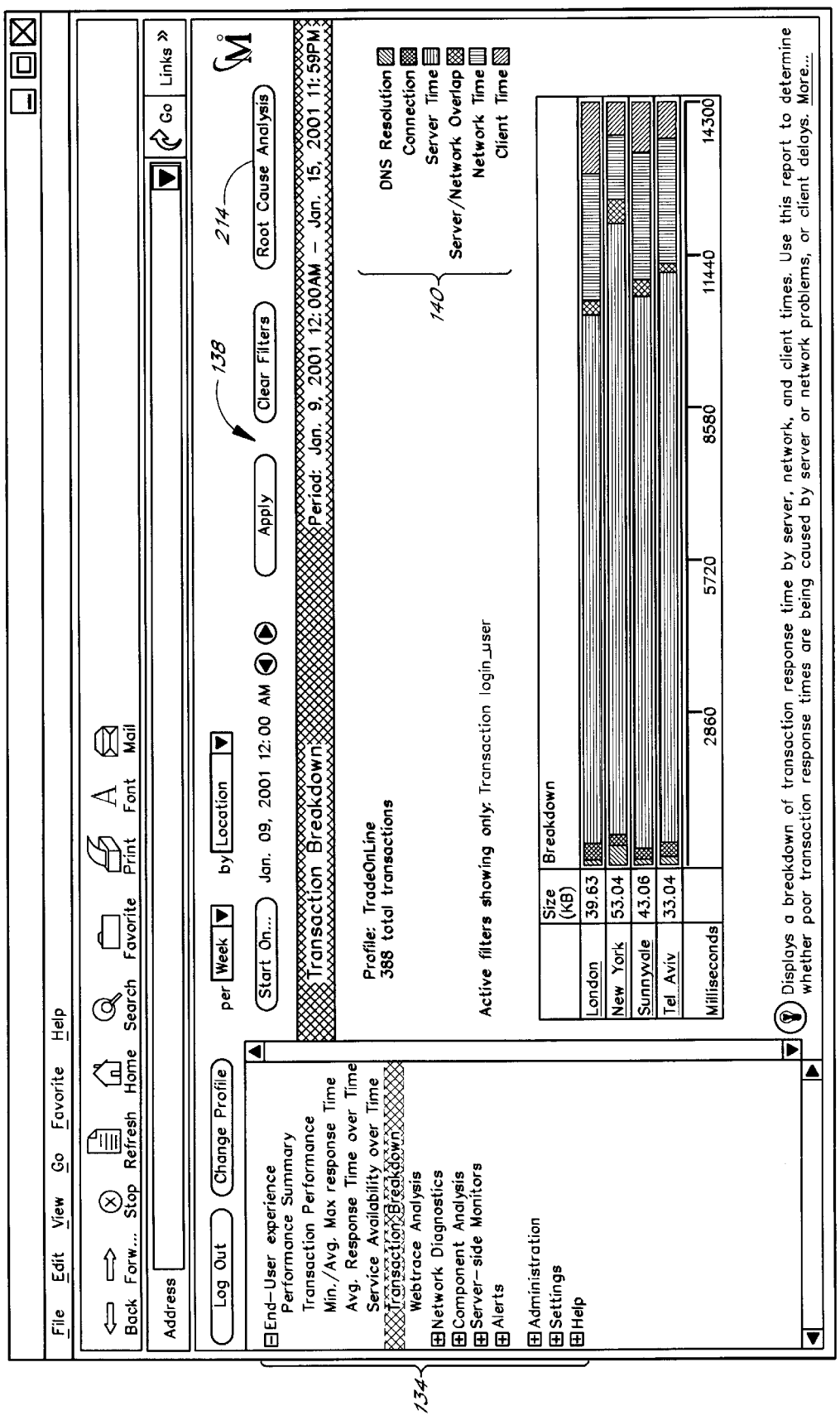

The transaction breakdown report 138 is also configurable (using filters) to show the performance of a specific transaction over multiple locations, as illustrated in FIG. 24 showing the transaction breakdown for the "login user" transaction as seen from London, New York, Sunnyvale and Tel Aviv. For example, in the transaction breakdown shown in FIG. 24, the user determines that the server response time for the "login user" transaction is slightly worse in New York as compared to the other locations displayed.

Figure 25:
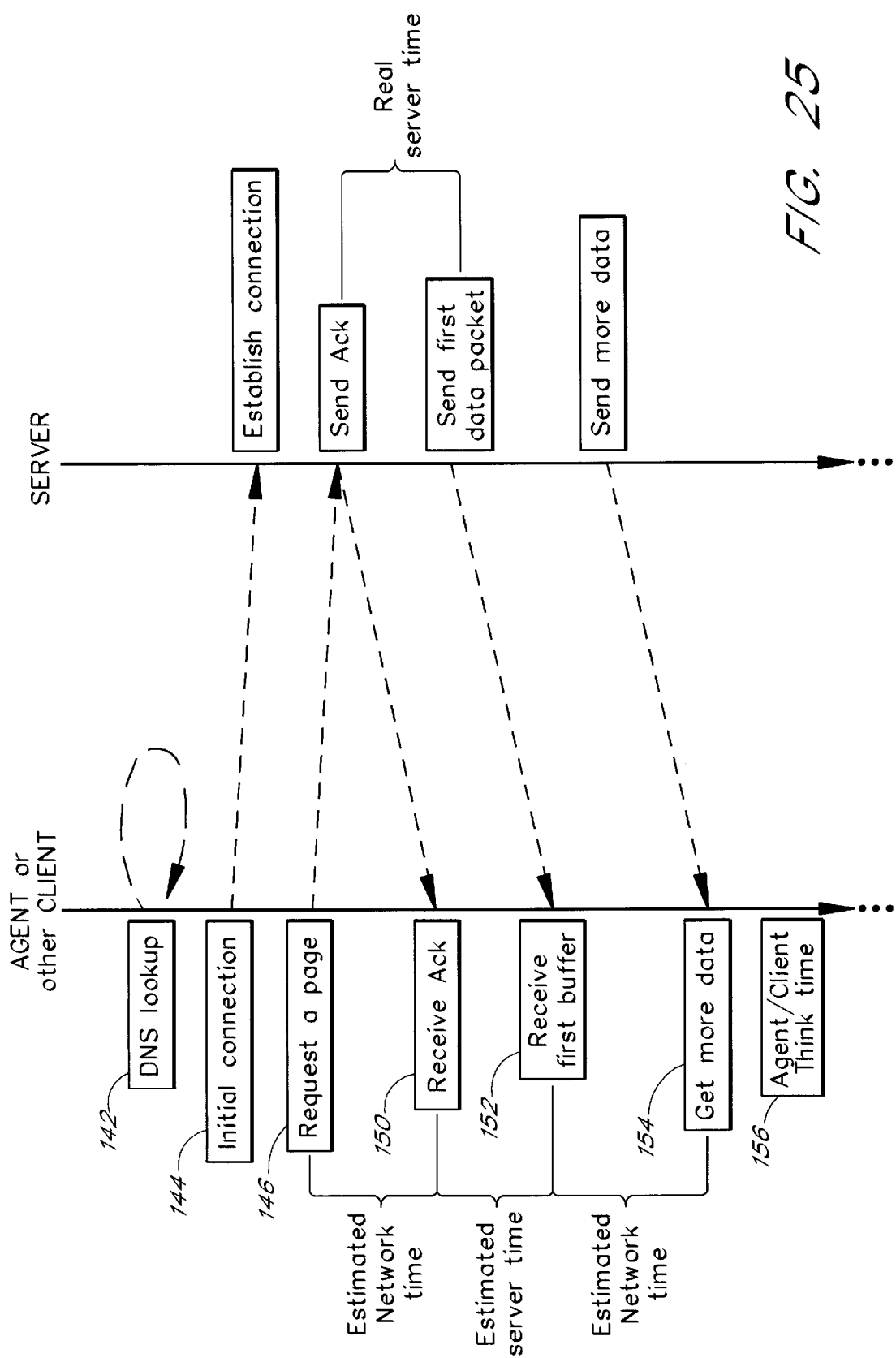
FIG. 25 illustrates transaction breakdown measurements taken during execution of a transaction according to one embodiment of the invention.

FIG. 25 depicts an example interaction between an agent 32 and a transactional server 30 during transaction execution, and illustrates the transaction breakdown measurements taken during the transaction execution. Preferably, the measurements are taken by the agent 32. Alternatively, a computational device or computer may passively monitor a TCP or other non-application level message stream to take measurements between specified transaction events, as described in co-pending U.S. application Ser. No. 09/664,264 (filed Sep. 18, 2000), the disclosure of which is hereby incorporated by reference.

In state 142, a measurement is made of the time required for a DNS lookup action to be performed. The time measurement begins when the first socket function call is made and terminates when an IP address is resolved for the specified domain name or when a failure is reported. Where a DNS server has cached information regarding a specified domain name, the DNS lookup (i.e., DNS resolution) time is generally small and may be almost zero. In one preferred embodiment, only the time spent in performing the DNS lookup is counted toward the DNS resolution time measurement and any other network-type activity is considered as network or server/network overlap time.

After successful completion of state 142, the time required to establish an initial connection with the transactional server 30 is measured in state 144. This represents the total time required for the agent to establish a connection with the transactional server 30 and begin transmitting information over the connection.

In state 146, the first page request of the transaction is made by the agent 32. The time between the first page request (state 146) and the receipt of an acknowledgment from the transactional server 30 (state 150) is measured as part of the network time for the transaction. Preferably, additional time spent on network activities is added to this measurement to generate a total network time, as explained further below.

The server time is preferably measured as the time that elapses between the agent 32 receiving an acknowledgment of a first page request from the transactional server 30 (state 150) and the agent 32 receiving a first buffer of data (state 152). In one embodiment, this is the time that it takes for the first buffer, not the first packet or frame of a lower communication layer such as TCP, to arrive. In such an embodiment, the buffer may be configured to wait until a specified amount of data, such as 8K, is obtained or until a timeout expires or a finish command is received before the buffer is sent to the agent 32. Alternatively, the server time may be calculated as the time to receive the first byte of data. Because a transaction typically includes many URL requests and associated component download events, the server time for a transaction is preferably the time during transaction execution where the only activity occurring involves server-type activity and not any other type of activity. Alternatively, the server time may be measured as the time for which any server-type activity occurs.

As indicated by FIG. 23, the time that elapses between the receipt of the first buffer (state 152) by the agent and the receipt of the last buffer (state 154) is calculated as network time and added to the network time measurement taken between states 146 and 150. In one embodiment, the network time includes only download time and the time between sending a URL request and receiving an acknowledgment from the transactional server 30. Alternatively, the network time may report all network-type activity (e.g., DNS lookup, initial connection) as the network response time measurement. Methods for determining a download time (such as using the total size of the expected download as a benchmark for completion of the download) are well understood in the art.

The server/network overlap time, which includes time during which both server-type and network-type activity occurs, may also be measured during transaction execution and reported in the transaction breakdown report 138. Client time is measured in state 156 as the time spent by the agent 32 in processing the transaction on the agent computer 40.

If the transaction includes multiple URL requests, the process and measurements described in states 142–156 are repeated for each URL request involved in the transaction. The resulting measurements are combined to generate one network and one server response time for the entire transaction. Thus, for example, all network time associated with URL requests for the "login user" transaction will be added together to generate one network response time for the "login user" transaction. In one embodiment, the agent 32 analyzes all of the time measurements at the agent and transmits to the web reports server 36 the values for each of the measured activities (e.g., network time, server time, client time, etc.) Further, some of the measurements or metrics may be omitted from the analyses. Alternatively, all of the measurements may be sent to the web reports server 36 and analyzed on the reports server 36. It will be understood by one skilled in the art that the transaction breakdown may also include additional transaction information, such as the number of client or server errors and/or the total number of bytes transferred over the network.

B. Server Resource Monitoring

If the transaction breakdown report 138 indicates that the source of the performance problem is likely a server problem, the server resource monitoring feature may be used to isolate server problems by correlating server resource utilization with the transaction performance problem.

Figure 26:
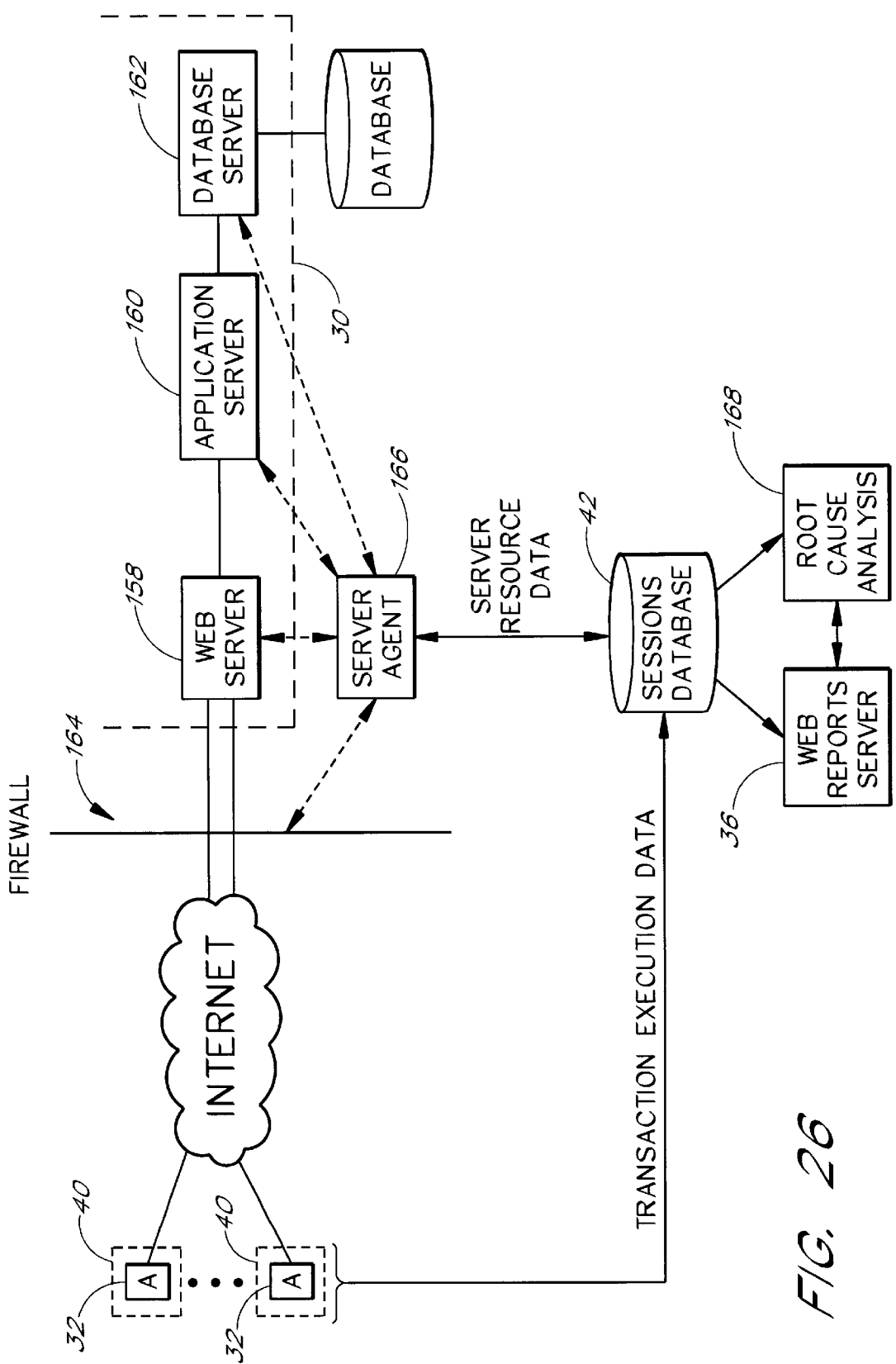
FIG. 26 illustrates a high-level block diagram of components used to provide server resource utilization monitoring functionality according to one embodiment of the invention.

FIG. 26 illustrates the general components used to implement the server resource monitoring tool and illustrates how these components may be deployed within a network to test and monitor a transactional server 30. It will be understood by those of ordinary skill in the art that the transactional server 30 monitored may include some combination of a web-based server 158, an application server 160, a database server 162 and/or other network devices such as a router, bridge or firewall 164. Additionally, the transactional server 30 may include components different than those shown in FIG. 26, such as load balancers, streaming servers and other SNMP enabled devices.

A set of one or more agents 32 access the web site or other transactional server 30 from one or more geographic locations, and report response times and other performance parameters to a sessions database 42, preferably as described in the previous sections. The response times may additionally or alternatively be measured by passively monitoring the packet stream between a client and the transactional server 30, as described generally in above-referenced U.S. appl. Ser. No. 09/664,264. During this process of monitoring response times, a server agent 166, which typically runs locally to the transactional server 30 (e.g., on an internal network of the web site operator), monitors and reports various server resource parameters associated with the transactional server 30. The performance values measured by the two types of agents 32, 166 are time stamped such that measurements taken over like time periods may be compared (as described below).

The server agent 166 may be installed on a dedicated computer owned or controlled by the operator of the transactional server 30 or on a computer used for other tasks. Preferably, the server agent 166 is located on the same network as the server being monitored and thus behind any firewall 164, but may alternatively be located remotely and outside the firewall 164. The server agent 166 is configured to monitor specified server resources parameters. In one embodiment, the configuration of the server agent 166 is performed from the machine hosting the server agent. In another embodiment, the server agent 166 is configured remotely using the UI of the controller 34. In this embodiment, a user may set up and initiate server resource monitoring sessions by defining which servers and which server resources to monitor from the controller 34 (not shown in FIG. 26). Thus, the controller 34 may be used to configure both the client-side agents 32 and the server agent 166. The controller 34 may be installed locally or implemented through a remote web site of the monitoring service provider.

During a server resource monitoring session the server agent 166 polls the various components of the transactional server 30 for the parameters associated with the server resources according to either a default schedule or a schedule created by the user. The schedule may include polling monitored servers every five seconds, every thirty seconds, etc. Once created, a server resource monitoring session, in one embodiment, runs continuously according to its specified schedule until the user ends the monitoring session. Alternatively, the server resource monitoring session includes a preprogrammed termination date. The agents 32 execute the transactions at roughly the same time that a server agent 166 monitors the server resource parameters by virtue of the relatively high frequency with which both types of agents take measurements (e.g., every few seconds or minutes). After a user defines the testcases and schedules, the controller 34 dispatches the defined testcases (i.e., transactions) and schedules to the respective agents 32 as described in FIG. 17. The controller 34 also dispatches the server resource monitoring sessions to a server agent 166. Alternatively, the server agent may be configured to poll (e.g., such as every one minute) the controller 34 or other computer to receive the parameters that define the server resource monitoring sessions.

Upon execution of each transaction, or at specified intervals, the agents 32 (or passive monitors mentioned above) send the transaction execution data directly to the sessions database 42. As indicated earlier, the transaction execution data preferably includes a transaction ID, performance data for the transaction, a transaction time/date stamp and the host ID of the agent computer 40. The transaction execution data additionally includes a profile ID associated with the user and/or monitored web site. The server agent 166 also sends server resource data on a regular schedule to the sessions database 42 using a similar process as described for the agents 32. The server resource data preferably includes performance data for the monitored server resources, a time/date stamp, a profile ID associated with the user and/or monitored web site, and a server ID of the monitored server. The transaction execution data and the server resource data may be stored in the same database or separate databases. In the alternative, the transaction execution data and the server resource data may be sent by the agents 32 and the server agent 166 to the web reports server 36 or to the controller 34. In the embodiment where data is sent to the controller 34, the controller 34 handles alert notification procedures (see FIG. 18 discussion) and forwards the data to the web reports server 36 for insertion into the sessions database 42.

In one embodiment, the server agent 166 employs commercially-available utilities or "monitors" to monitor server resource parameters. For example, the Windows NT Performance Monitor or the UNIX rstat daemon may be used to monitor operating system resource parameters on a transactional server 30. Additionally, the Simple Network Management Protocol (SNMP) is used to monitor various servers and network devices. An API is preferably provided to extend the functionality of the server agent 166. For example, users employing a database server for which no monitor is provided may use the API to create an interface for monitoring and reporting for unsupported database servers. Commercially available web server monitors exist for various web servers, such as, for example, Apache, MS IIS and Netscape web servers. Likewise, commercially available web application server monitors exist for various web application servers, including BroadVision, Weblogic, SilverStream and MS ASP servers. Commercially available database server monitors exist for database servers such as Oracle and SQL Servers.

Figure 27:
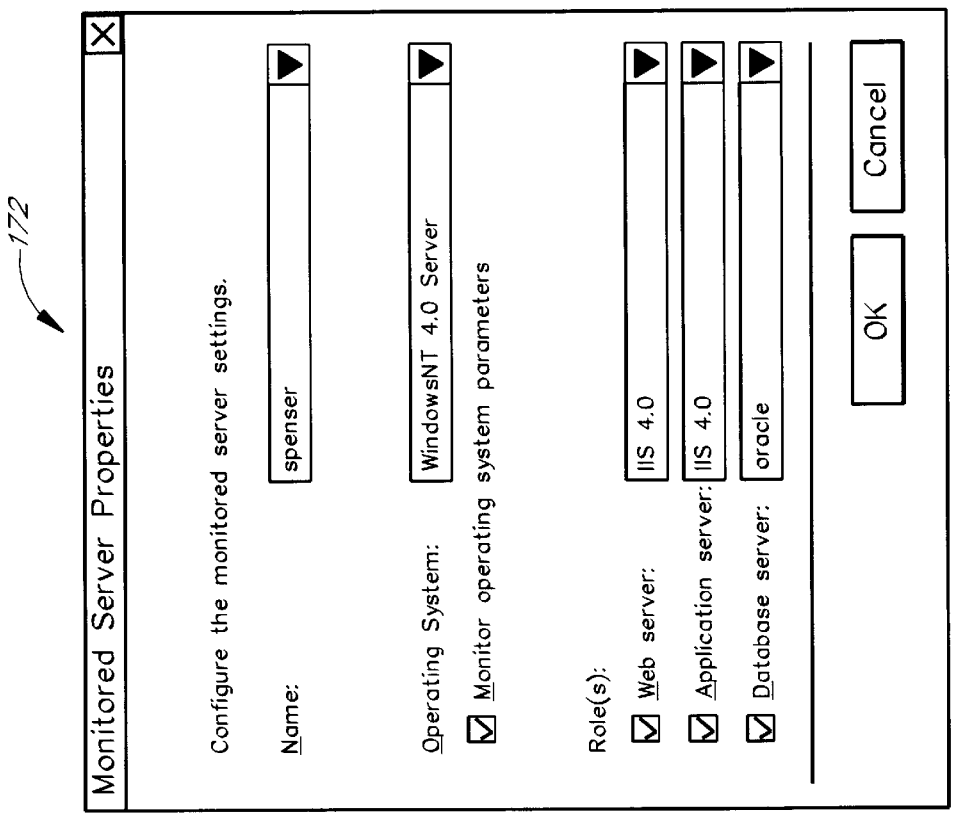
FIG. 27 illustrates an example of a monitored server properties screen according to one embodiment of the invention.

FIG. 27 illustrates one example of a screen 172 used to specify which servers are to be monitored by the server resource monitoring feature. From screen 172, a user specifies (e.g., using drop-down lists or another method) the name and operating system of the server to be monitored. The user selects whether to monitor operating system metrics (e.g., % processor time, bytes/sec, etc.) and what roles are performed by the server (e.g., web server, database server).

Figure 28:
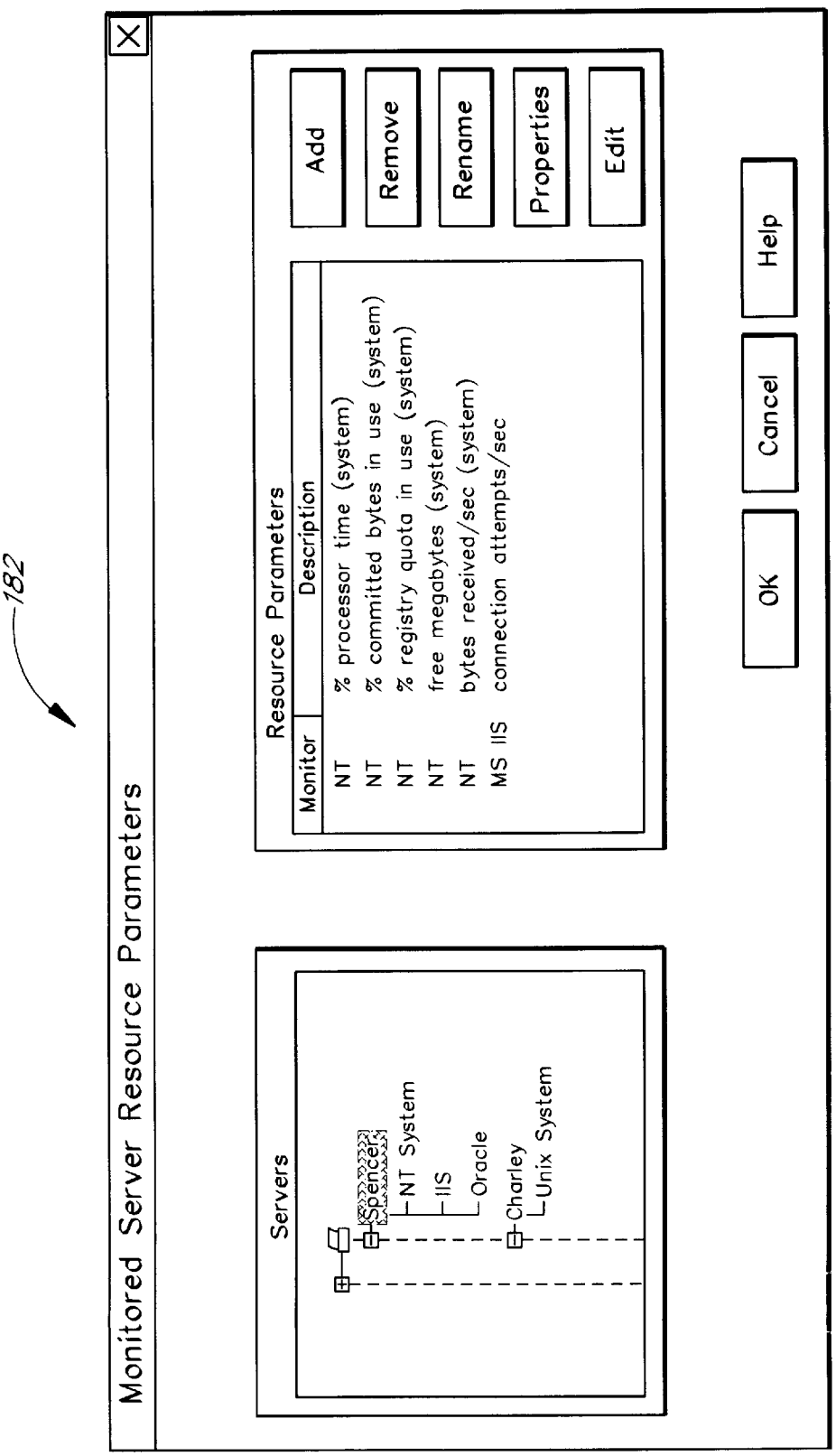
FIG. 28 illustrates an example of a server resource parameters configuration screen according to one embodiment of the invention.

FIG. 28 illustrates an example of a screen 182 used to specify which server resources are to be monitored for the specified servers by selecting the resource parameters to be monitored by the server agent 166. Table 2 illustrates some example server resource parameters that can be measured for various UNIX objects.

TABLE 2

EXAMPLE UNIX SERVER RESOURCE PARAMETERS

| UNIX SERVER RESOURCE PARAMETERS | DESCRIPTION |
| --- | --- |
| Average Load | Average number of processes simultaneously in "ready" state during last minute |
| CPU Utilization | Percent of time that CPU is utilized |
| Incoming Packets Rate | Number of incoming Ethernet packets per second |
| Disk Rate | Rate of disk transfers |
| Outgoing Packets Rate | Number of outgoing Ethernet packets per second |

Table 3 indicates some example Windows NT resource parameters that may be monitored for NT servers.

TABLE 3

EXAMPLE WINDOWS NT SERVER RESOURCE PARAMETERS

| NT SERVER RESOURCE PARAMETERS | DESCRIPTION |
| --- | --- |
| % Processor Time | Percentage of the elapsed time that a processor is busy executing a non-Idle thread |
| % Registry Quota In Use | Percentage of the total registry quota allowed currently in use by the system |
| Bytes Total/Sec | Number of bytes the server has sent to and received from the network |

TABLE 3-continued

EXAMPLE WINDOWS NT SERVER RESOURCE PARAMETERS

| NT SERVER RESOURCE PARAMETERS | DESCRIPTION |
|---|---|
| % Free Space | Ratio of the free space available on the logical disk unit to the total usable space provided by the selected logical disk drive |
| Files Open | Number of files currently opened in the server |

Table 4 indicates some example database server resource parameters that may be monitored for SQL Servers. It should be understood that Tables 2 through 4 include only a partial listing of the various types of servers and server resource parameters that may be monitored by the server agent 166.

TABLE 4

EXAMPLE SQL SERVER RESOURCE PARAMETERS

| MS SQL SERVER RESOURCE PARAMETERS | DESCRIPTION |
|---|---|
| Total Processor Time | Average percentage of time spent by all of the system processors in executing non-idle threads |
| I/O - Lazy Write/Sec | Number of 2K pages flushed to disk per second by the Lazy Writer |
| Logins/Sec | Total number of logins started per second |
| I/O - Page Reads/Sec | Number of physical page reads per second |
| User Connections | Number of open user connections |

Figure 29:
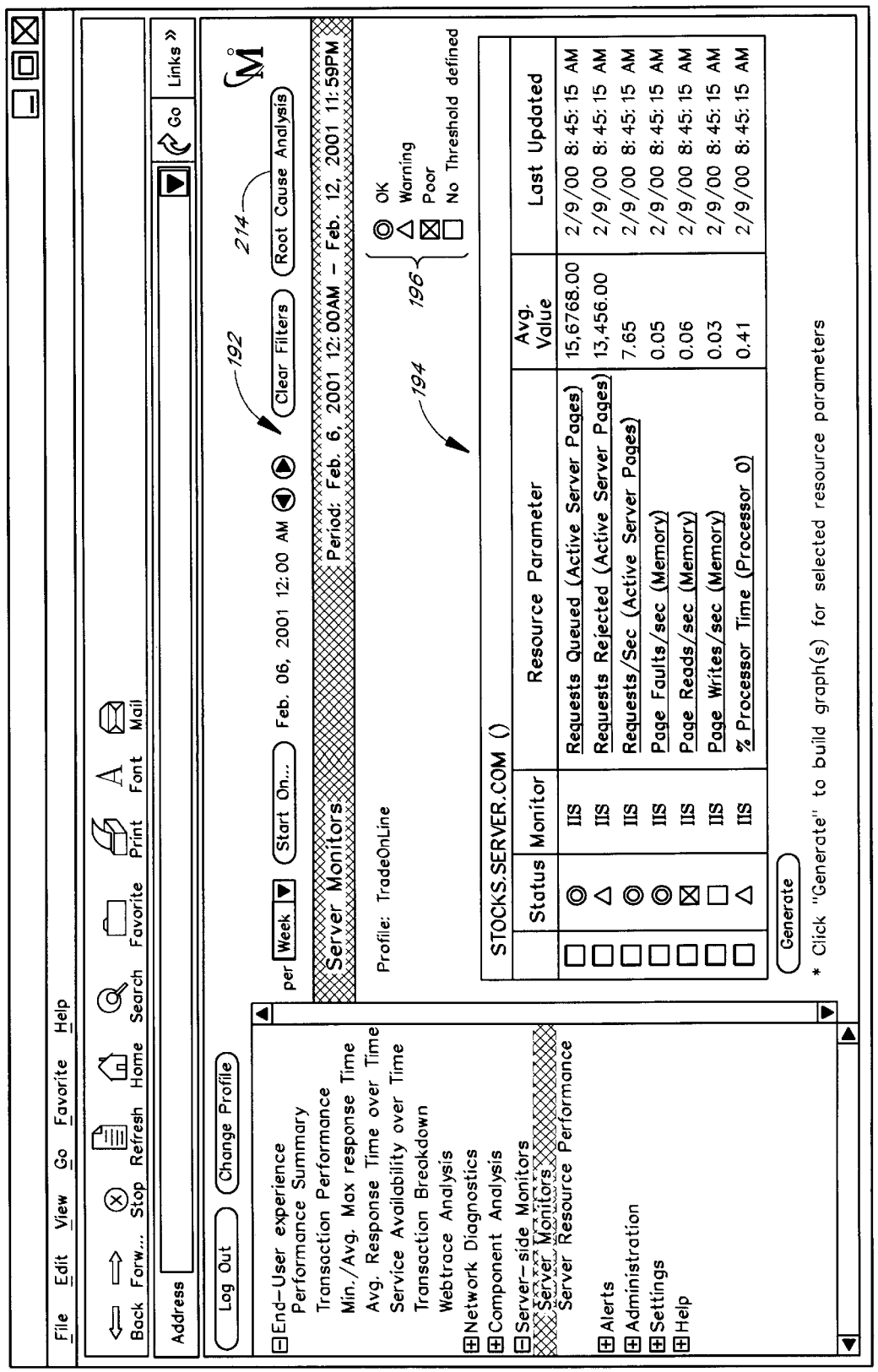
FIG. 29 illustrates an example server resource monitoring screen according to one embodiment of the invention.

FIG. 29 depicts a server resource monitoring report 192 showing performance of specified server resource parameters (e.g., percentage of processor time used, page writes per second, etc.). A server performance table 194 is shown for each monitored server component providing status indicators for the performance of each of the monitored resources for that server component. In one embodiment, the status indicators are color-coded to indicate good performance levels, warning performance levels and danger performance levels. An indicator is also provided when no thresholds have been defined for a monitored server resource parameter. In the alternative, the status indicators may be various shapes (such as a circle for ok performance levels, a triangle for warning performance levels, etc.). A legend 196 is provided defining the status indicators associated with each performance level.

As illustrated in FIG. 29, the user may select any one or more of the server resource parameters (by selecting corresponding check boxes), and then select a "generate" button to view graphs of these resource parameters over the selected time window. These graphs may be displayed individually (e.g., using separate sets of axes that are aligned on the same web page), or may be displayed together on the same set of axes with color-coding used to distinguish one graph from another. The user can also preferably view these resource parameter graphs together with a time-synchronized graph of a particular end-user performance parameter, such as an average response time for a particular agent location and/or transaction, as monitored by the agents 32 (see FIG. 30). Additional interfaces and methods by which users can generate and view graphs of performance parameters are described in the RCA sections below.

To specify the particular response time or other end-user performance parameter to view, the user may specify one or more filters before generating the resource parameter graph or graphs. For example, the user may use the "filters" option to select the transaction "log-in user," the agent location "New York," and the performance parameter "average response time." By viewing the response time and resource parameter graphs together along a common time frame, the user can readily evaluate whether a correlation exists between the response time and the selected server resource parameter(s).

Figure 30:
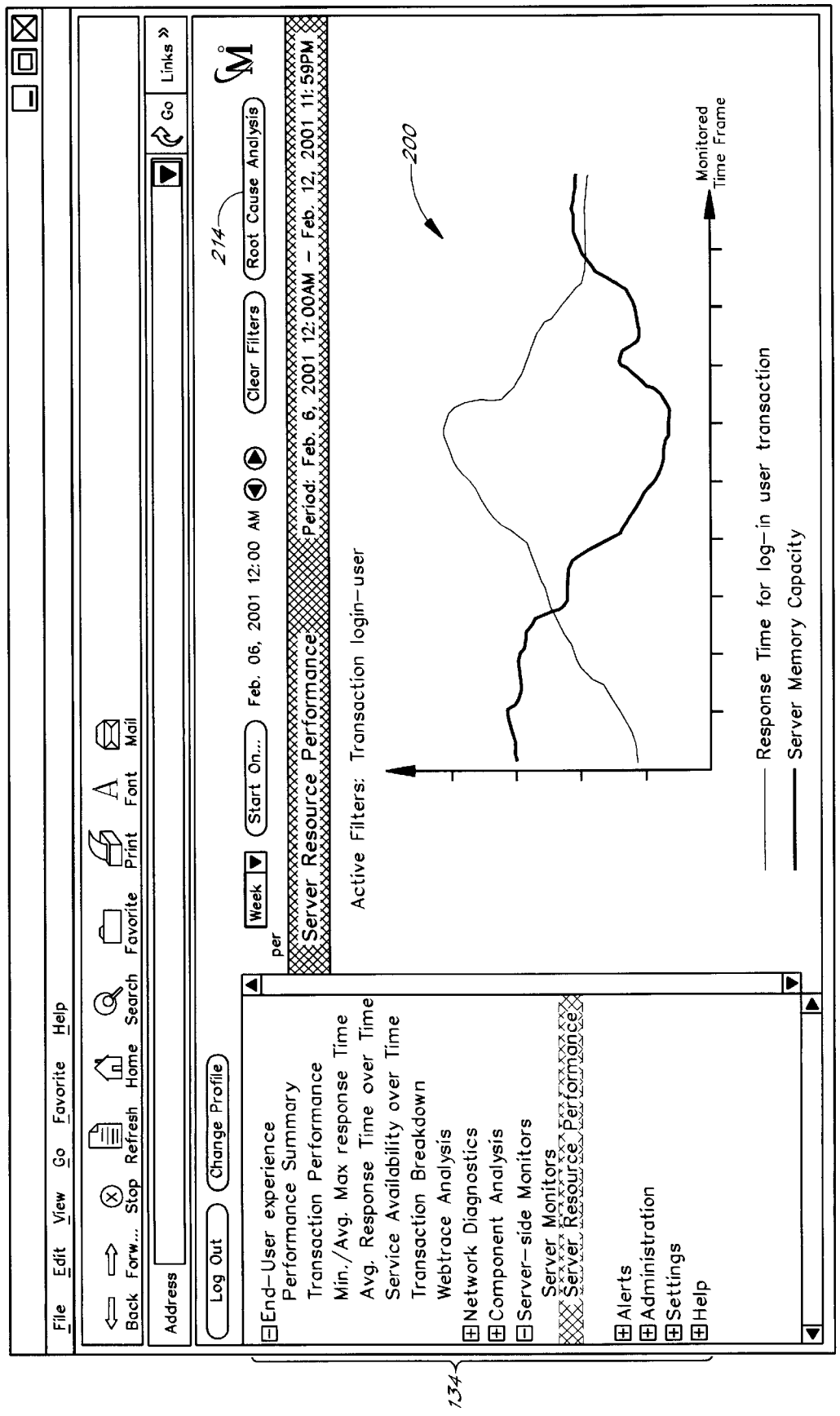
FIG. 30 illustrates an example server resource performance screen according to one embodiment of the invention.

FIG. 30 depicts a server resource performance graph 200 displaying server resource performance for a memory capacity resource parameter with a transaction response time for the "login user" transaction, allowing the user to readily determine from the graph whether memory capacity resources are contributing to lengthy transaction response times. For example, the user may determine from the graphs of FIG. 30 that a correlation exists between memory capacity and transaction response times for the "login user" transaction because transaction response times increase when memory capacity resources decrease. Preferably, the graphs are color-coded for ease of interpretation.

In addition to "manually" reviewing the performance data and generated reports as described above, the user may optionally invoke a root cause analysis (RCA) application to initiate an automated comparison and evaluation of such data. Through such an evaluation, the RCA system predicts the most probable root cause or causes of the performance problems, thereby reducing the need for the user to view and analyze large amounts of data. The RCA system 168 is described separately below.

C. Determination of Network Hop Delays

If the transaction breakdown report 138 indicates that the source of the performance problem is likely a network problem, the user may invoke a "Webtrace Analysis" feature from the expandable menu to evaluate the source of the network problem. This feature permits the user to view, on a hop by hop basis, the amount of time spent on each network segment between an agent computer 40 and the transactional server 30. The functionality for determining the hop delays is preferably incorporated into the agent component 32. The agents 32 may determine and report the hop delays throughout a monitoring session (e.g., each time a transaction is executed), or alternatively, only when the Webtrace Analysis feature is invoked by a user. The hop delay data is displayed in a Webtrace Analysis report (FIG. 31), and may be used to isolate slow network segments responsible for lengthy transaction response times.

In one embodiment, the agents 32 measure hop delays using a traceroute-type utility of the type described in co-pending U.S. application Ser. No. 09/664,264 (filed Sep. 18, 2000), the disclosure of which was incorporated by reference above. This utility, referred to as the Webtrace utility, measures hop delays using HTTP (Hypertext Transfer Protocol) packets, rather than ICMP (Internet Control Message Protocol) packets as in conventional traceroute utilities. An important benefit to using HTTP packets is that the packets are less likely to be blocked by Internet firewalls. Another benefit is that the HTTP packets are more likely to follow the route used for ordinary Web traffic.

FIG. 31 illustrates a sample Webtrace Analysis report 210 indicating in a table format the time spent by packets on each hop in the network between a particular agent computer 40 and the transactional server. The report may alternatively be configured so as to display only network hops exceeding a specified threshold value. Using this report, the user can determine which of the network hop times exceed acceptable or desirable standards. The user may then address the problem, for example, by contacting the ISP responsible for the slow router.

D. Automated Root Cause Analysis of Performance Data

The quantity of performance data collected during the course of a monitoring session is typically very large. This is particularly true if the transactional server 30 is monitored from a large number of different agent computers 40 (e.g., computers in all major cities), and/or is monitored using a server agent 166 configured to monitor a large number of different server resource parameters. To reduce the need for users to review and evaluate large quantities of collected performance data, a root cause analysis (RCA) application is provided which automatically analyzes the collected data to locate performance degradations, and to identify lower level parameters (such as server resource parameters) that are correlated with such degradations. In a preferred embodiment, the RCA application or feature may be invoked by a user from the UI of the reports server 36 (FIG. 1) during browsing of monitoring session data. The RCA application and its associated hardware components are referred to collectively as the "RCA System" 168 (FIG. 26). In one embodiment, the RCA analysis is an off-line analysis of data stored in the sessions database 42, although the analysis could alternatively be performed in real time or near real time as parameter measurements are taken.

The RCA application is preferably incorporated into a monitoring system in which end-user agents 32 access and monitor the transactional server 30 from various geographic locations, and in which a server agent 166 concurrently monitors server resource parameters, as described above and depicted in FIG. 26. The performance data reported by the end-user agents 32 preferably includes transaction response times (which may simply be page-load times in some cases), together with the component measurements produced by performing a transaction breakdown of the type depicted in FIGS. 24 and 25. The RCA analysis thus preferably reflects the performance of a system that includes both the transactional server itself and the network through which it is accessed.

As will be apparent, various alternatives are possible. For example, in addition or as an alternative to using agents 32 that proactively access the transactional server 30, the response times may be measured by one or more passive agents that passively monitor real user traffic between clients and the server 30, as described in U.S. appl. Ser. No. 09/664,264 referenced above. In addition, the root cause analysis may be performed solely on performance data collected by one or more remote, client-side agents 32, or solely on performance data collected by one or more server-side agents 166. An RCA analysis as set forth herein may also be performed on performance data captured during pre-deployment load testing of a transactional or other server.

Briefly, the RCA system 168 analyzes the performance data reported by the end-user agents 32 and/or the server agent 166 (and possibly other types of measurement devices) to detect performance or quality degradations in specific parameter measurements (e.g., a substantial increase in average transaction response times). Preferably, this analysis is initially performed on the measurement data of relatively high level performance parameters—such as transaction response times—that indicate or strongly reflect the performance of the transactional server 30 as seen by end users. To evaluate the potential sources or causes of a detected performance degradation, a set of predefined dependency rules is used by the RCA system 168 to identify additional, lower level parameters (e.g., network response time, server time, DNS lookup time, etc.) associated with specific potential causes or sources of the performance degradation. The measurements taken over the relevant time period for each such lower level parameter are also analyzed to generate a severity grade indicative of whether that parameter likely contributed to or is correlated with the higher level performance degradation. For instance, the RCA process may determine that "server time" was unusually high when the performance degradation occurred, indicating that the server itself was the likely source of the degradation in end user performance. This process may be preformed recursively, where applicable, to drill down to even lower level parameters (such as specific server resource parameters) indicative of more specific causes of the performance degradation.

1. RCA System User Interface

FIGS. 32–37 illustrate example screen displays of a web-based user interface of the RCA system 168 according to one embodiment of the invention. The RCA system 168 is invoked by directly accessing the RCA system 168 or by selecting a "root cause analysis" option (such as button 214) from within another performance report (see FIGS. 21 and 31). In one embodiment, the RCA functionality is presented to users as a logically distinct web site. The RCA functionality may alternatively be fully integrated into the reports and pages served by the web reports server 36 (FIG. 1), or may be presented through the interface of a non-web-based application.

Figure 32:
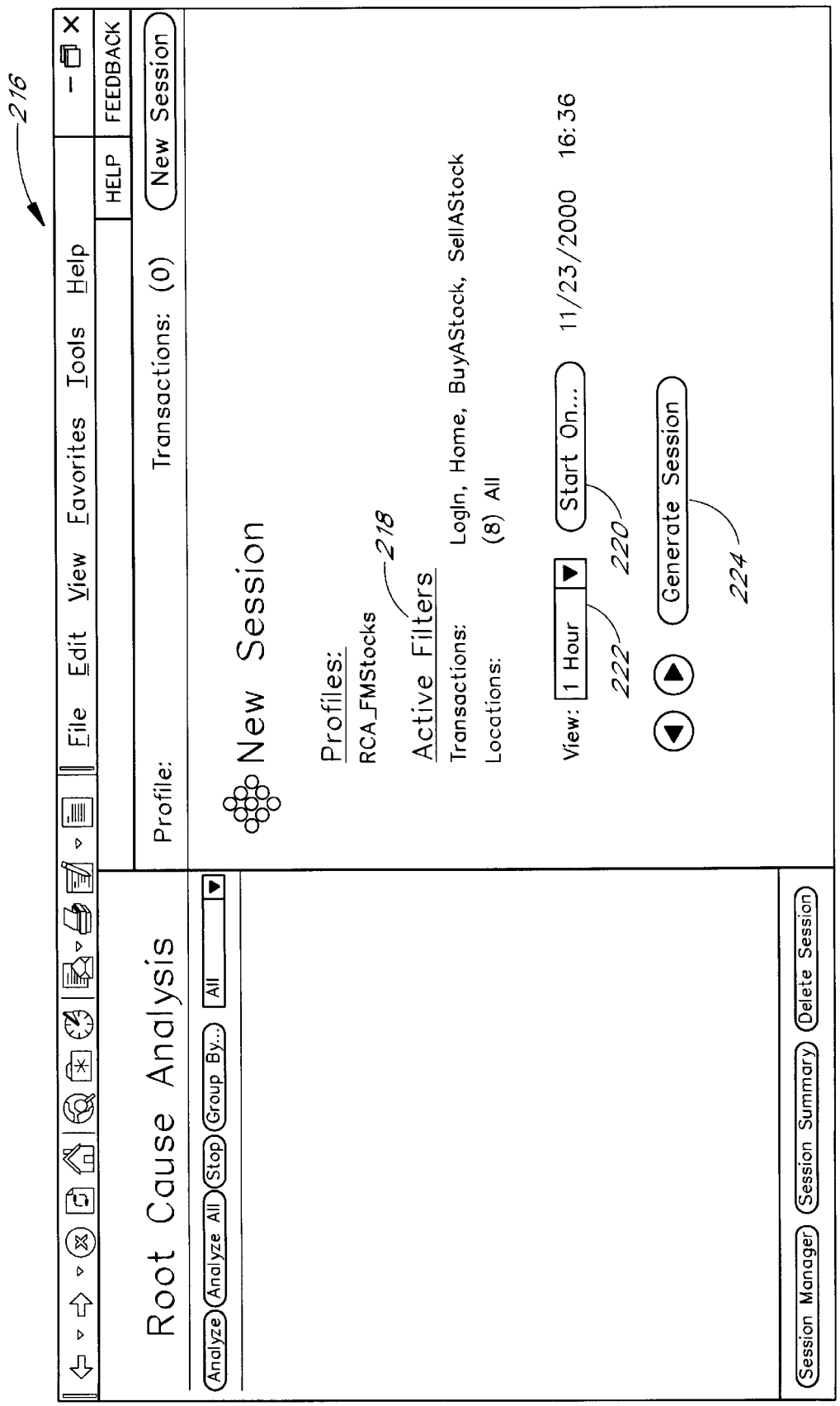
FIG. 32 illustrates an example "new session" screen according to one embodiment of the invention.

FIG. 32 depicts an example "new session" screen or page 216 shown to users directly invoking the RCA system 168. In the illustrated embodiment, the user is presented with a filter option 218 allowing the user to specify active filters defining particular transactions, locations and/or other attributes of interest to the user. The user is also presented with options 220, 222 to specify a particular time frame and start date for the RCA session. For example, as depicted in FIG. 32, the user has defined filters for analyzing the "Login," "Home," "BuyAStock," and "SellAStock" transactions occurring on Nov. 23, 2000 between 16:30 and 17:30 hours (i.e., between 4:30 p.m. and 5:30 p.m.). After specifying any desired filters, the start date and the time frame of interest, the user initiates the RCA process by selecting an option (such as button 224) to generate the RCA session.

If the RCA system 168 is invoked from within another performance report (e.g. the reports shown in FIGS. 21 and 31), the active filters already defined for that performance report are supplied to the RCA system 168 as the starting active filters for the new RCA session. For example, if a user selects the RCA button 214 from a performance report on the "Login" transaction (see FIG. 30), a RCA session is automatically generated to analyze performance problems experienced by the "Login" transaction (i.e., the "login user" transaction) during the time frame specified in the performance report.

Figure 33A:
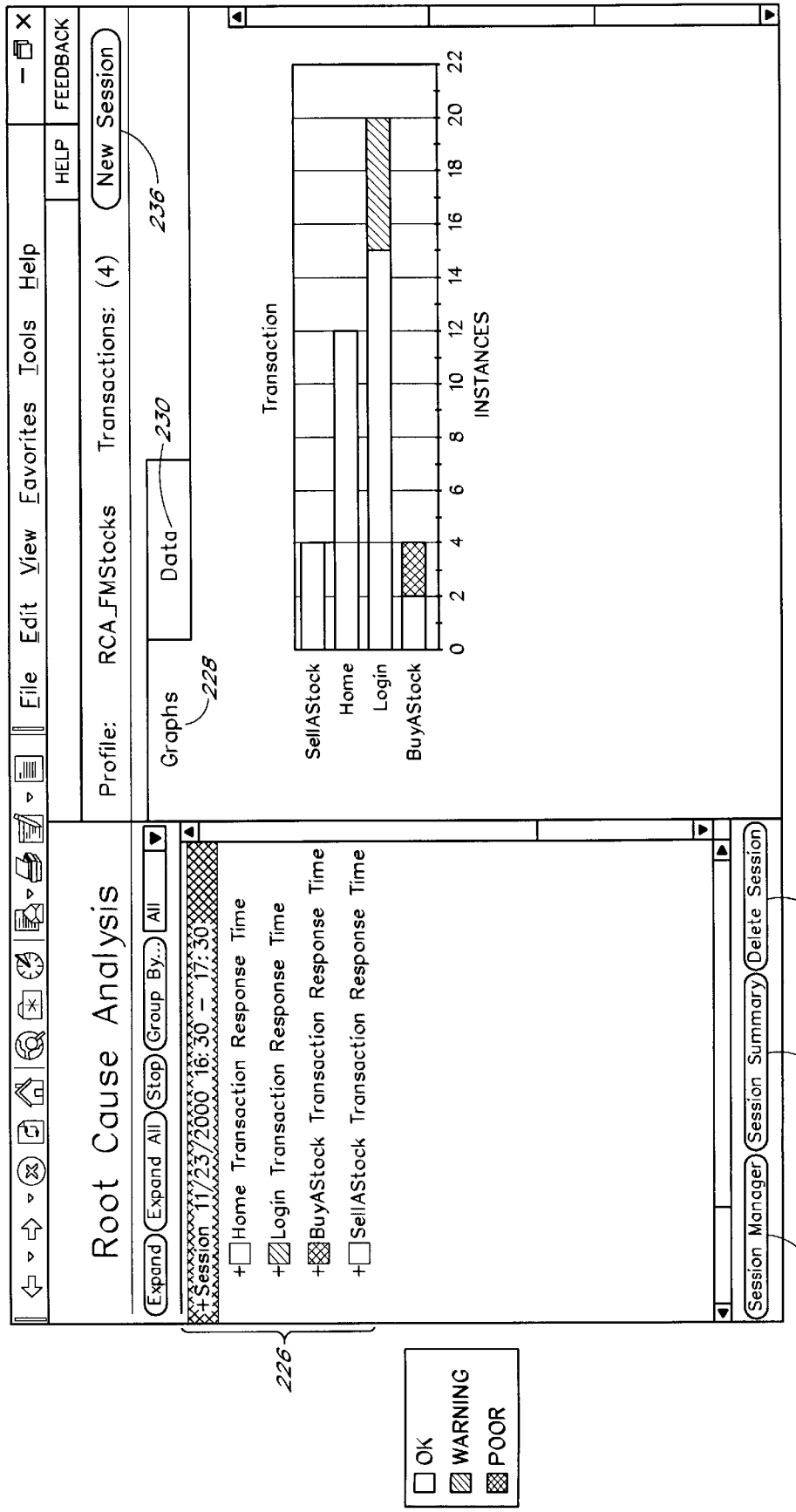
FIGS. 33A–36B illustrate example root cause analysis (RCA) screens according to one embodiment of the invention.

FIG. 33A illustrates an example RCA screen or page displayed upon initiation of the RCA session. The RCA system 168 initially builds a tree data structure to indicate which of the monitored transactions performed poorly during the specified time frame. The RCA UI tree 226 is based on (although not necessarily identical to) the underlying tree data structure built by the RCA system 168 during analysis of the performance data for the filtered transactions. Nodes of the RCA UI tree 226 that may be expanded by the user to view additional details are displayed with a "+" symbol throughout the RCA UI tree 226. Color coding (represented using hatching in the figures) indicates quality or severity grades based on comparisons with historical data, as described below.

In the illustrated embodiment, transaction response times are the highest level parameters represented in the tree. Lower level (more source-specific) parameters such as network time, server time, and specific server resource parameters are represented at lower levels of the tree, as described below. Using a "group by" button, the user may specify whether the transaction response times are to be grouped within the tree by transaction (FIG. 33A), by location (not shown), by severity grade (FIG. 41), or by other criteria. Regardless of the grouping method used, a user may navigate down the tree to effectively progress from general problem descriptions (e.g., "transaction response time of transaction T1 was ten seconds, which is longer than usual") to more specific problem descriptions that reveal the likely source of the performance degradation (e.g., "the number of user processes running on database server DB increased from 8 to 12.")

Although the expandable tree 226 provides a highly efficient and convenient mechanism for users to view RCA results (including associated performance data), other types of displays may additionally or alternatively be used. For instance, the RCA results may be displayed using tables and graphs (as in FIG. 37, discussed below), and/or using another type of hierarchical node structure such as a directed acyclic graph. Further, although transaction response times are the highest level parameters represented in the UI tree 226, other parameters such as "server time" or "page load time," may be the highest level parameters represented in other embodiments.

In the example illustrated in FIG. 33A, the data displayed in the RCA UI tree 226 is grouped by transaction, with all instances (i.e., all measurements) of the same transaction being grouped under one displayed node. There are five nodes displayed in the RCA UI tree 226 of FIG. 33A: a root "session" node and one node for each of the four transactions defined by the active filters set in FIG. 32. Status indicators associated with each node are color-coded to indicate normal, warning or poor performance levels. For example, a status indicator for a normally performing transaction is colored green. A status indicator for a questionably performing transaction (i.e., a warning performance level) is colored yellow, and a status indicator for a poorly performing transaction is colored red. Alternatively, various shapes or symbols may be used instead of or in combination with the color-coded indicators to identify how well or poorly a particular transaction performed, or the text itself may be color-coded to reflect the performance level of the particular transaction. The same or similar status indicators are preferably used to represent parameter quality grades at other levels of the tree (see, e.g., FIG. 35A). In the example depicted in FIG. 33A, the tree indicates that transaction response times for the transaction BuyAStock were generally "poor," over the specified one-hour time frame, relative to prior transaction response times for that transaction.

The status indicators are preferably based on a severity grade assigned to each instance (i.e., each measurement) of a parameter. Uniformity threshold percentages, which may be defined by the user or by default in the RCA system 168, are preferably used to ensure that a displayed transaction node is not assigned a poor status indicator if only a small fraction of the instances grouped under the node are actually performing poorly. For example, if there are one hundred instances of the "Login" transaction located during the specified time frame with only one of the instances performing poorly, displaying the "Login" transaction with a poor (i.e., red) status indicator may not accurately represent the overall transaction performance. Thus, a uniformity threshold percentage is defined to ensure that the displayed status indicator is representative of how uniform the severity grades are within a particular transaction group. A uniformity threshold percentage of 10%, for example, means that a poor status indicator is not displayed for the particular transaction node unless at least 10% of the individual transaction instances receive a poor severity grade. In the example illustrated in FIG. 33A, in which the displayed data is grouped by transaction only, different uniformity threshold percentages may be defined for different transactions, thereby allowing an important transaction (such as "Login") to have a relatively low uniformity requirement while requiring more uniformity in less important transactions (such as "Home"). Uniformity threshold percentages may also be defined for each severity grade.

For example, consider an illustration in which a user specifies a uniformity threshold percentage of 10% for all poor and 10% for all warning transactions. If the total number of measurements for a measurement group (a node) is one hundred, with eight having a poor severity grade and three having a warning severity grade, the percentage of poor measurements does not exceed the specified uniformity threshold percentage (8/100<10%); thus, the measurement group is not displayed with a poor status indicator. Instead, the poor measurements are grouped into the next best status indicator, which is a warning indicator. Because the number of measurements counted as "questionable" (8+3=11) is now above the specified threshold (11/100>10%), the measurement group is displayed with a warning status indicator. If there had been only six poor measurements and three questionable measurements, the measurement group would be displayed with a normal status indicator since the number of poor or questionable performing measurements would not exceed the specified threshold (9/100<10%).

Figure 41:
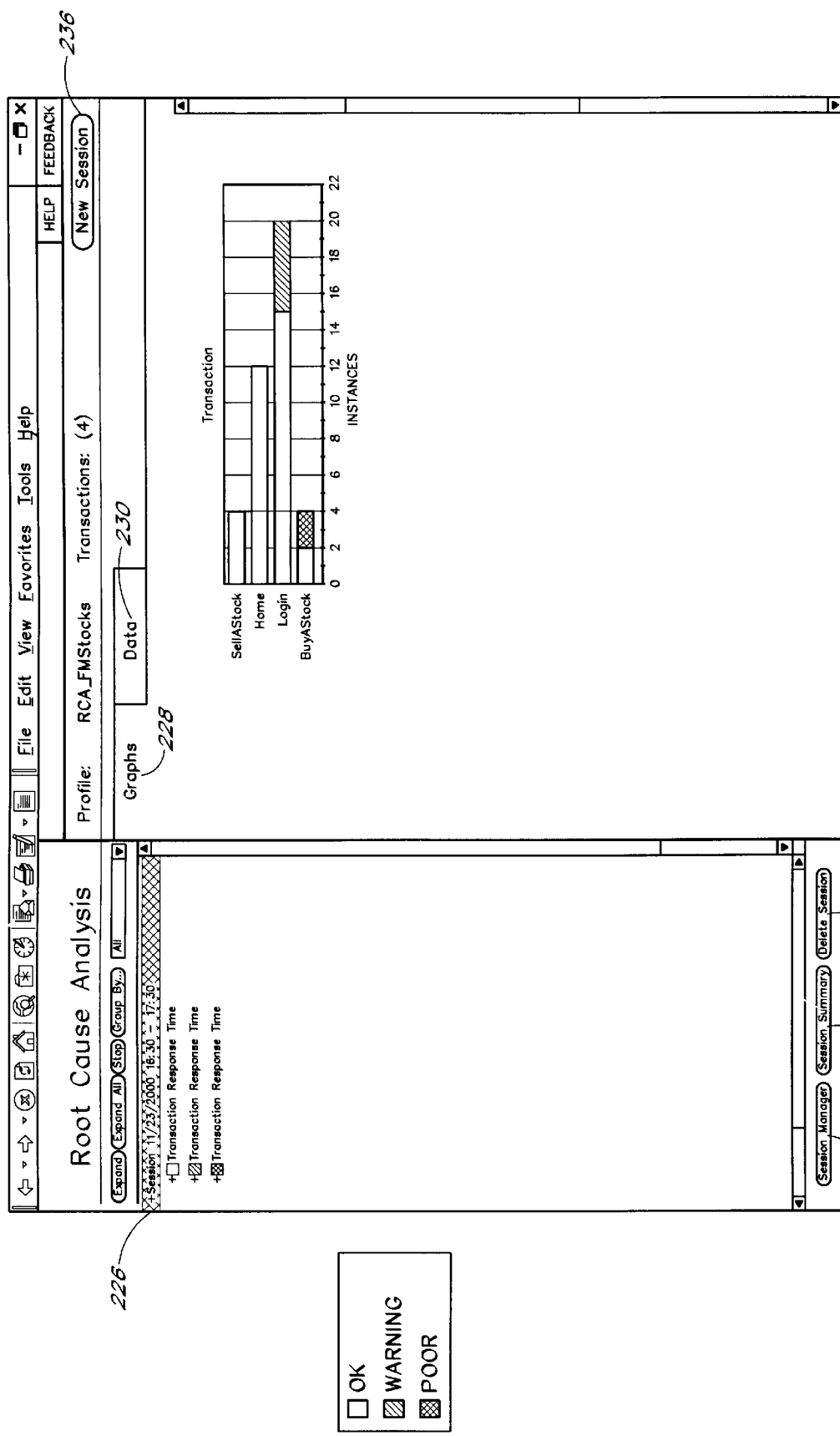
FIG. 41 illustrates an example RCA screen according to one embodiment of the invention.

As indicated above, the transaction measurements may alternatively be grouped in the RCA UI tree 226 according to severity grades as in FIG. 41. In the illustrated example of FIG. 41, three expandable nodes are displayed in the RCA UI tree 226, one for each severity grade (normal, warning and poor). Each displayed node represents a collection of transactions with the same severity grade, and typically includes one or more measurements of multiple transactions. For example, a node with a poor status indicator may include two measurements of the "BuyAStock" transaction and one measurement of the "Login" transaction.

The relevant measurements may also be grouped according to other criteria or attributes, including but not limited to the following: by agent 32 location; by time intervals (e.g., 10 or 15 minute sub-intervals); by ISP; or by type of performance problem detected (e.g. poor response time versus erroneous server response). Any one or more of these grouping options may be provided as an option within a given system. Further, each measurement of a transaction could be displayed as an individual node in the RCA UI tree 226.

Figure 33B:
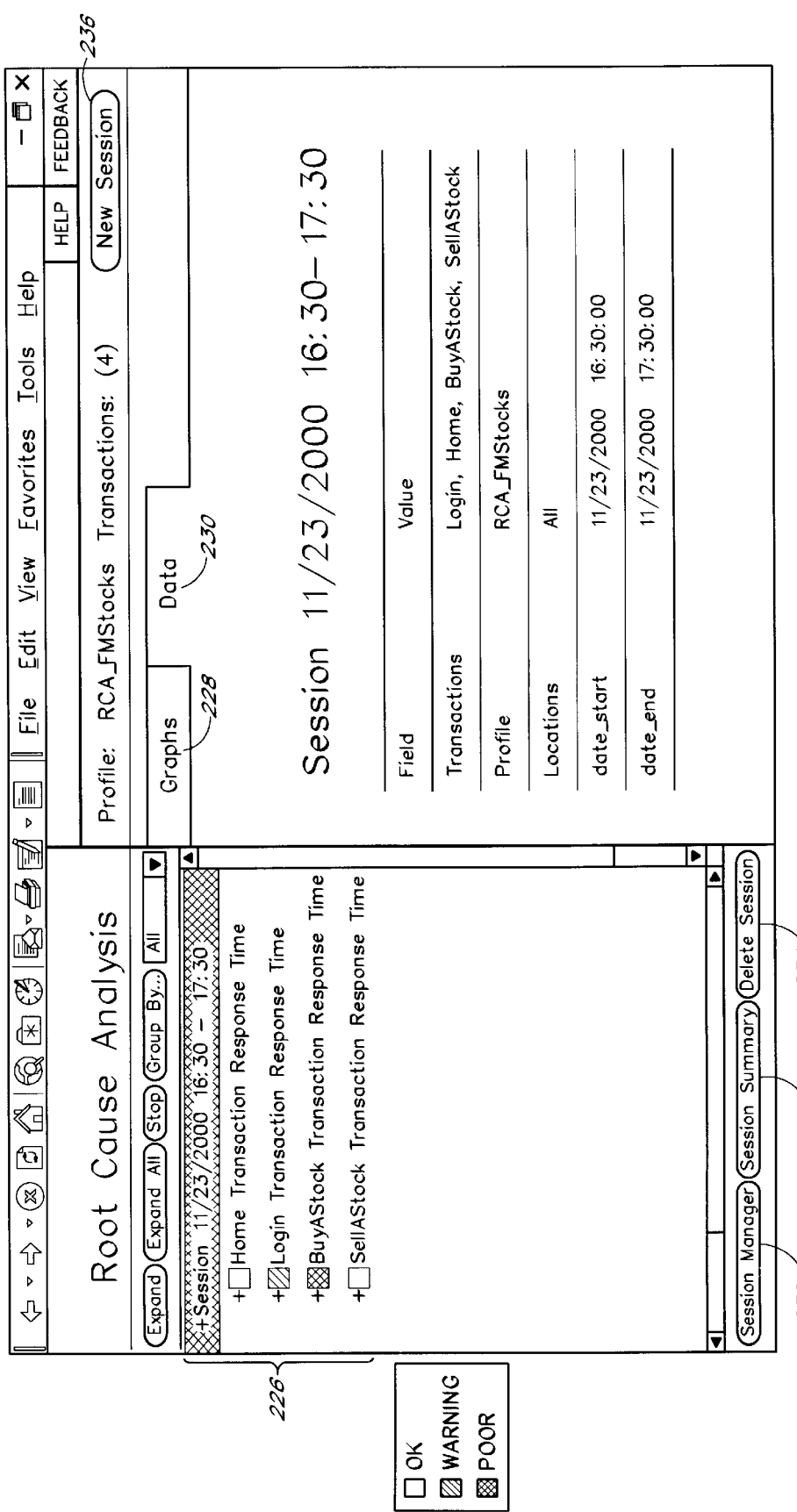

In addition to the RCA UI tree 226, the RCA system 168 preferably provides several other user views, including a graphical view (see FIG. 33A) and a tabular view (see FIG. 33B). To view a high-level graphical representation of the RCA session, the user selects a graphs tab 228 with the root session node highlighted. The resulting view, shown in FIG. 33A, depicts a color-coded graphical representation of how poorly each of the filtered transactions is performing. To view a high-level tabular representation of the RCA session, the user selects data tab 230 with the root session node highlighted. The resulting view, shown in FIG. 33B, depicts a tabular representation of the RCA session with several filters displayed in the data table.

Figure 34A:
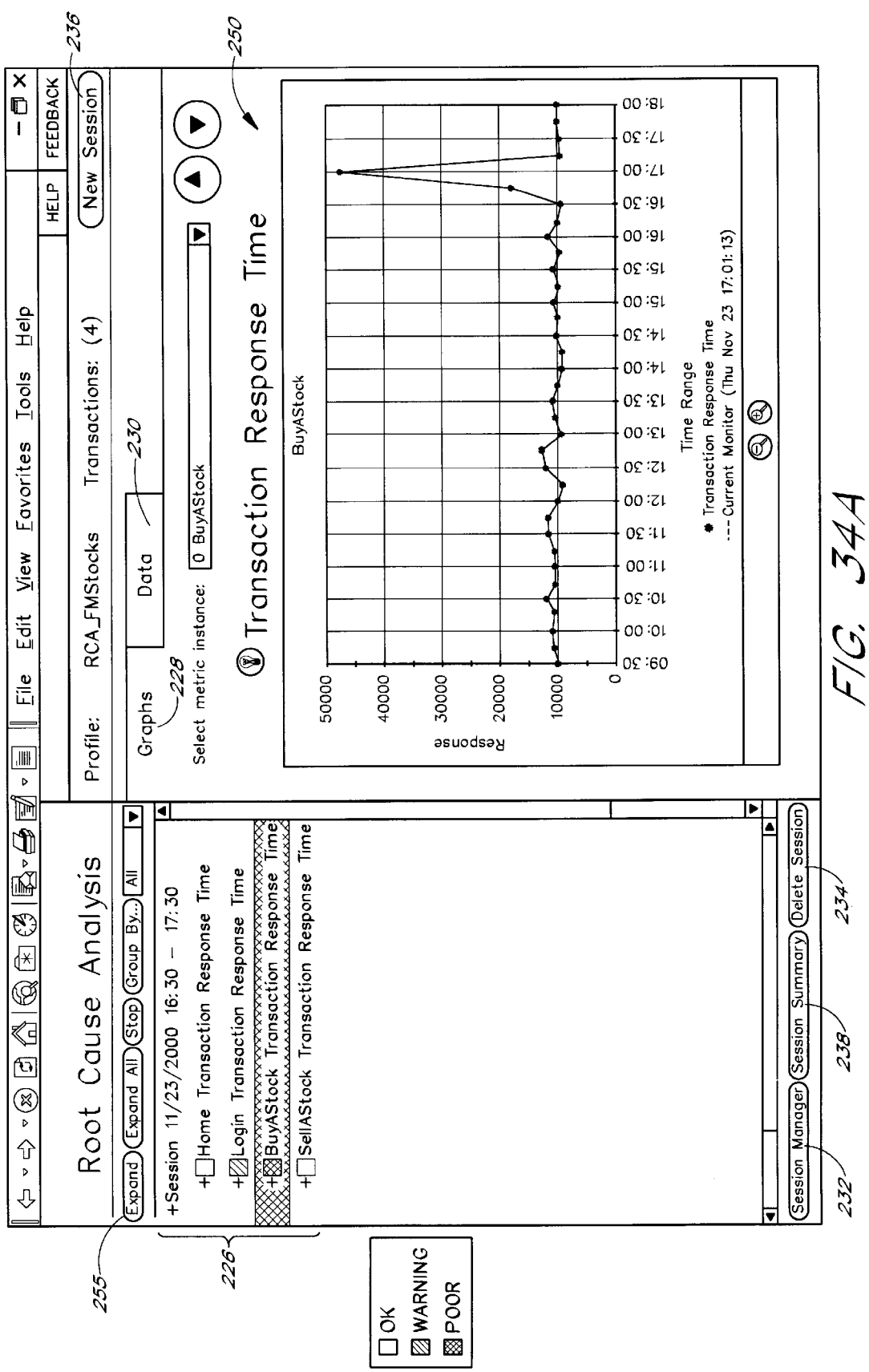
Figure 34B:
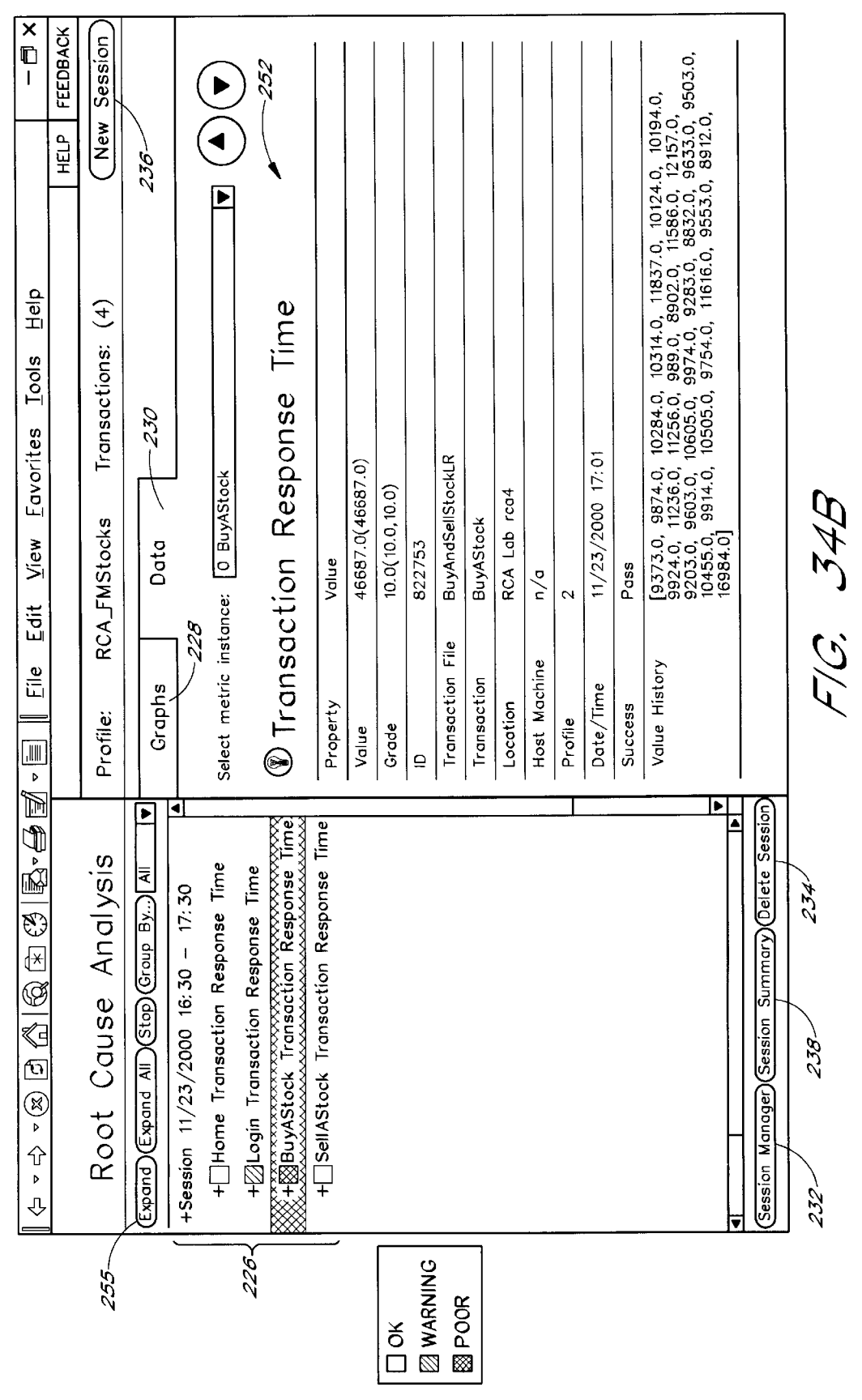

For more detailed information, the user highlights a poor performing transaction node from the RCA UI tree 226, such as, for example, the "BuyAStock" transaction node, and selects the graphs tab 228 to view a graph 250 of the transaction's performance during the specified time frame (see FIG. 34A). By selecting the data tab 230 with the transaction node highlighted, the user is able to view a tabular summary 252 of the transaction's performance (see FIG. 34B). The tabular summary includes, in one embodiment, a measurement value and a severity grade associated with this particular instance of the filtered transaction, and the historical values previously recorded for this transaction. The measurement value is a specific value recorded by the agents 32, 166. For example, if on Jan. 5, 2001 at 5 p.m. the "Login" transaction took five seconds to complete, then the measurement value associated with that instance (i.e., that measurement) of the "Login" transaction is five.

As discussed below, the quality levels of parameter measurements are preferably evaluated by comparing the "current" measurements to historical measurements of the same parameter. In order to decrease the effects of aberrational measurements, in one embodiment, the measurement values are not evaluated individually, but rather are evaluated as average measurements over short time periods, such as five or fifteen minute time slices. A similar effect may be achieved by applying a smoothing function (digital filter) to each sequence of measurements and then evaluating the measurements individually.

From the RCA UI tree 226, the user may highlight a transaction node and select an "expand" option 255 to obtain additional information about the possible parameters (also referred to as "monitors" or "metrics") affecting the performance of that particular transaction. The RCA system 168 then applies one or more predefined dependency rules to identify all of the possible parameters affecting the performance of the transaction. The performance data associated with each of the parameters is then analyzed by the RCA system 168 to predict which parameter(s) is/are the most likely cause of the problem. One benefit to performing the analysis of the child node data measurement data in response to expansion of the corresponding parent is that processing resources are not unnecessarily consumed. The analysis of the child node data may be initiated or completed at others times, such as, for example, before the user expands the nodes of the RCA UI tree 226, or in response to selection by the user of an "expand all" link.

Upon expansion, the identified parameters are displayed in the RCA UI tree 226 as additional (child) nodes that may, in some cases, be further expanded to drill down to more specific root causes of the performance problems. As with the earlier transaction nodes, the newly added metric nodes are color-coded to indicate normal, questionable and poor performance or quality over the selected time period. For example, when a user expands a particular transaction node, a dependency rule may specify that the transaction is to be broken down into network time, server time and other such system time measurements (see FIG. 35A), each of which will be displayed as a separate metric node below the transaction metric node. If the "server time" performance data indicates poor performance, the server time metric node is displayed with a red status indicator to indicate that it is the likely source of the problem (based on an automated, statistical comparison of the server time measurement to historical server time measurements). The user may then select the poor performing server time node to view a graph (see FIG. 35A) or tabular summary (not shown) of the performance of the server time metric for the filtered time frame.

Figure 35A:
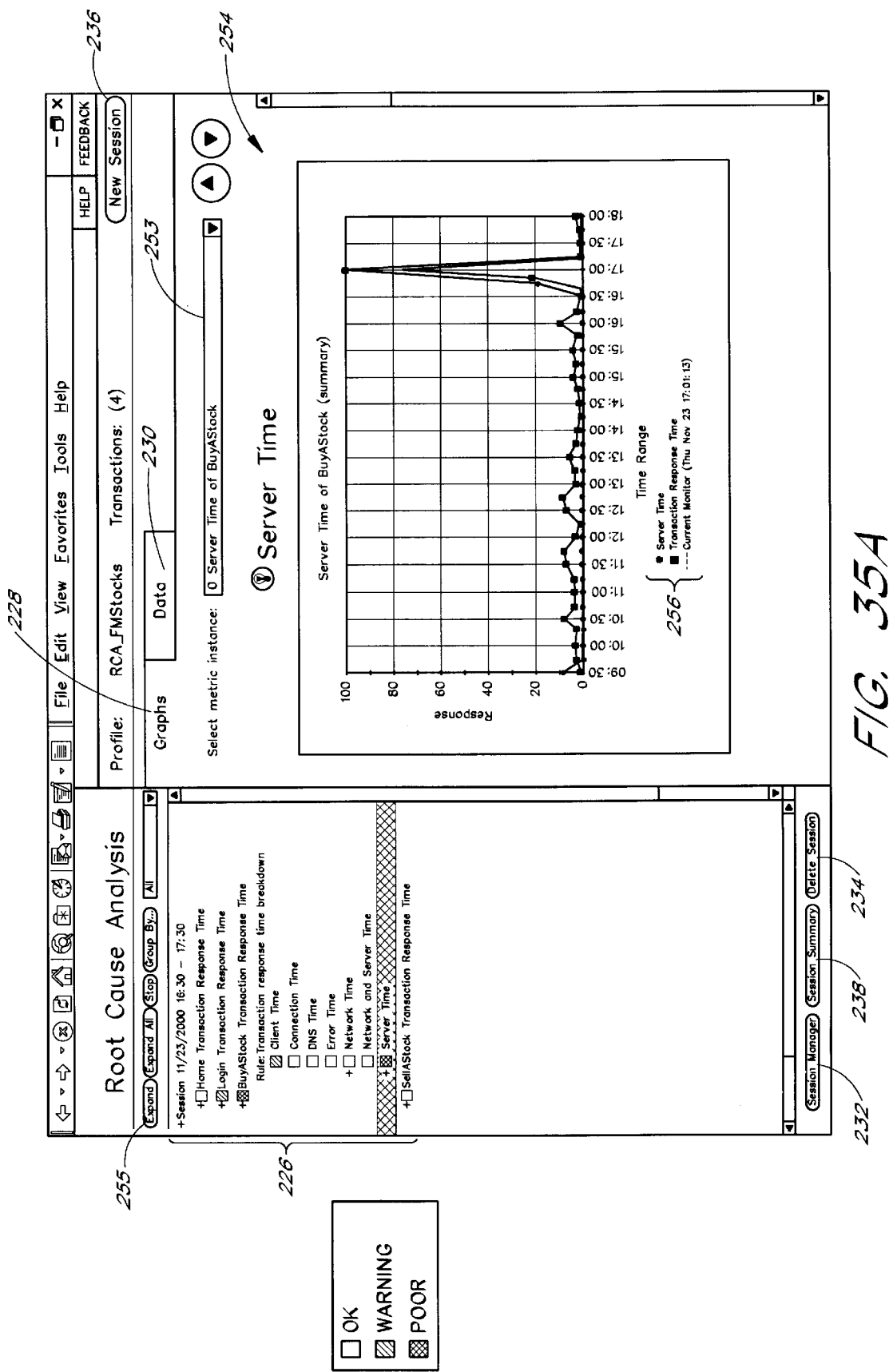
Figure 35B:
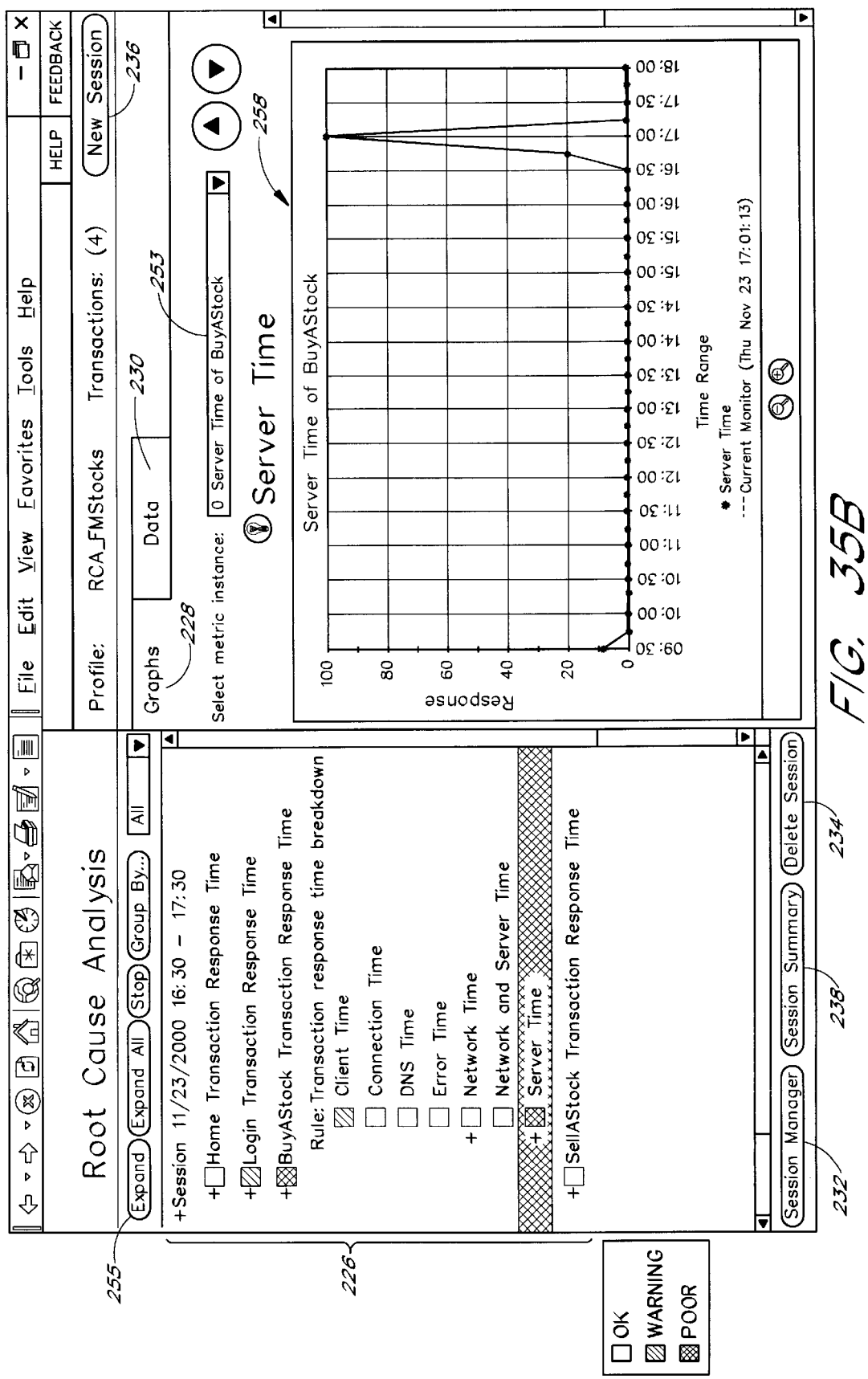

In one embodiment, the graph of a metric or parameter node displays data for both the highlighted metric node and all ancestor metric nodes. For example, as illustrated in FIG. 35A, the graph 254 for the server time node includes data on both the "BuyAStock" transaction response time and the server time for the "BuyAStock" transaction displayed on a normalized scale of 1 to 100. For ease of viewing, each metric is displayed on the graph 254 in a separate color in accordance with a legend 256. Another graph 258 displaying data for only the highlighted server time node in its actual scale is additionally or alternatively displayed (see FIG. 35B). In one embodiment, in which a single node represents a collection of transaction instances, an instance selection option 253 is provided so that a user may view the data for each instance individually. The instance selection option 253 is also useful when transactions are grouped by severity grade (FIG. 41) by allowing the user to view individual graphs on each of the multiple transactions grouped under a particular severity grade node. For example, if a "poor" performing node contains both a "BuyAStock" transaction instance and a "SellAStock" transaction instance, the user may use this selection option 253 to view separate graphs of the "BuyAStock" transaction instance and the "SellAStock" transaction instance after selecting the "poor" performing node from the RCA UI tree.

The user may also expand the server time node to drill down further. Upon expanding the server time node for which poor performance is indicated, the RCA system 168 may, for example, display nodes representing respective server resource parameters or metrics, with one or more of these nodes displayed in red to indicate that it is a likely source of the performance problem (see FIG. 36A). Similarly, if the network time metric node indicates poor performance, the RCA system 168 user may drill down to the routing time (measured by the Webtrace Analysis feature described above) or to the hop delay metric to determine the root cause of the performance problem.

Figure 36A:
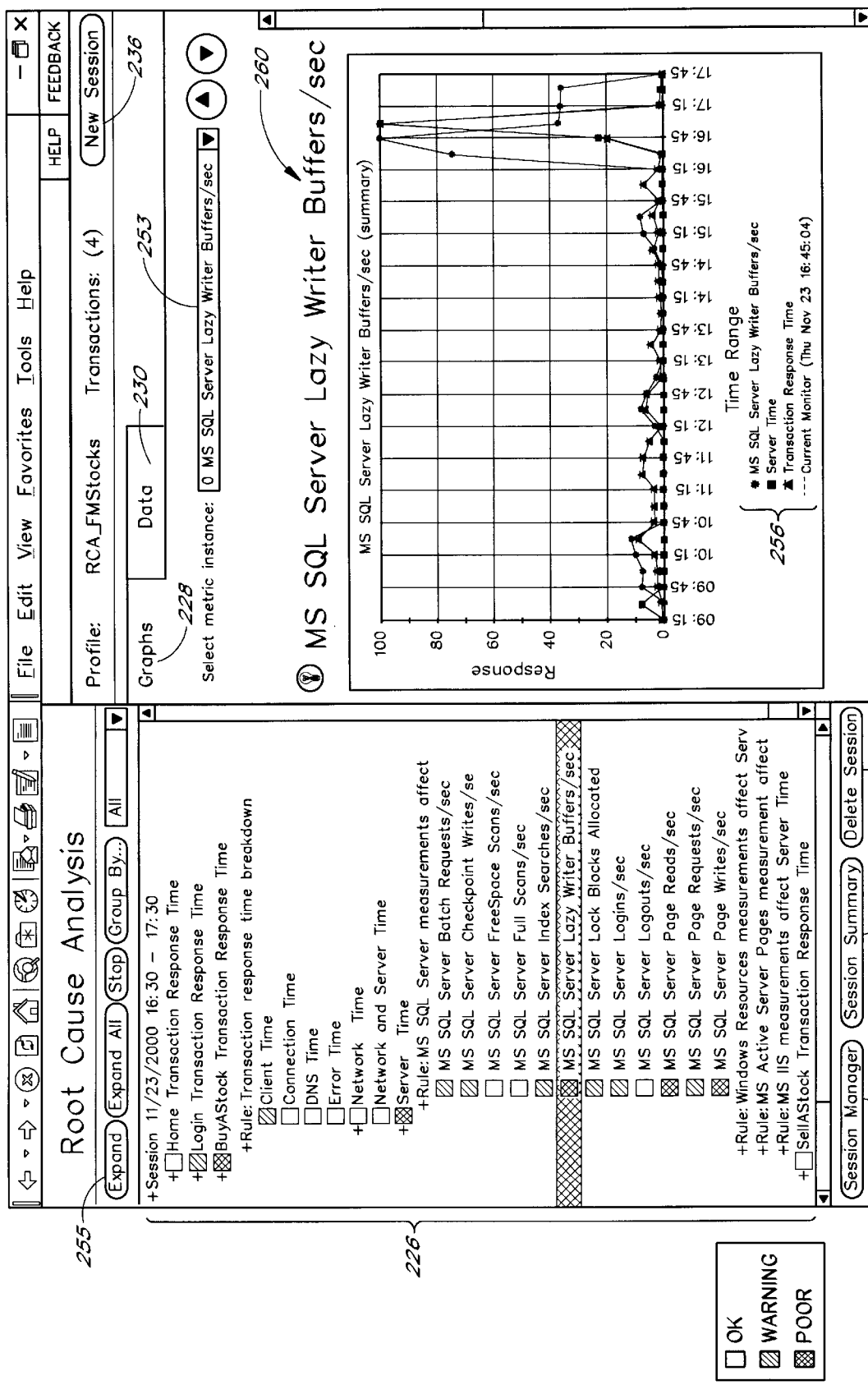
Figure 36B:
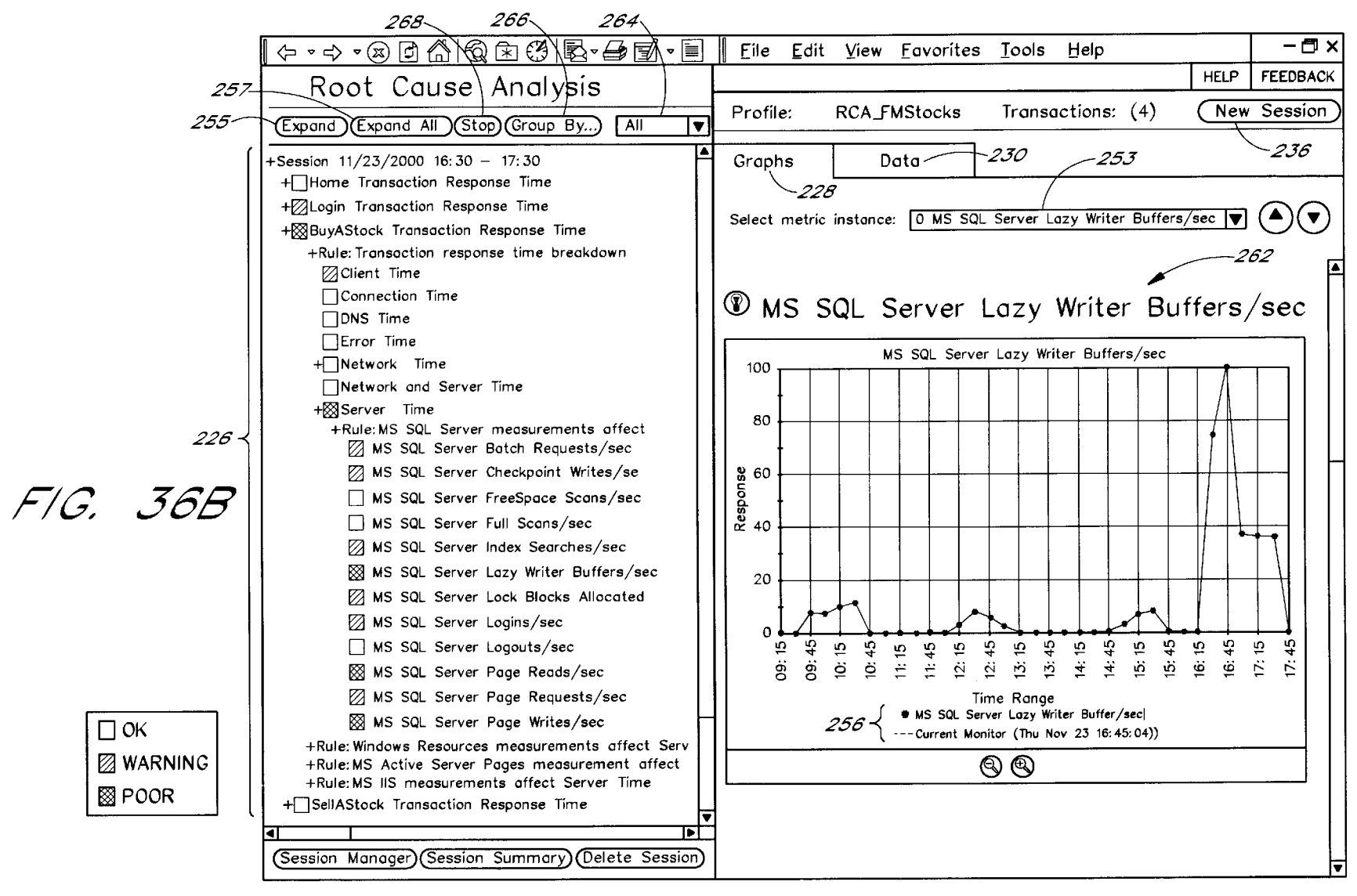

As illustrated by the example of FIG. 36A, the RCA system 168 allows the user to quickly and efficiently drill down to determine the likely root cause or source of a performance problem, without the need to view large quantities of data. In this example, the "transaction response time" level of the UI tree reveals that a performance degradation has been detected in runs of the BuyAStock transaction. The children nodes of the "BuyAStock transaction response time" node, excluding the rule node, each correspond to a potential source or cause of this performance degradation (server, network, client, DNS look-up, etc.). These children nodes identify the transactional server 30 itself as the most likely source of the performance degradation in this example, since only the "server time" node has a status indicator of "poor."

With further reference to FIG. 36A, by expanding the "server time" node and its associated rule nodes, the user can then drill down to an even lower level in which some or all of the nodes represent respective server resource utilization parameters potentially associated with the poor server time. Each of these server resource utilization parameters (also referred to as "server monitors") again represents a potential source or cause of performance degradation. In this example, several of the server resource utilization parameters performed poorly over the selected one-hour time frame. To further evaluate the extent of the correlation between each such server resource utilization parameter and server (and transaction) response time, the user can select each leaf node to view time-synchronized graphs 260 of the relevant parameters. In this example, the graphs indicate that a strong correlation exists between the "MS SQL Server Lazy Writer Buffers/sec" parameter and both server and transaction response time.

Although the examples in the screen displays include transaction breakdown parameters (network time, server time, DNS time, etc.), these parameters may be omitted. For instance, in embodiments in which the agents 32 measure transaction response times but do not perform a transaction breakdown, a dependency rule may simply specify a set of server resource parameters that affect transaction response times. When the user expands a transaction response time node in such embodiments, a set of server resource parameter nodes may be immediately displayed rather than the intermediate set of transaction breakdown parameter nodes.

In one embodiment, expandable nodes identifying dependency rules associated with the metric or parameter are displayed with color-coding to indicate whether any of the metrics connected with the dependency rule are the likely sources of the performance problem. For example, the "+" or "−" symbol or the text of the rule itself may be displayed in red if metrics connected with the dependency rule performed poorly. Just as with metric nodes, a user may select a rule node and view a graphical or tabular view of the rule node data. When the highlighted node is a rule node, the graphical view displays a graph showing the different clustering of metrics under that rule node and how they correlate with the status indicator of the rule node. For example, in one embodiment, the status indicator associated with a rule node in the RCA UI tree 226 is the maximum severity grade of its child nodes. The session node discussed above is a special initial rule node defining the particular transactions to be analyzed. For examples of the graphical and tabular views displayed for rule nodes, see FIGS. 33A and 33B.

As illustrated in FIG. 36A, a dependency rule under the server time metric node of the "BuyAStock" transaction indicates that the MS SQL server lazy writer buffers/sec metric affects the performance of the server time metric. By highlighting the MS SQL server lazy writer buffers/sec metric node and selecting the graphs tab 228, the user may view a graph 260 for the MS SQL server lazy writer buffers/sec parameter over the relevant time frame. The graph 260 displays data for the MS SQL server lazy writer buffers/sec metric as well as the overall transaction response time and the server time for the "BuyAStock" transaction on a normalized scale. Alternatively, the user may view a graph displaying data for only the highlighted MS SQL server lazy writer buffers/sec node (see FIG. 36B), or the user may view a tabular summary (not shown) of the performance of the MS SQL server lazy writer buffers/sec metric for the filtered time frame.

Using a drop-down list 264 (see FIG. 36B), the user chooses whether to display nodes for only the poor performing metrics, the poor and questionable metrics, or all metrics. A grouping option 266 allows the user to change the displayed grouping under any dependency rule node. For example, the nodes may be displayed by transaction, location, or by another attribute. This grouping is, in one embodiment, in addition to the grouping by severity grades performed by the RCA system 168.

Rather than recursively selecting each metric node and then selecting the expand option 255 until no expandable nodes remain, the user may instead select an "expand all" option 257 to expand the entire RCA UI tree 226 in a single action. To reduce the processing time needed to perform the "expand all" operation, the user may initially use the drop down list 264 to limit the display—and thus the expand operation—to nodes having "poor" and/or "questionable" status indicators. The user may stop the expansion process prior to completion by selecting a stop option 268. In other embodiments, the RCA system 168 may be configured to automatically expand or display all nodes, or nodes of a certain severity grade, without requiring the user to initiate an expand operation.

At any point during the RCA session, the user may also invoke another RCA session by selecting a new session option 236, at which point the user is presented with the new session screen 216. The user may save existing RCA sessions for later review by using a session manager option 232, and may delete unneeded RCA sessions using the delete session option 234.

Figure 37:
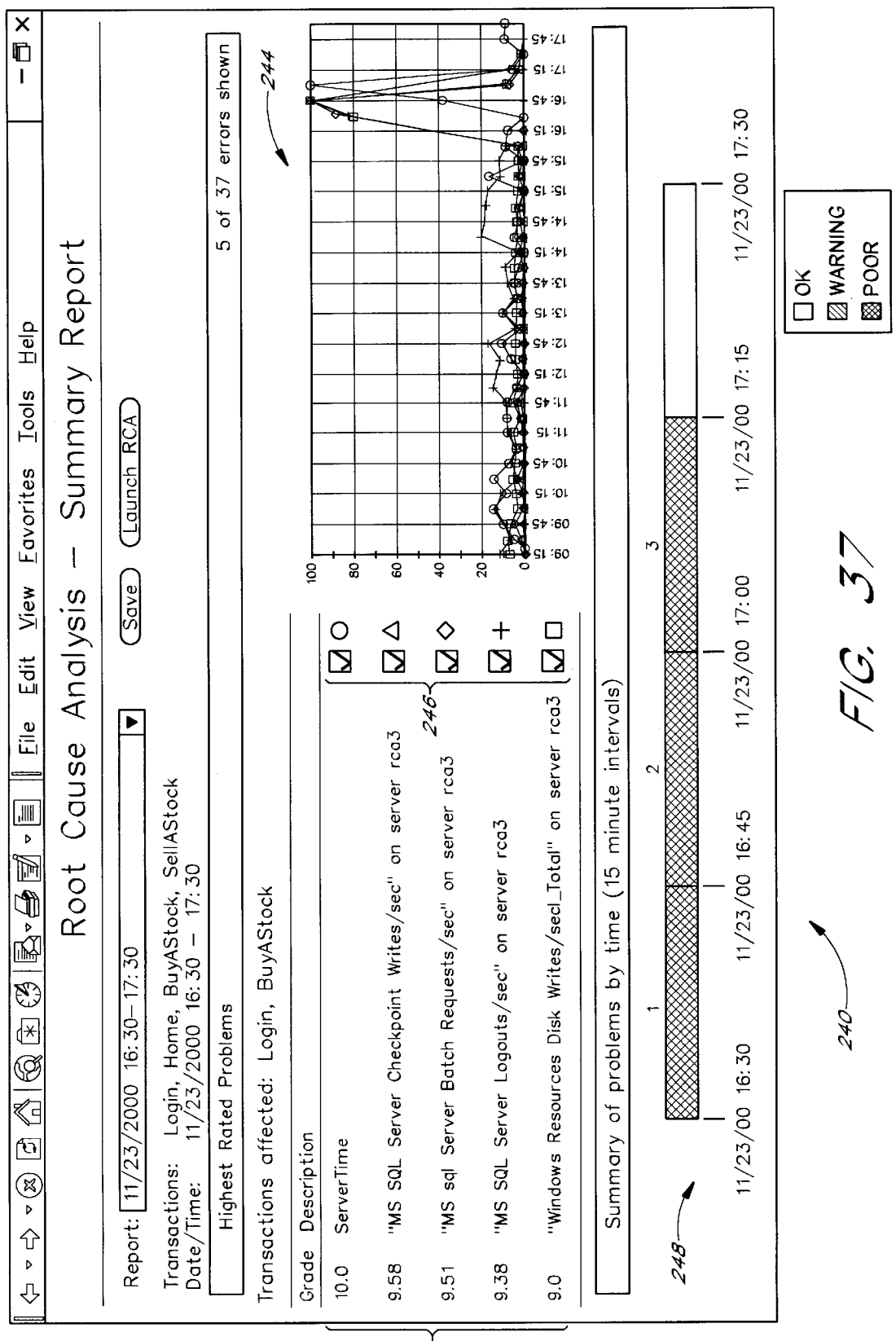
FIG. 37 illustrates an example RCA summary report screen according to one embodiment of the invention.

The user may also view a RCA summary report by selecting a summary report option 238 from the RCA session screens. An example RCA summary report 240, which provides an automated summary predicting the most probable sources of the performance problems, is illustrated in FIG. 37. In the illustrated embodiment, the user is presented with a list 242 of the most probable sources of the problem and a numerical severity grade assigned to each of the sources by the RCA system 168. The severity grade reflects how poorly a particular source (parameter) performed in comparison to previous performance levels for the particular source. In another embodiment, the sources identified in the RCA summary report 240 are selected by the RCA system 168 because their performance exceeded a user-specified or default threshold.

As further illustrated in FIG. 37, a time-synchronized graph 244 of performance data for the identified parameters is displayed to the user in the illustrated embodiment. The time-synchronized graph 244 is color-coded with a distinct color assigned to each identified parameter. Additionally, the user is presented with a selection means (such as checkboxes 246) for specifying which of the parameters to display in the time-synchronized graph 244. For example, using the checkboxes 246, the user may opt to display data for only the two or three worst performing sources in the time-synchronized graph 244. In yet further embodiments, the RCA summary report 240 displays a summary of performance problems broken down by discrete time intervals, such as 10 or 15 minute intervals. Additionally, using the alert notification procedures described above, the RCA summary report 240 may be automatically generated and sent along with defined alert notifications.

2. Architecture and General Operation

Figure 38:
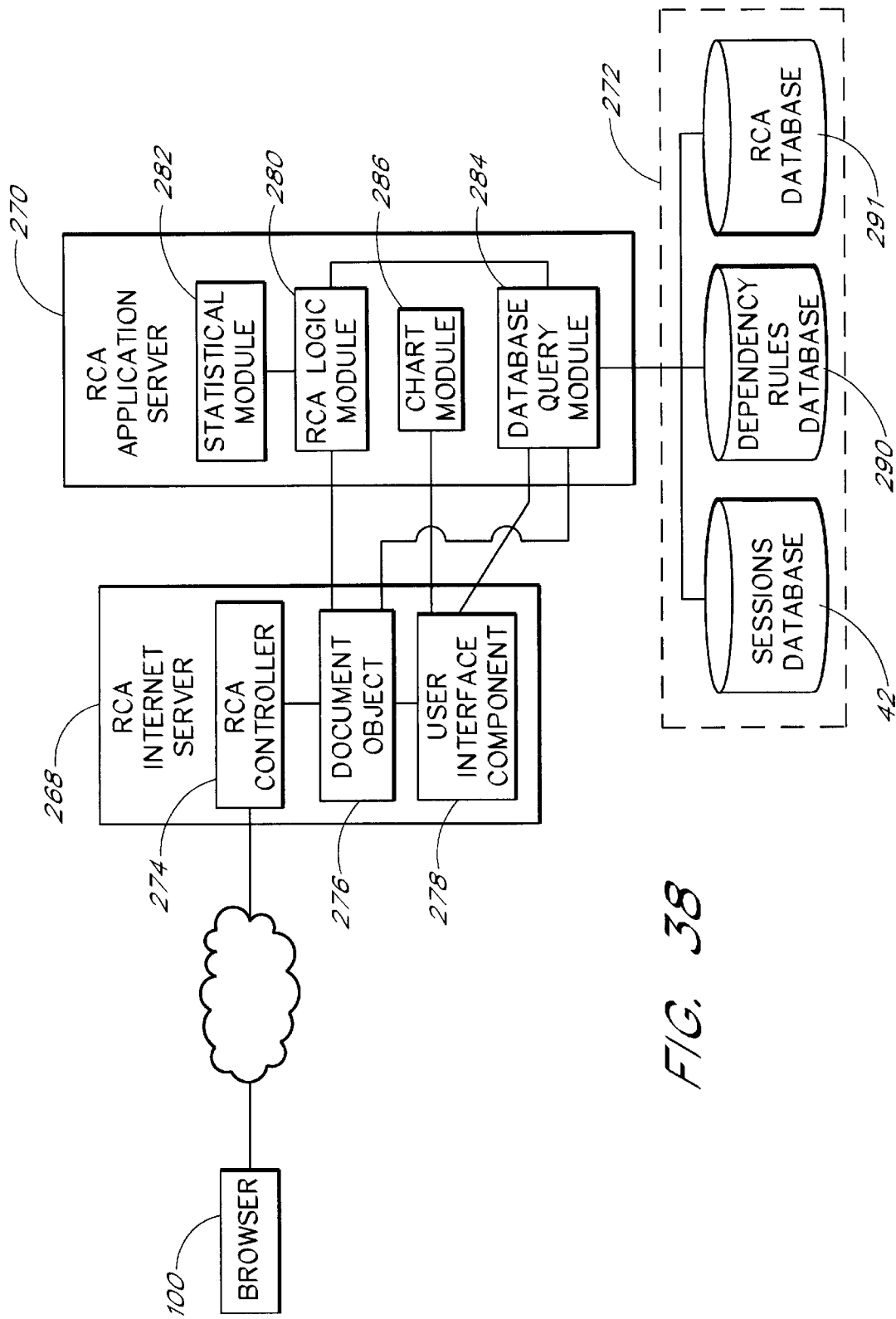
FIG. 38 illustrates a high-level block diagram of an RCA system according to one embodiment of the invention.

FIG. 38 illustrates the architecture and general operation of the RCA system 168, which is accessible to users through a browser 100 or other user device such as an Internet-enabled handheld device (not shown). The major components of the RCA system 168 in this embodiment include a RCA Internet server 268, a RCA application server 270, and a database bank 272 accessible to the RCA system 168. In the illustrated embodiment, the RCA system 168 may be shared by many different users or customers of a hosted monitoring service, and may thus be used concurrently to analyze the performance of many different web sites or other systems. The RCA system 168 may alternatively be set up, for example, on a corporate network and used exclusively for analyzing the server system(s) of a particular organization.

Users preferably connect to the RCA system 168 through the RCA Internet server 268. The RCA Internet server 268 includes a RCA controller 274 that receives requests from the user devices, such as the browser 100, and forwards the requests to the appropriate RCA system component. For example, in one embodiment, the RCA controller 274 is a servlet, such as Tomcat or another Java servlet, capable of receiving Hypertext Transfer Protocol (HTTP) requests from the browser 100 and converting the requests to inner structures and method calls. The RCA Internet server 268 also includes a document object 276 and a user interface component 278.

The document object 276 includes a data structure that contains data representing the current analysis state of the RCA system 168. The data structure stored by the document object 276 is the RCA tree data structure, which includes metric nodes for each instance (i.e., each measurement) of a transaction. Table 5 summarizes, for one example embodiment, the type of information included in a metric node of the RCA tree data structure. Any of a variety of alternative structures may be used. As used herein, and as understood by one of ordinary skill in the art, references to a node including or containing a set (such as with dependency rules below) is understood to include the actual storing of data as well as the storing of a pointer to a memory address and/or physical location where the data is located. The document object 276 communicates with the RCA logic module 280 (see below) and database query module 284 (see below) to update the data stored in the metric nodes of the RCA tree data structure.

TABLE 5

EXAMPLE INFORMATION CONTAINED IN A METRIC NODE

| NAME | DESCRIPTION |
|---|---|
| Metric Name | Contains name of metric |
| Metric ID | Contains a unique identifier for the metric |
| Property Set | Contains field-value pairs used to filter performance data, such as, for example, transaction IDs for transactions to be evaluated and an identifier for the statistical method to be used in evaluating transaction measurements |
| Dependency Rules | Set of rules listing the metrics affecting the metric identified by the metric ID |
| Severity Grade | Grade indicating how poorly the metric performed (as measured by the measurement value associated with the particular instance of the metric) |

The user interface component 278 provides an interface between the user and the RCA system 168. The interface typically includes textual information as well as graphs or charts, and may be implemented with Java Beans, hypertext markup language (HTML), Java server pages (JSP) or another appropriate format. The user interface component 278 listens to notifications from the RCA controller and/or from the document object, and queries the document object to receive current RCA system data. In one embodiment, the view provided by the user interface component 278 includes the expandable RCA UI tree 226 (see FIG. 33A) allowing users to easily and quickly review the results of the RCA system's analysis and invoke further RCA functions.

The RCA application server 270 implements the logical and statistical algorithms used to evaluate the performance data. The major components of the RCA application server 270 include the RCA logic module 280, the statistical module 282, the database query module 284, and the chart module 286. The RCA application server 270 communicates with the RCA Internet server 268 via an application programming interface, such as, for example, Enterprise Java-Beans (EJBs). Communications between the RCA application server 270 and the various databases in the database bank 272 are conducted by the database query module 284. The chart module 286 supplies chart templates and forms used by the user interface component in displaying the root cause analysis data.

The RCA logic module 280 includes functionality for evaluating the performance data for the transactional server 30 being tested. To evaluate the performance data, the RCA logic module 280 formulates database queries to retrieve measurement values for particular metrics or parameters that affect the performance of the transactional server 30. A metric identifier uniquely identifies each of the metrics. The database query module 284 accesses the sessions database 42 and other performance data databases to execute the queries formulated by the RCA logic module 280. The measurement values retrieved by the database queries are analyzed by the statistical module 282, using statistical methods described below, to determine whether the values indicate a significant change in the performance of the metric as compared to previous measurement values for the particular metric. A RCA database 291 containing RCA metadata is also accessible to the database query module 284.

Another database accessible to the database query module 284 is the dependency rules database 290, which contains a list of all dependency rules in the RCA system 168. The dependency rules are typically provided with the RCA system 168 (see set of default dependency rules in Table 6), but the user may also add, edit or delete dependency rules from the dependency rule database using the controller 34. The dependency rules identify, for a given metric (as represented by the metric identifier), all other metrics affecting the measurement value of the given metric. The metric being affected is called the affected metric, and the metrics affecting the given metric are called the affecting metrics. Because one metric may be affected by a number of affecting metrics, the dependency rules typically define a one-to-many relationship.

The dependency rules, which may be prioritized or weighted by a user or an automated process, guide the RCA system 168 from the high-level manifestation of the problem, such as a transaction response time or fail rate increase, to the lower-level and root causes of the problem, such as an increase in the number of processes running on the transactional server 30. The child nodes thereby "explain" the parent nodes according to the dependency rules defined in the RCA system 168. For example, if the transaction response time for the "BuyAStock" transaction took 20 seconds (5 seconds more than previous runs of this transaction), the RCA system 168 may treat the event as a performance degradation (such as by marking the relevant transaction node with a "poor" or "questionable" status indicator). Using a dependency rule that suggests breaking the "BuyAStock" transaction into smaller internal transactions, the RCA system 168 may then evaluate a sub-transaction for the "BuyAStock" transaction and discovers that the sub-transaction took 5 seconds (2 seconds more than previous runs of the sub-transaction). Using another dependency rule that suggests breaking the sub-transaction into server time and network time components, the RCA system 168 may then determine that the server time component of the sub-transaction took 2500 milliseconds (2000 milliseconds more than previous runs of the sub-transaction). Using yet anther dependency rule indicating that the MS SQL server resource parameters on database server DB2 affect transaction server time, the RCA system

168 may retrieve the performance data for the MS SQL server resource parameters and determine that the "reads per second" parameter indicates an increase of fifty percent when compared to previous measurements. Thus, as illustrated by this example, the RCA system 168 directs the user from the high level performance problem (a regression in transaction response time) to a specific source or cause of the problem (50% increase in reads per second on database server DB2).

As seen by the above example, the dependency rules may specify that a metric should be broken down into multiple sub-metrics, such as breaking a transaction response time into server time and network time components. This type of rule is referred to as a "break down" dependency rule. Dependency rules may also identify one or more metrics that affect the measurement value of a given metric (such as server time being affected by a "reads per second" server resource parameter). This type of rule is referred to as a "influenced by" dependency rule.

Table 6 lists a set of default dependency rules according to one embodiment. The RCA system automatically adds the following two additional rules each time a user adds a server monitor to the profile: (1) under "Server Time," a rule named: "<Server Monitor Name> affects Server Time" (e.g. "Windows Resources Monitor affects Server Time"); and (2) under "Failed Transaction," a rule named: <Server Monitor Name> affects Failed Transactions (e.g., "Windows Resources Monitor affects Failed Transactions").

It is contemplated that each of the above-described modules may be integrated into one software module, or may be separated into additional modules. The modules may be implemented as hardware, software, firmware or any combination thereof. Additionally, the modules may reside at different geographic locations connected through a wired or wireless network.

3. Root Cause Analysis Methods

Figure 39:
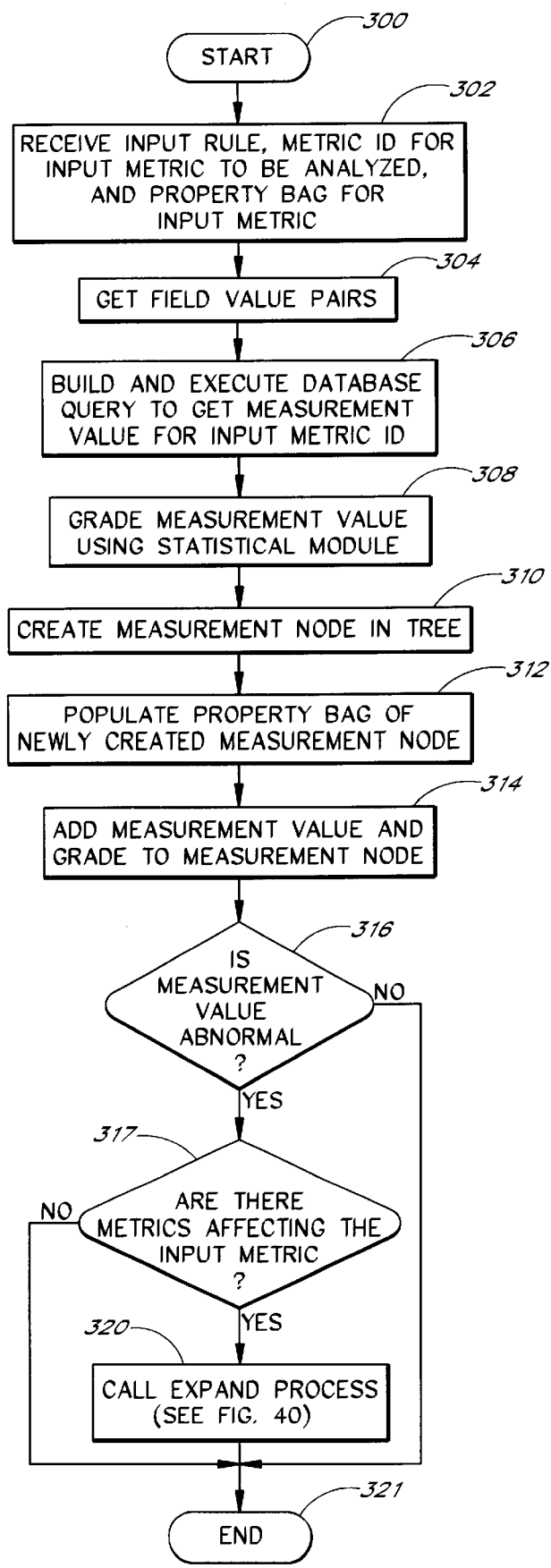
FIG. 39 illustrates a flow chart for getting and grading a measurement value according to one embodiment of the invention.
Figure 40:
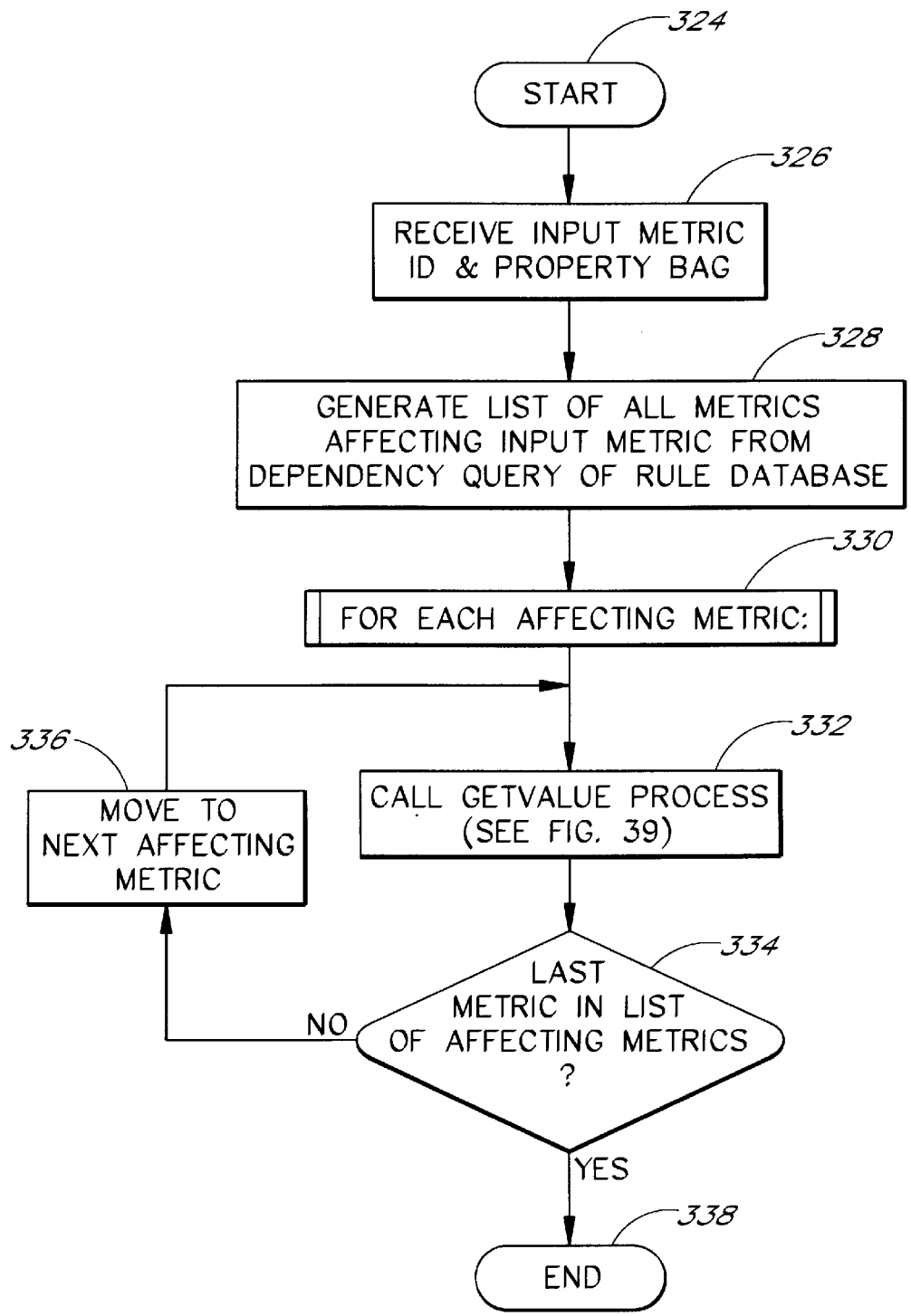
FIG. 40 illustrates a flow chart for an expansion process according to one embodiment of the invention.

FIGS. 39 and 40 illustrate flow charts for evaluating the performance data for a transactional server 30 according to one embodiment. The performance data is evaluated by measuring and grading values of various parameters or metrics that affect or reflect the performance of the transactional server 30. A statistical module 282 is used to grade the measurement values by comparing the current measurement value with previous measurement values for the particular metric. The current measurement value may be a measurement associated with a single measurement instance or an average or sum of several measurement instances taken over a short time interval, such as, for example, 5 minutes. If the measurement value of the particular metric is affected by (i.e., depends on) other metrics, each of the affecting metrics is similarly measured and graded. This process of measuring and grading affecting metrics is recursive, being repeated for each affecting metric until the methods reach a point at which the last affected metric has no affecting metrics (i.e., the measurement value of the last

TABLE 6

DEFAULT DEPENDENCY RULES

| Rule Name | From | To |
| --- | --- | --- |
| Transaction response time breakdown | Transaction Response time | Server Time, Network Time, Network and Server Time, DNS Time, Connection Time, Client Time |
| Routing time affects network time | Network Time | Routing Time, Routing Time - Global Error Count |
| Routing parameters | Routing Time | Hop Number, Routing DNS Time |
| Routing time breakdown by hop | Routing Time | Hop Time (ms) |
| Routing time breakdown by route number | Routing Time | Hop Time by Route Number |
| Errors by Hop | Routing Time - Global Error Count | Errors by Hop |
| Failed Transaction Breakdown | Failed Transactions | Routing Time, Routing Time - Global Error Count |
| Failed transaction details | Failed Transactions | Failed transaction details |
| Network Management and Monitoring Tools (NMMT) network alerts | Network Time | NMMT Network Alert, NMMT Router Alert, NMMT Subnet Alert |
| NMMT server alerts | Server Time | NMMT Bridge Alert, NMMT CPU Alert, NMMT Database Alert, NMMT Disk Alert, NMMT Firewall Server Alert, NMMT General Alert, NMMT Host Alert, NMMT Hub Alert, NMMT Printer Alert, NMMT Segment Alert, NMMT Storage Unit Alert, NMMT Streaming Media Server Alert, NMMT Switch Alert, NMMT Tape Alert, NMMT UPS Alert, NMMT Web Application Server Alert, NMMT Web Server Alert |
| NMMT alerts | Failed Transactions | NMMT Bridge Alert, NMMT CPU Alert, NMMT Database Alert, NMMT Disk Alert, NMMT Firewall Server Alert, NMMT General Alert, NMMT Host Alert, NMMT Hub Alert, NMMT Network Alert, NMMT Printer Alert, NMMT Router Alert, NMMT Segment Alert, NMMT Storage Unit Alert, NMMT Streaming Media Server Alert, NMMT Subnet Alert, NMMT Switch Alert, NMMT Tape Alert, NMMT UPS Alert, NMMT Web Application Server Alert, NMMT Web Server Alert | evaluated metric does not depend on any other metric). These "lowest level" metrics or parameters are preferably represented by leaf nodes in the UI tree.

Using these methods, the RCA system 168 builds a RCA tree that reflects dependences between measurement values recorded by the agents 32, 166. The RCA tree, which is stored in the document object 278, is the basis of the displayed RCA UI tree 226. The RCA tree contains two types of nodes: measurement nodes and rule nodes. Measurement nodes represent a specific measurement value for a metric analyzed by the RCA logic module 280. Each measurement node has a property set of field-value pairs that represent the active filter existing at the time of the measurement associated with that measurement node. The field-value pairs define the properties associated with a particular measurement node. A field's value may be associated with a specific measurement (i.e., instance) or may be common for all measurements of a certain metric. Examples of fields common to all transaction response time measurements include "date_time" and "transaction_id." Additionally, a particular field (but not the field's value) may be common to all measurements of all metrics, such as a "slope_flag" field, which tells the RCA system 168 whether the metric's performance improves by an increase or a decrease in the measurement value of the metric. The "slope_flag" field for a transaction response time metric is set to "up" to reflect that an increase in the measurement value indicates worse performance and a decrease indicates better performance. In one embodiment, the field-value pairs are used as filters in database queries by the database query module 284 to retrieve measurement values for metrics.

Rule nodes represent dependencies (i.e., cause and effect relationships) between two measurement nodes. Rule nodes are preferably, but need not, be displayed in the UI tree. Child nodes of a measurement node are rule nodes that represent rules for which the affected metric is the metric of the parent measurement node. The parent node of a measurement node is a rule node that represents a rule for which the metric of the child measurement node is the affecting metric. Likewise, the parent and child nodes of rule nodes are measurement nodes. The parent measurement node of a rule node represents the measurement value of the affected metric, and the child measurement nodes of the rule node represent the measurement values of affecting metrics (i.e., possible causes) impacting the measurement value of the parent measurement node. The root session node of the RCA tree is a special rule node defining the active filters for the current RCA session. Because each measurement node includes a severity grade indicating how poorly its associated metric performed during the specified time frame, following the nodes of the RCA tree from the root to the leaves of the tree leads the user from the high-level performance problem to the source or sources of the performance problem.

a. Measuring and Grading the Measurement Values

FIG. 39 depicts the general process, which is referred to herein as the GetValue process, for measuring and grading a value associated with a particular input metric or parameter. In state 302, the RCA logic module 280 receives a metric identifier (metric ID) identifying an input metric to be measured and graded, a non-empty set of input properties (i.e., input property set), and an input rule node. The input property set includes a collection of field-value pairs used to define the active filters for the input metric to be evaluated. The input rule node is either the root session node or a dependency rule node identified by the Expand process (see FIG. 40). In order to determine the measurement value for the input metric, the GetValue process uses the input rule node and property set to build and execute a database query to locate the relevant measurement value or values of the particular input metric.

In state 304, the RCA logic module 280 retrieves field-value pairs ascertainable from known constant values, from the input property set or from field conclusion tables. Known constant values are those values that are constant and therefore known to the RCA logic module 280. For example, the "category" field of the "%CPU utilization" metric has a constant value of "CPU," and is therefore a known constant value. When field-value pairs can not be ascertained from known constant values or from the input property set, field conclusion tables may be used to determine the desired field-value pairs based on known field-value pairs (i.e., ones ascertainable from the known constant values or input property set).

Field conclusion tables may be used when moving from one metric to another where the metrics refer to the same property value using different property names. For example, although using different property names, both the "transaction server time" metric and the "%CPU utilization" metric have a field-value pair identifying the transactional server 30 being tested. Therefore, using the field conclusion tables and the property set of the "transaction server time" metric, the RCA logic module 280 is able to determine the field value associated with the transactional server 30 identifier for the "%CPU utilization" metric even though the two metrics refer to the transactional server 30 under different field names. Field conclusion tables may also be used when there is a pre-defined query or algorithm for how to determine a property value of one property given the property value of a different property (e.g., locating the sub_transaction_id given the transaction_id).

In one embodiment, the data in the field conclusion tables is implemented as a tree with nodes identifying a property (i.e., a field-value pair) and a parent-child relationship indicating that the named property of the child node can be deduced from the parent node's property value using a conclusion algorithm. The conclusion algorithm begins by finding all of the possible methods to determine property values from known property values and then using those methods builds a maximal list of all the values that can be determined from the known property values.

Using the retrieved field-value pairs, the RCA logic module, in state 306, builds and executes a database query to retrieve the measurement value or values of the input metric occurring within the specified time frame. The specified time frame of interest is either specified directly by a user, or is determined by the RCA logic module 280 from the property set of the parent measurement node of the input rule node. In one embodiment, the time frame of interest for the initial input metric (i.e., the very first input metric analyzed) is specified by a user (see FIG. 32), and the time frame of interest for all other metrics (i.e., metrics that affect the initial input metric) is based on and derived from the time frame defined in the field-value pairs for the parent node of the input rule node. In this embodiment, the time frame of the affecting metric is calculated as a rounded time period encompassing the measurement time of the parent measurement node. The rounded time period is configured by default, such as, for example, a 15 or 30 minute default time period. For example, if metric A has a measurement time of 1:17, the specified time frame of a sub-metric $A_1$ is defined as 1:15 to 1:30.

Alternatively, the rounded time period is set as plus and minus a default number from the measurement time of the parent measurement node. For example, if metric A has a measurement time of 1:17, the specified time frame of a sub-metric $A_1$ may be defined as 1:07 to 1:27. With the property set, including the specified time frame, acting as filters, the database query is executed by the database query module 284 to get all measurement values of the input metric that fall within the defined query from the sessions database 42.

The results of the database query are returned to the RCA logic module 280 as a result set, with each row in the result set being a valid measurement for the input metric. The result set may be returned as an empty set (indicating no measurement values were found), a set with only one row (indicating only one measurement value was found), or a set with multiple rows (indicating that more than one measurement value was found). If multiple measurement values are returned in the result set, the measurement values may be averaged together before being graded by the statistical module 282, or all measurements within a certain sub-portion of the time frame, such as a 5 or 10-minute time "slice," may be analyzed as a single measurement. In other embodiments, multiple measurement values are not averaged but are reported and graded individually. Alternatively, any other statistical aggregation may be used for evaluating multiple measurement values.

To determine whether the current measurement value or values of the input metric represents a variation or decline in performance, the current measurement value, along with one or more former or historical measurement values, is sent to the statistical module 282 for grading in state 308. Using the current measurement value, the historical measurement value(s), and various statistical methods (see below), the statistical module 282 assigns a severity level or severity grade to the current measurement value for the input metric. The severity grade in this embodiment represents the degree to which the current measurement indicates a significant performance decline relative to historical measurement values. In one embodiment, the historical measurement value(s) include measurement values occurring prior to and subsequent to the current measurement value. Alternatively or in addition to evaluating the current measurement value against the historical measurement value(s), the statistical module 282 may evaluate the current measurement value against a threshold measurement value specified by a user or by default in the RCA system 168. In grading the measurement value, the statistical module 282 takes into account how uniform the measurements are within the result set. In one embodiment, a severity grade of 0–4 is considered normal performance, a severity grade of 5–6 is considered questionable performance, and a severity grade of 7–10 is considered poor performance. As will be understood by one of ordinary skill in the relevant art, all ranges for the severity grades may be user configurable and/or derived as part of an adaptive process, and greater and lesser numbers of severity grades or status indicators may be used.

One of the methods used by the statistical module 282 to evaluate and grade the measurement values is a standard deviation method. In the standard deviation method, the difference between the current measurement value and the average of the historical measurement values is divided by the standard deviation. The resulting value is used to determine a severity grade. For example, a value of less than one standard deviation is considered normal performance (i.e., a severity grade of 0–4), a value of between one and two standard deviations is considered questionable performance (i.e., a severity grade of 5–6) and a value of more than two standard deviations is considered poor performance (i.e., a severity grade of 7–10).

Another method employed by the statistical module 282 uses a baseline and change-analysis non-parametric statistical variable that evaluates the probability of detecting a change in the last few measurements. This method is based on the NPSRI procedure described in a 1995 article by L. Gordon and M. Pollak entitled *A Robust Surveillance Scheme For Stochastically Ordered Alternatives,* The Annals of Statistics Vol. 22, No. 4 at pages 1350–1375, which is incorporated herein by reference. If the variable is over an upper threshold, such as, for example, fifty, the statistical module 282 assigns a poor severity grade. If the variable is below the upper threshold but above a lower threshold, such as, for example, thirty, the statistical module 282 assigns a warning severity grade. Otherwise, the statistical module 282 assigns a normal severity grade to the measurement value. In one embodiment, a "statistical_method" field is used to identify which of several statistical methods (e.g., standard deviation, NSPRI or other) is to be used to evaluate all measurement values for a particular metric.

The measurement value is first given a preliminary severity grade determined by the specific statistical method being used by the statistical module 282. The final severity grade typically depends on the value of the measurement itself, its neighboring measurement and rule nodes and some baseline information. To enable comparisons of the performance for measurement values graded by different statistical methods, which may result in different numerical values being used, the statistical module 282 preferably includes a normalization procedure. The normalization procedure equates all severity grades on a common scale while preserving the preliminary qualification of "normal," "questionable" or "poor" performance. Thus, for example, severity grades that were considered "poor" on the preliminary grading scale are mapped to "poor" severity grades on the normalized scale.

In one embodiment, the statistical module 282 considers the type of the dependency rule ("break down" or "influenced by") expressed in the input rule node, and the severity grades of the parent measurement node to the input rule node, in calculating a severity grade for the current measurement value. A "break down" rule type is typically allocated greater weight in the calculation process than an "influenced by" rule. For each type of dependency rule, a ratio is defined for use in calculating the influence of the ancestor on the severity grade to be assigned to the current measurement value. In this embodiment, the weighted grade is computed as: $G = r*G_p + (1-r)*G_n$, where r is the ratio, $G_p$ is the weighted grade of the parent measurement value and $G_n$ is the normalized base grade of the current measurement value. For the initial measurement node, $G_p$ is assigned a value of zero, and the weighted grade of the first measurement node is the normalized base grade.

In state 310, a measurement node is created for the particular measurement (or group of measurements) of the input metric and inserted into the dependency tree as a child node of the input rule node. In one embodiment, one measurement node is created for each entry (i.e., each instance) in the result set. The measurement node includes the metric ID to identify the particular metric associated with the measurement node. The property set of the newly created measurement node is populated in state 312 with field-value pairs ascertained from known constant values, from the input property set, or from field conclusion tables. In state 314, the severity grade assigned to the measurement value is sent to the RCA logic module 280, which adds the measurement value and the severity grade assigned to the measurement value to the measurement node created in state 310. If the severity grade is normal, the process proceeds to an end state 321. If the severity grade is a warning or poor grade (see state 316), the process, in state 317, determines whether there are other metrics that affect the measurement value of the graded input metric. If there are no metrics affecting the measurement value of the input metric, the process proceeds to end state 321. If there are other metrics affecting the measurement value of the input metric, the process proceeds to state 320, in which the Expand process illustrated in FIG. 40 is invoked.

b. Expanding the Evaluation of Sub-metrics

FIG. 40 depicts the general process, which is referred to herein as the Expand process, for determining all of the metrics affecting the measurement value of the input metric. The metrics affecting the measurement value of the input metric are, for convenience only, referred to herein as "affecting metrics." Beginning at a start state 324, the process proceeds to state 326 in which the measurement node created in state 310 of FIG. 39 is made accessible to the Expand process. Using a database of dependency rules 290, the Expand process, in state 328, generates a list of all metrics that affect the measurement value of the input metric. For example, given a metric ID for the "Transaction Response Time" metric, a search of the database of dependency rules may reveal that there are two rules associated with the "Transaction Response Time" metric: the "Transaction Time Breakdown" rule and the "Break Transaction into Smaller Transaction" rule. From the list of applicable rules, the process retrieves a set of all affecting metrics and their metric IDs. Continuing with the above example, as a result of the "Break Transaction into Smaller Transaction" rule, the process retrieves a "Transaction Response Time" metric for a sub-transaction of the original transaction. As a result of the "Transaction Time Breakdown" rule, the process retrieves a metric ID for the following metrics: server time, network time, DNS time, error time, and connection time.

Beginning in state 330, for each of the metrics that affect the measurement value of the input metric, the process measures and grades the affecting metric by recursively calling, in state 332, the GetValue process (see FIG. 39) with the affecting metric ID, the property set from the parent node of the applicable rule node and the applicable dependency rule. In one embodiment, the property set is supplemented with additional field-value pairs ascertainable from known constant values or field conclusion tables. In state 334, the process determines whether there are affecting metrics remaining in the list of affecting metrics to be evaluated. If there are affecting metrics remaining, the process, in state 336, moves to the next affecting metric to be evaluated and repeats state 332 for that metric. Otherwise, the process proceeds to an end state 338.

As used herein, and as understood by one of ordinary skill in the art, references to the "receiving" of a node is understood to include the actual sending of the node data and/or the sending of a pointer to a memory address and/or physical location where the node is located. Additionally, as will be recognized by one of ordinary skill in the art, the process of FIGS. 39 and 40 may be implemented in a variety of embodiments and ordering routines. For example, in different embodiments, state 310 occurs either immediately after state 302 or immediately after state 308.

4. Automated Reconfiguration of Transactional Server

The results of the RCA analysis may be used to reconfigure the transactional server 30 so that the detected end user performance problem is reduced or eliminated. Although this task is typically performed by a network administrator, certain types of modifications may be made automatically without user intervention.

For example, in one embodiment, the RCA system 168 analyses the collected performance data automatically, as a background task, using pre-specified filters and time frames. When certain types of server resources are determined by such analysis to be the source of a performance problem, a corrective action is automatically performed according to a set of predefined rules. For instance, a rule may specify that when insufficient disk space available to a particular machine is determined to be the likely source of long transaction response times, additional storage resources are to be automatically allocated to that machine. Other types of corrective actions that may be performed automatically include switching additional physical servers into use, terminating unnecessary executable tasks on specific machines, reconfiguring load balancers, and reconfiguring application servers. Further, when a router is determined to be the source of long network times, a notification message may automatically be sent to the responsible Internet Service Provider by email, facsimile, or other communication method.

Although the invention has been described in terms of certain preferred embodiments, other embodiments that are apparent to those of ordinary skill in the art, including embodiments that do not provide all of the features and advantages set forth herein, are also within the scope of this invention. Accordingly, the scope of the invention is defined by the claims that follow.

What is claimed is:

1. A computer-implemented method of facilitating analysis of the operation of a transactional server system, the method comprising:

analyzing a series of measurement values of a first performance parameter to detect a degradation in performance of the transactional server system as seen by end users, said series of measurement values representing measurements taken over a period of time;

identifying a plurality of additional parameters for which a predefined dependency relationship exists with the first performance parameter, wherein each of the additional parameters is associated with a particular potential source of the performance degradation, and is lower in level than the first performance parameter;

analyzing measurement values of each of the plurality of additional parameters to evaluate a likelihood that each such additional parameter is associated with the performance degradation, said measurement values of the additional parameters representing measurements taken over said period of time; and presenting to a user an indication of which of the additional parameters is likely associated with the performance degradation to assist the user in identifying a root cause of the performance degradation.

2. The method of claim 1, wherein the transactional server system comprises a transactional server coupled to a network, and the first performance parameter is a response time measured from a location on the network that is remote from the transactional server.

3. The method of claim 2, wherein the plurality of additional parameters include at least a network time and a server time, such that the network and the transactional server are both evaluated as potential sources of the performance degradation.

4. The method of claim 1, wherein the plurality of additional parameters include server resource utilization parameters.

5. The method of claim 4, wherein the first performance parameter is a server time.

6. The method of claim 1, wherein analyzing the measurement values of each of the plurality of additional parameters comprises determining whether a quality of each such additional parameter degraded during a time period in which the performance degradation occurred.

7. The method of claim 1, wherein presenting to a user an indication of which of the additional parameters is likely associated with the performance degradation comprises generating a hierarchical node structure in which (a) the first performance parameter is represented by a parent node; (b) each of the additional parameters is represented by a respective immediate or non-immediate child node of the parent node; and (c) each of the child nodes is displayed to indicate a likelihood of association with the performance degradation.

8. A computer-implemented method of evaluating root causes of performance degradations in a transactional server, comprising:

monitoring an end user performance parameter reflective of the performance of the transactional server as seen by end users;

monitoring a plurality of server resource parameters of the transactional server; analyzing data values of the end user performance parameter to detect a degradation in end user performance; and analyzing data values of each of the plurality of server resource parameters to evaluate a likelihood that each such server resource parameter is associated with a cause of the degradation in end user performance;

whereby server resource variations that cause degradations in end user performance are detected automatically.

9. The method as in claim 8, further comprising presenting to a user a hierarchical node structure in which (a) the degradation in end user performance is represented by a parent node; (b) each of the plurality of server resource parameters is represented by a respective child node falling below the parent node; and (c) each of the child nodes is displayed to indicate a likelihood of association with the degradation in end user performance.

10. A system for analyzing the performance of a server system, comprising:

a data repository which stores performance data collected by a set of agents that monitor operation of the server system, the performance data including measurements of end-user performance parameters indicative of performance experienced by end users of the server system, and including measurements of source parameters indicative of potential sources of degradations in end user performance, said measurements of end-user performance parameters and source parameters taken over a common period of time; and an application component that analyzes the performance data to identify correlations between degradations in end user performance and degradations in specific source parameters, to thereby predict likely causes of the degradations in end user performance.

11. The system of claim 10, wherein the application component generates a hierarchical node structure display in which (a) a degradation in end user-performance is represented by a parent node; (b) source parameters potentially associated with the degradation in end-user performance are represented by respective immediate or non-immediate child nodes of the parent node; and (c) each child node is displayed to indicate a likelihood of association with the performance degradation.

12. The system of claim 10, wherein the end-user performance parameters include response times measured from a client location that is remote from a server of the server system.

13. The system of claim 10, wherein the source parameters include server resource parameters monitored by a server-side agent.

14. The system of claim 10, wherein the source parameters include at least a network time and a server time.

15. A computer program for identifying and predicting root causes of performance problems associated with a server system, comprising, on a computer-readable medium:

a first component that analyzes performance data for the server system to identify performance problems associated with the server system, the first component generating a data structure representing performance dependencies between various metric measurements for metrics associated with performance of the server system; and a second component that displays a user interface in which metric measurements represented in the data structure are grouped into nodes of a hierarchical node structure displayed to a user, the second component displaying in the hierarchical node structure an indication of whether the metric measurements grouped in each individual node represent a performance degradation relative to historical measurements.

16. The computer program of claim 15, wherein the second component groups the metric measurements into nodes according to a severity grade assigned to each of the metric measurements by the first component, the severity grade representing how poorly each of the various metric measurements performed in comparison to previous measurements.

17. A computer-implemented method of identifying likely root causes of performance degradations in a server system, the method comprising:

monitoring a response time of the server system over a period of time to generate a series of response time values;

monitoring a plurality of server resource parameters of the server system over said period of time to generate a series of values of each server resource parameter, wherein each of the server resource parameters is associated with a potential cause of degradations in the response time of the server system; and analyzing the series of response time values and each series of server resource parameter values to evaluate a degree to which degradations in quality of specific server resource parameters are correlated with degradations in the response time.

18. The method claim 17, wherein the response time is monitored by at least one client-side agent that emulates a user of the server system, and the plurality of server resource parameters are monitored by a server-side agent that collects the server resource parameter values by communicating with components of the server system.

19. The method of claim 17, wherein analyzing the series of response time values comprises comparing current response time values to historical response time values to evaluate whether the current response time values represent a response time degradation.

20. The method of claim 17, wherein the response time is an end-user response time indicative of response times seen users located remotely from the server system.

21. The method of claim 20, further comprising breaking down the end-user response time values into component values indicative of possible sources of end-user response time degradations, and analyzing the component values to predict sources of specific degradations in the end-user response time.

22. The method of claim 20, wherein the end-user response time is a transaction response time.

23. The method of claim 17, wherein the response time is a server response time indicative of time spent by the server system.

24. The method of claim 17, further comprising displaying a hierarchical node structure in which the response time is represented as a response time node and each server resource parameter is represented as a respective child of the response time node, and in which the nodes are color-coded to indicate quality degradations.

* * * * *